(12) United States Patent
Barbieri et al.

(10) Patent No.: US 8,861,452 B2
(45) Date of Patent: Oct. 14, 2014

(54) METHOD AND APPARATUS FOR USE OF LICENSED SPECTRUM FOR CONTROL CHANNELS IN COGNITIVE RADIO COMMUNICATIONS

(75) Inventors: Alan Barbieri, San Diego, CA (US); Durga Prasad Malladi, San Diego, CA (US); Yongbin Wei, San Diego, CA (US); Naga Bhushan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 13/210,341

(22) Filed: Aug. 15, 2011

(65) Prior Publication Data

US 2012/0039284 A1     Feb. 16, 2012

Related U.S. Application Data

(60) Provisional application No. 61/374,230, filed on Aug. 16, 2010, provisional application No. 61/374,224, filed on Aug. 16, 2010, provisional application No. 61/411,817, filed on Nov. 9, 2010, provisional application No. 61/426,219, filed on Dec. 22, 2010.

(51) Int. Cl.
| | | |
|---|---|---|
| *H04W 4/00* | (2009.01) | |
| *H04W 48/10* | (2009.01) | |
| *H04W 74/08* | (2009.01) | |
| *H04W 88/06* | (2009.01) | |
| *H04W 72/04* | (2009.01) | |
| *H04W 16/14* | (2009.01) | |

(52) U.S. Cl.
CPC .......... *H04W 48/10* (2013.01); *H04W 74/0833* (2013.01); *H04W 88/06* (2013.01); *H04W 72/0406* (2013.01); *H04W 16/14* (2013.01)
USPC ......................................................... 370/329

(58) Field of Classification Search
CPC ................... H04W 36/0066; H04W 36/0072; H04W 36/0077; H04W 36/14
USPC ................................................... 370/328–338
See application file for complete search history.

(56) References Cited

U.S. PATENT DOCUMENTS 6,256,500 B1 *   7/2001   Yamashita ................... 455/441
7,978,673 B1 *   7/2011   Uhlik et al. ................... 370/341
(Continued)

FOREIGN PATENT DOCUMENTS

JP      2009512326 A      3/2009
WO     2007043827 A1     4/2007
(Continued)

OTHER PUBLICATIONS

International Search Report and Written Opinion—PCT/US2011/04800—ISA/EPO—Dec. 2, 2011.

*Primary Examiner* — Chi Pham
*Assistant Examiner* — Fahmida Chowdhury
(74) *Attorney, Agent, or Firm* — François A. Pelaez

(57) ABSTRACT

Techniques are provided for control signaling and channel selection in cognitive Long Term Evolution (LTE). In one example, there is provided a method, operable by a mobile entity, that involves receiving, on a licensed channel, broadcasted channel usage information regarding at least one unlicensed channel used by one or more network nodes. The method further involves: performing a cell search procedure based at least in part on the channel usage information to select a given network node among the one or more network nodes; determining at least one random access parameter to be used in establishing wireless communication with the given network node, the at least one random access parameter being associated with a characteristic of the user device and determining a preferred downlink channel.

23 Claims, 62 Drawing Sheets

(56) References Cited

U.S. PATENT DOCUMENTS

| | | | |
|---|---|---|---|
| 2003/0115261 A1* | 6/2003 | Mohammed | 709/203 |
| 2004/0170221 A1* | 9/2004 | Storm et al. | 375/149 |
| 2005/0143123 A1* | 6/2005 | Black et al. | 455/552.1 |
| 2007/0237117 A1 | 10/2007 | Moon et al. | |
| 2009/0305693 A1* | 12/2009 | Shimomura et al. | 455/422.1 |
| 2010/0197317 A1 | 8/2010 | Sadek et al. | |
| 2011/0096770 A1* | 4/2011 | Henry | 370/352 |
| 2011/0223877 A1* | 9/2011 | Tillman et al. | 455/226.2 |
| 2011/0243078 A1* | 10/2011 | Kim et al. | 370/329 |

FOREIGN PATENT DOCUMENTS

| | | |
|---|---|---|
| WO | 2009119834 A1 | 10/2009 |
| WO | 2010088586 A2 | 8/2010 |

\* cited by examiner

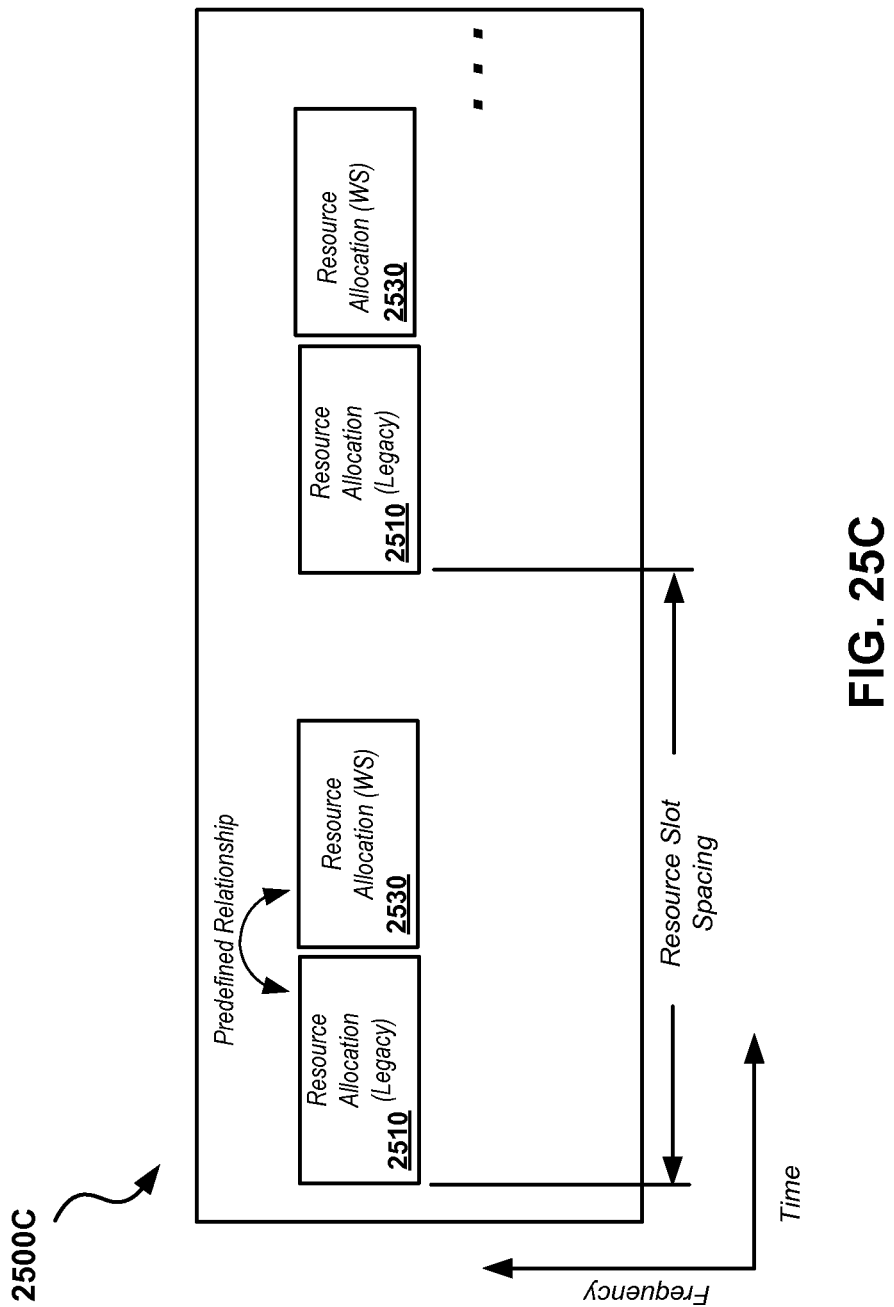

(Sensing Example)

METHOD AND APPARATUS FOR USE OF LICENSED SPECTRUM FOR CONTROL CHANNELS IN COGNITIVE RADIO COMMUNICATIONS

CLAIM OF PRIORITY UNDER 35 U.S.C. §119

The present Application for patent claims priority to Provisional Application No. 61/374,230, filed Aug. 16, 2010, entitled "METHODS AND APPARATUS FOR USE OF LICENSED SPECTRUM FOR CONTROL CHANNELS IN COGNITIVE LTE", and to Provisional Application No. 61/374,224, filed Aug. 16, 2010, entitled "METHODS AND APPARATUS FOR WHITE SPACE CAPABILITY DETECTION DURING CALL SETUP", to Provisional Application No. 61/411,817, filed Nov. 9, 2010, entitled "METHODS AND APPARATUS FOR WHITE SPACE CAPABILITY DECLARATION AND DOWNLINK CARRIER MEASUREMENTS IN COGNITIVE LTE", and to Provisional Application No. 61/426,219, filed Dec. 22, 2010, entitled "METHODS AND APPARATUS FOR DETERMINING AND PROVIDING WHITE SPACE CHANNEL INFORMATION IN COGNITIVE LTE", each of which is assigned to the assignee hereof and hereby expressly incorporated in entirety by reference herein.

BACKGROUND

1. Field

The present disclosure relates to wireless communication systems, and more particularly, to techniques for providing control signaling and channel selection in a cognitive Long Term Evolution (LTE) network using white spaces.

2. Background

Wireless communication systems are widely deployed to provide various types of communication content such as voice, data, video and the like, and deployments are likely to increase with introduction of new data oriented systems, such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems and other orthogonal frequency division multiple access (OFDMA) systems.

3GPP LTE represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for a number of mobile entities, such as, for example, user equipments (UEs) or access terminals (ATs). A UE may communicate with a base station via the downlink and uplink. The downlink (or forward link) refers to the communication link from the base station to the UE, and the uplink (or reverse link) refers to the communication link from the UE to the base station. Such communication links may be established via a single-in-single-out, multiple-in-signal-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point. Next generation systems, such as LTE, allow for use of MIMO technology for enhanced performance and data throughput.

As the number of entities deployed increases, the need for proper bandwidth utilization on licensed as well as unlicensed RF spectrum becomes more important. Moreover, with the introduction of semiautonomous base stations for managing small cells, such as femtocells and picocells, in systems such as LTE, interference with existing base stations may become an increasing problem. In this context, there is a need for efficient control signaling and channel selection to facilitate cognitive LTE networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects of the embodiments described herein, a cognitive radio method is provided for control signaling and channel selection, wherein the method may be performed by a mobile entity, such as, for example, a user equipment (UE). The method may involve receiving, on a licensed channel, broadcasted channel usage information regarding at least one unlicensed channel used by one or more network nodes. The method may further involve performing a cell search procedure based at least in part on the channel usage information to select a given network node among the one or more network nodes. The method may also involve determining at least one random access parameter to be used in establishing wireless communication with the given network node, the at least one random access parameter being associated with a characteristic of the user device and determining a preferred downlink (DL) channel. The method may additionally involve transmitting an access request to the given network node, the access request being based at least in part on the at least one random access parameter. In related aspects, an electronic device (e.g., a UE or component(s) thereof) may be configured to execute the above-described methodology.

In accordance with one or more aspects of the embodiments described herein, there is provided a cognitive radio method that may be performed by a network entity, such as, for example, an evolved Node B (eNB). The method may involve transmitting downlink (DL) channel information using a licensed channel occupying a first portion of a licensed frequency spectrum, the DL channel information identifying at least one unlicensed channel included within an unlicensed frequency spectrum, the at least one unlicensed channel being used by the network entity or by another network entity in its vicinity. The method may involve receiving, from a mobile entity, an access request to access one of the at least one unlicensed channel, the access request having encoded in it at least one random access parameter determining a preferred DL channel. The method may involve selecting, based at least in part on the at least one random access parameter, a given channel included within the unlicensed frequency spectrum or the licensed frequency spectrum. The method may involve transmitting, to the mobile entity, a response to the access request on the selected given channel. In related aspects, an electronic device (e.g., an eNB or component(s) thereof) may be configured to execute the above-described methodology.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 25A-C illustrate examples of random access resource allocation.

DETAILED DESCRIPTION

Techniques for supporting cognitive radio communication are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below. The word "exemplary" is used herein to mean "serving as an example, instance, or illustration." Any embodiment described herein as "exemplary" is not necessarily to be construed as preferred or advantageous over other embodiments.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
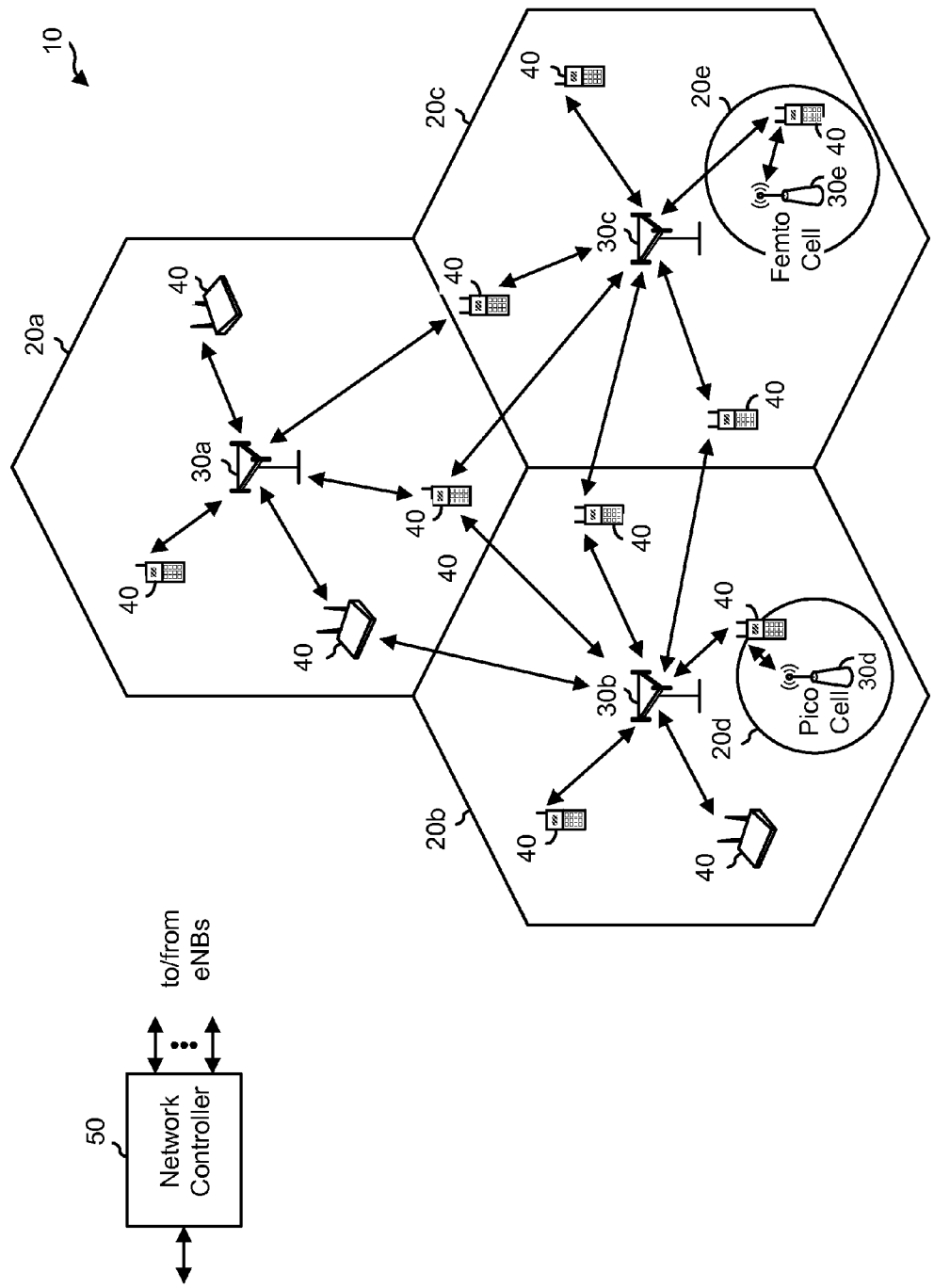
FIG. 1 is a block diagram conceptually illustrating an example of a telecommunications system.

FIG. 1 shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1A, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femto cell 20e.

Wireless network 10 may also include relays (not shown in FIG. 1A). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may be a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink (DL) and uplink (UL). A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods. In related aspects, the FAP synchronization algorithm described in further detail below may be applied to the FAPs using FDD or TDD duplexing.

Figure 2:
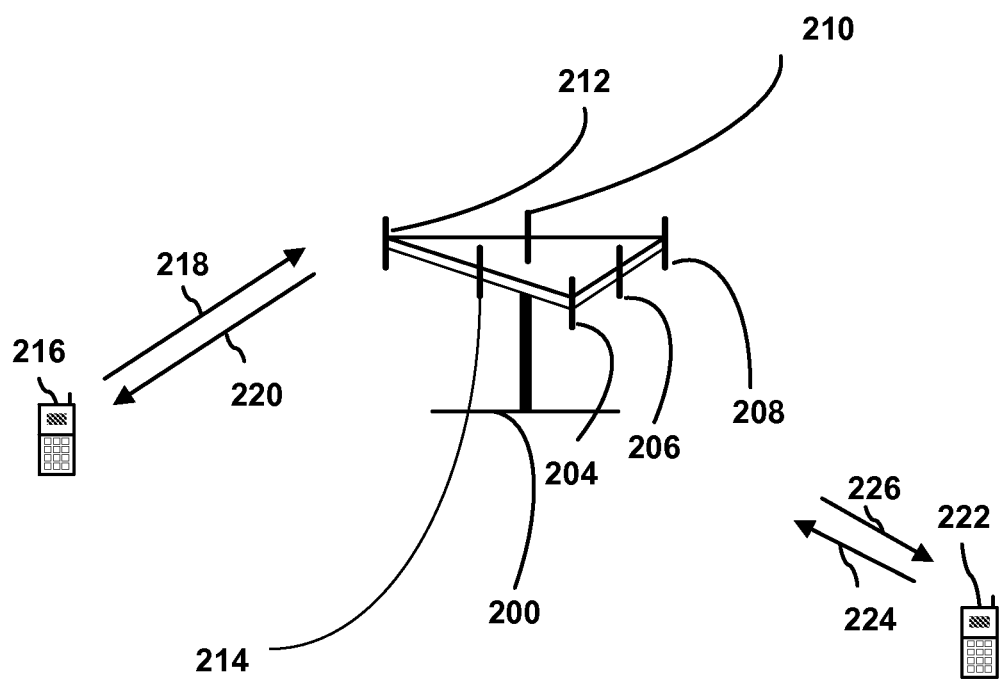
FIG. 2 illustrates details of a wireless communications system including an evolved Node B (eNB) and multiple user equipments (UEs).

Referring now to FIG. 2, a multiple access wireless communication system according to one aspect is illustrated. An access point or eNB 200 includes multiple antenna groups, one including 204 and 206, another including 208 and 210, and an additional including 212 and 214. In FIG. 2, only two antennas are shown for each antenna group, however, more or fewer antennas may be utilized for each antenna group. Access terminal or UE 216 is in communication with antennas 212 and 214, where antennas 212 and 214 transmit information to access terminal 216 over forward link 220 and receive information from access terminal 216 over reverse link 218. Access terminal 222 is in communication with antennas 206 and 208, where antennas 206 and 208 transmit information to access terminal 222 over forward link 226 and receive information from access terminal 222 over reverse link 224. In a FDD system, communication links 218, 220, 224 and 226 may use different frequencies for communication. For example, forward link 220 may use a different frequency then that used by reverse link 218.

Each group of antennas and/or the area in which they are designed to communicate is often referred to as a sector of the access point. Antenna groups each are designed to communicate to access terminals in a sector, of the areas covered by access point 200. In communication over forward links 220 and 226, the transmitting antennas of access point 200 may utilize beamforming in order to improve the signal-to-noise ratio of forward links for the different access terminals 216 and 224. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, evolved Node B (eNB) or some other terminology. An access terminal may also be called an access terminal, user equipment (UE), a wireless communication device, terminal, access terminal or some other terminology.

In accordance with aspects of the subject of this disclosure, cognitive radio refers generally to wireless communication systems where either a wireless network or network node includes intelligence to adjust and change transmission and/or reception parameters to provide efficient communication, while avoiding interference with other licensed or unlicensed users. Implementation of this approach includes active monitoring and sensing of the operational radio environment, which may include frequency spectrum, modulation characteristics, user behavior, network state, and/or other parameters. Multiple-access systems, such as LTE and LTE-A systems, may use cognitive radio techniques to utilize additional available spectrum beyond the specifically licensed spectrum.

Spectrum sensing involves detection of potentially usable spectrum. Once usable spectrum is detected, it may then be used either alone (if unoccupied) or shared, assuming other users are present, without causing harmful interference. Nodes in cognitive radio systems may be configured to sense spectrum holes, which may be based on detecting primary users (such as, for example, licensed users of the shared spectrum), or other users (such as, for example, unlicensed users). Once usable spectrum is selected, it may then be further monitored to detect use by others. For other higher priority users, the spectrum may need to vacated and communications transferred to other channels. For example, if a primary user is detected during initial search, an unlicensed user may be prohibited from using the spectrum. Likewise, if a primary user appears in spectrum being used by an unlicensed user, the unlicensed user may need to vacate.

Spectrum sensing techniques can include transmitter detection, where cognitive radio nodes have the capability to determine if a signal from a primary user is locally present in a certain spectrum. This may be done by techniques such as matched filter/correlation detection, energy or signal level detection, cyclostationary feature detection, or other techniques. A primary user may be a higher priority user, such as a licensed user of shared spectrum which unlicensed users may also use.

Cooperative detection may also be used in some cases where multiple network nodes are in communication. This approach relates to spectrum sensing methods where information from multiple cognitive radio users are incorporated for primary user detection. Interference-based, or other detection methods may likewise be used to sense available spectrum.

Cognitive radio systems generally include functionality to determine the best available spectrum to meet user and/or network communication requirements. For example, cognitive radios may decide on the best spectrum band to meet specific Quality of Service (QOS), data rate requirements, or other requirements over available spectrum bands. This requires associated spectrum management and control functions, which may include spectrum analysis as well as spectrum decision processing to select and allocate available spectrum.

Because the spectrum is typically shared, spectrum mobility is also a concern. Spectrum mobility relates to a cognitive network user changing operational frequency. This is generally done in a dynamic manner by allowing network nodes to operate in the best available frequency band, and maintaining seamless communications during the transition to other/better spectrum. Spectrum sharing relates to providing a fair spectrum scheduling method, which can be regarded as similar to generic media access control (MAC) problems in existing networks.

One aspect of cognitive radio relates to sharing use of licensed spectrum by unlicensed users. Use of this spectrum may be integrated with other wireless communication methodologies, such as LTE.

White spaces (WS) refer to frequencies allocated to a broadcasting service or other licensed user that are not used locally, as well as to interstitial bands. In the United States, the switchover to digital television in 2009 created abandoned spectrum in the upper 700 megahertz band (698 to 806 MHz), and additional whitespace is present at 54-698 MHz (TV Channels 2-51) which is still in use for digital television. Incumbent primary users may include licensed television broadcasters on existing channels, wireless microphone systems, medical devices, or other legacy devices. In 2008, the United States Federal Communications Commission (FCC) approved unlicensed use of this white space. However, these so-called "TV Band Devices," must operate in the vacant channels or white spaces between television channels in the range of 54 to 698 MHz.

Rules defining these devices were published by the U.S. Federal Communications Commission (FCC) in a Second Report and Order on Nov. 14, 2008. The FCC rules define fixed and personal/portable devices. Fixed devices may use any of the vacant US TV channels 2, 5-36 and 38-51 with a power of up to 1 watt (4 watts EIRP). They may communicate with each other on any of these channels, and also with personal/portable devices in the TV channels 21 through 51. Fixed devices must be location-aware, query an FCC-mandated database at least daily to retrieve a list of usable channels at their location, and must also monitor the spectrum locally once every minute to confirm that no legacy wireless microphones, video assist devices, or other emitters are present. If a single transmission is detected, the device may not transmit anywhere within the entire 6 MHz channel in which the transmission was received. Fixed devices may transmit only within the TV channels where both the database indicates operation is permissible, and no signals are detected locally.

Personal/portable stations may operate only on channels 21-36 and 38-51, with a power of 100 mW EIRP, or 40 mW if on a channel adjacent to a nearby television channel. They may either retrieve a list of permissible channels from an associated fixed station, or may accept a lower output power of 50 mW EIRP and use only spectrum sensing.

As noted previously, existing wireless networks may be enhanced by addition of cognitive radio functionality. In one aspect, an LTE system may include cognitive radio functionality as further illustrated below.

Figure 3:
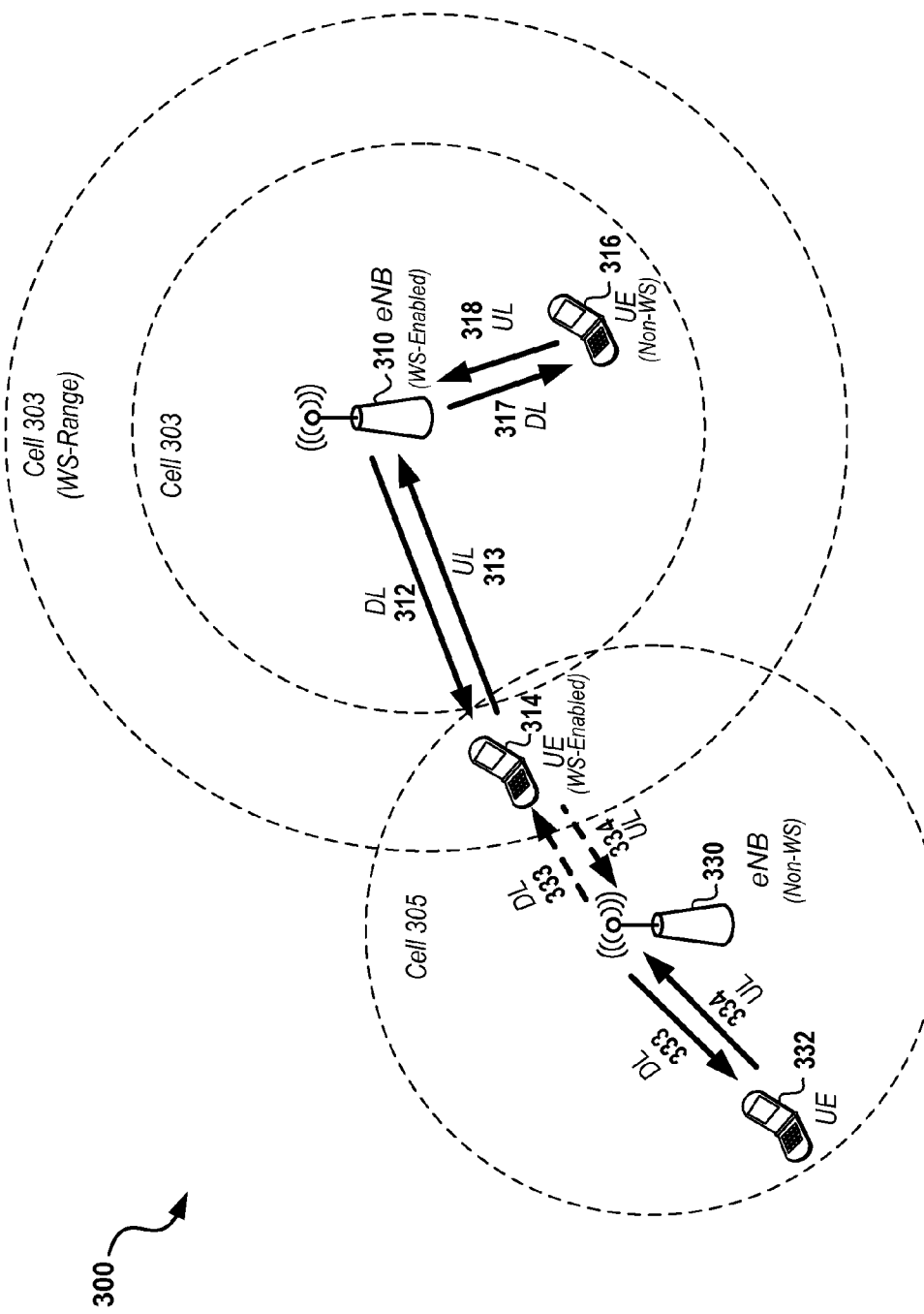
FIG. 3 illustrates a cognitive radio system using white space (WS).

Attention is now directed to FIG. 3, which illustrates an example of a cognitive LTE system 300 configured to utilize white spaces (WS), such as in the UHF television spectrum. A first cell 303 is configured to utilize WS on one or both of the DL and UL. In one implementation, licensed spectrum is used for the UL, while WS may be used for the DL for certain communications. For example, a WS-enabled eNB 310 may be in communication with a first UE 316 as well as a second UE 314. UE 316 may be a non-WS enabled UE, whereas UE 314 may be WS-enabled. (as used herein, WS-enabled refers to a network device configured to utilize white space, typically in addition to licensed spectrum). In the example, DL 317 and UL 318, between eNB 310 and UE 316, are configured to use licensed spectrum, whereas DL 312, between eNB 310 and UE 314, may be configured to use WS, while UL 313 may be configured to use licensed spectrum.

Another cell 305 may be adjacent to cell 303 and may be configured with an eNB 330 to communicate with UE 332 using licensed spectrum for DL 333 and UL 334. In some situations, UE 314 may be within range of eNB 330 and as such may be subject to attempts by UE 314 to access eNB 330.

As noted previously, use of WS by devices in cognitive networks requires sensing of channel conditions. In systems such as LTE systems configured to operate in TV band WS, FCC requirements mandate monitoring the spectrum being utilized by a secondary device (i.e., a non-licensed user) for primary uses and vacation of the channel if a primary user is detected. Typical primary uses may be UHF television channels, wireless microphones, or other legacy devices.

In addition, coordination with other secondary users may be desirable to facilitate frequency sharing. FCC requirements mandate checking the channel for 30 second before switching to a new channel, monitoring channels at least every 60 seconds for primary users, and vacating the channel within 2 second when a primary user is detected. During checking, a quiet period is required in which no signal transmission of any network device is done. For example, in an LTE network having an eNB and three associated UEs, all four of these devices must refrain from transmitting during the quiet period so that other users may be detected.

Figure 4:
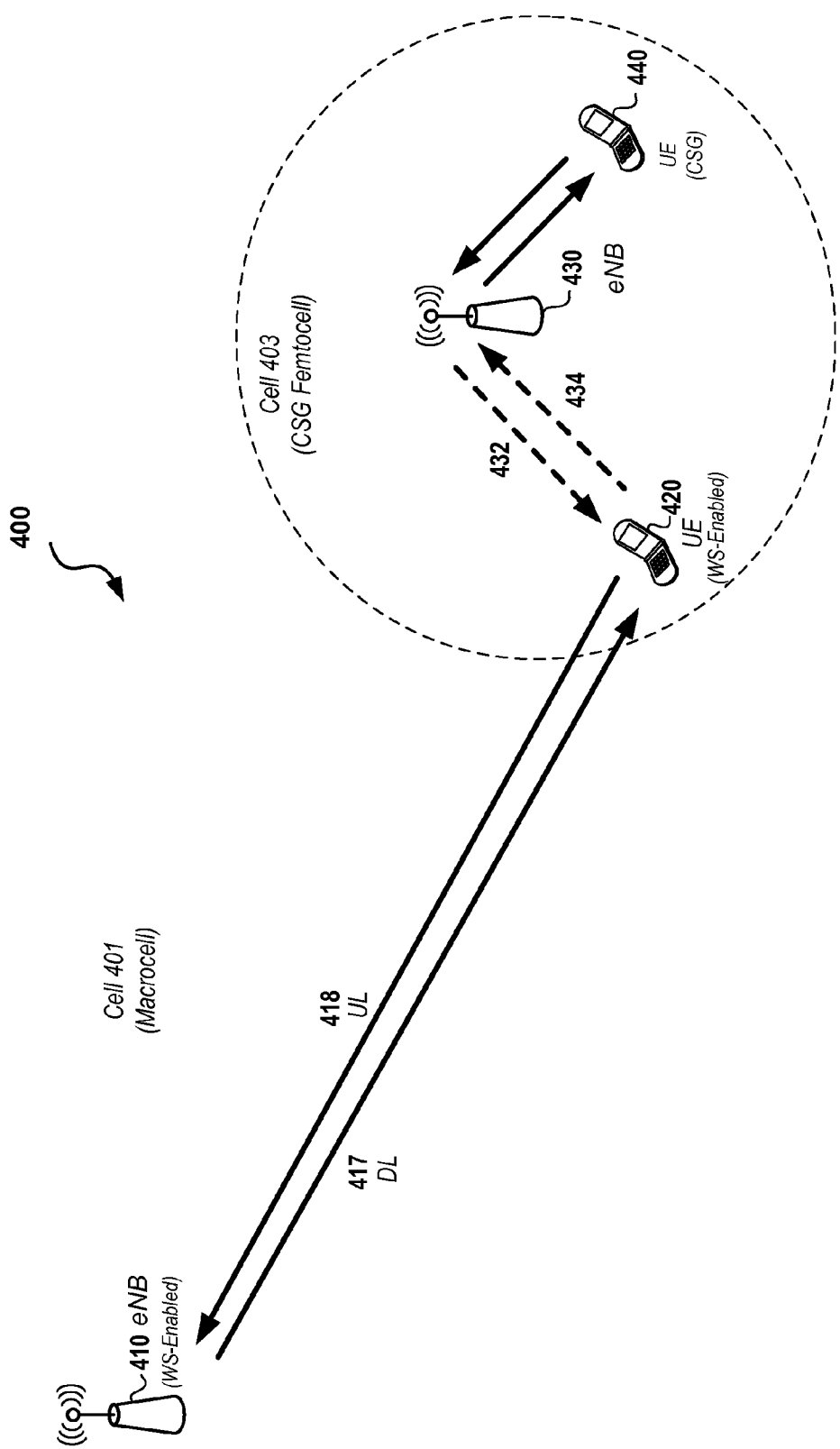
FIG. 4 illustrates an implementation of a cognitive Long Term Evolution (LTE) system with a closed subscriber group (CSG) femto cell.

Attention is now directed to FIG. 4, which illustrates an example cognitive LTE system 400 including cell 401, which may be a macrocell, having associated eNB 410, which may be WS-enabled. In some implementations, cell 401 may be a femtocell or picocell, however, for purposes of illustration, FIG. 4 is described based on the assumption that cell 401 is a macrocell having a range including at least the distance to UE 420 as shown. UE 420 may be a WS-enabled UE, which may be capable of communicating as a legacy UE and/or as a WS-UE. An additional cell 403 may be in proximity to UE 420. eNB 430, which may be a femtonode, may be associated with cell 403, and may be in communication with one or more additional UEs (UE 440, and other UEs not shown). UE 420 may be in close proximity to eNB 430 and/or may receive a stronger signal from eNB 430 than from eNB 410. In general, UE 420 may seek to connect with eNB 430; however, eNB 430 may be part of a closed subscriber group (CSG) or may otherwise allow only restricted access. Consequently, UE 420 may establish a connection with eNB 410, such as via DL 417 and UL 418, as shown. Interference 432 may be generated by eNB 430 and may constrain operation of UE 420, particularly if the transmit signal levels from eNB 410 are weak relative to those from eNB 430. Additional UL interference 434 may be generated by UE 420, which may interfere with operation of cell 403. Consequently, it may be desirable for UE 420 to communicate with eNB 410 primarily on one or more WS channels (not shown), rather than on licensed channels. This may be done by limiting the signaling provided on licensed channels, such as to limit signaling to synchronization and/or broadcast information. In particular, this may be important on a licensed DL such as DL 417 shown in FIG. 4. In addition to this scenario, other network configurations may also make it desirable to limit communications between eNBs and UEs on licensed channels.

In order to address these problems, as well as others, operation between WS-enabled eNBs and UEs may be performed such that some or most of the traffic, particularly on the DL, is done using WS channels. In some implementations, only synchronization and control data and information may be provided on a licensed DL channel, while other data and information may be provided on one or more WS channels. In some implementations, modifications may be made to accommodate both WS-enabled and legacy (i.e., non-WS), UEs when connecting to a WS-enabled eNB. In cases using only WS-enabled UEs, use of licensed spectrum may be completely eliminated; however, in order to support legacy UE functionality, some licensed channel functionality is generally needed.

Figure 5:
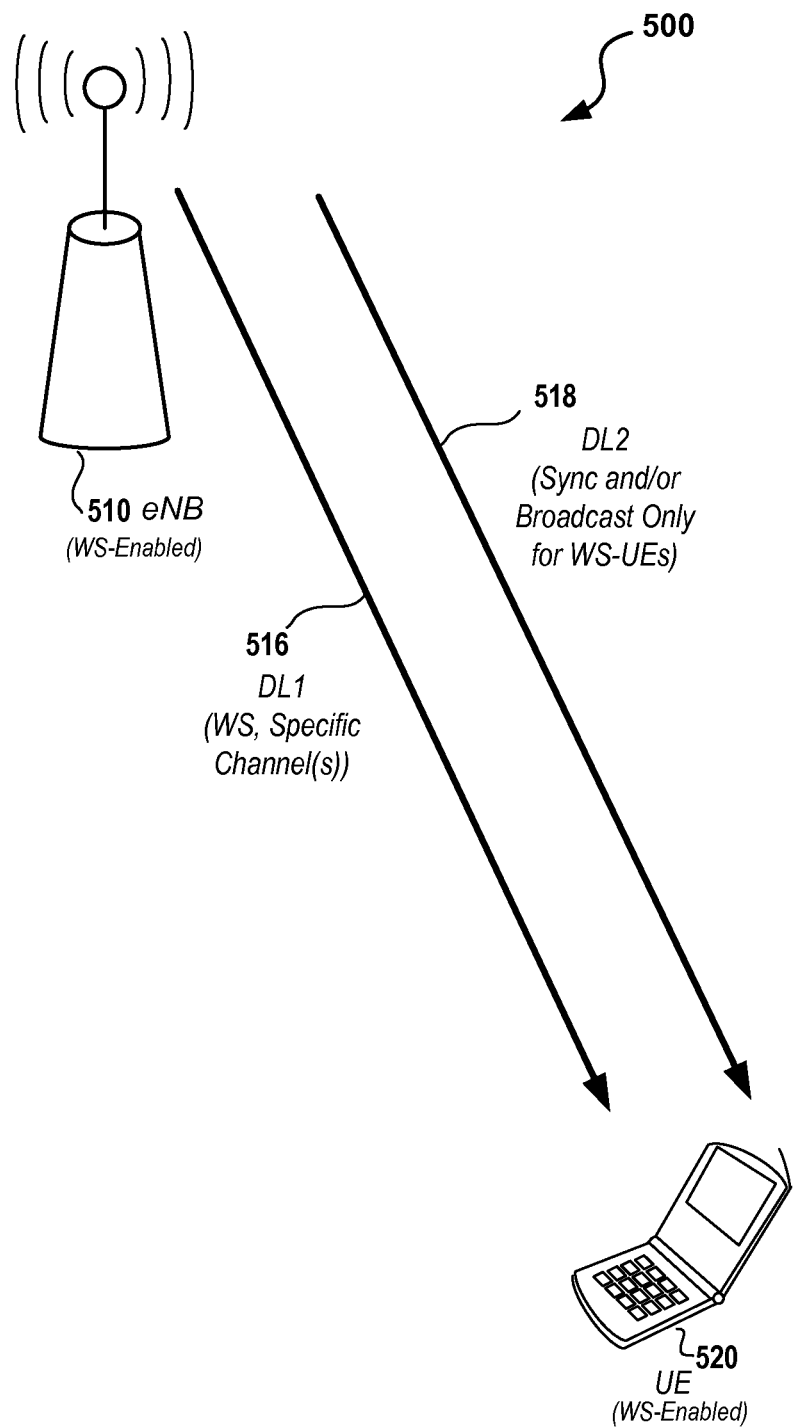
FIG. 5 illustrates details of an embodiment of signaling using a WS and a licensed channel.

Attention is now directed to FIG. 5, which illustrates a cognitive LTE system 500 including an eNB 510, which may be WS-enabled, and a UE 520, which may also be WS-enabled. Other cell nodes, as well as adjacent cells and their nodes (not shown) may also be present. Network 500 may be a heterogeneous network deployment, supporting different cells and nodes. These cells and nodes may be macrocells and corresponding nodes (which may be, for example, conventional base stations that use dedicated backhaul and are open to public access, with typical transmit power of approximately 43 dBm and antenna gain of 12-15 dBi), picocells and corresponding nodes (e.g., low power base stations that use dedicated backhaul connections and are open to public access, with typical transmit power of approximately 23-30 dBm and antenna gain of 0-5 dBi), femtocells and corresponding nodes (e.g., consumer deployable base stations that use a consumer's broadband connection for backhaul and may have restricted access, with typical transmit power less than 23 dBm) and/or relays (e.g. base stations using the same spectrum as backhaul and access, having power levels similar to picocells).

In accordance with one aspect associated with WS transmission, eNB 510 may be configured so as to provide multiple DL transmissions to UE 520. As shown in FIG. 5, these may include one or more WS DL channels, including DL1 516, as well as one or more licensed DL channels DL2. DL1 may be used for most of the DL transmissions between eNB 510 and UE 520, with DL2 reserved for only certain functions. These functions may be, for example, synchronization and broadcast functions, which may be provided in a standard format for legacy UEs. Alternately, or in addition, synchronization and broadcast signaling may also include specific signaling for WS-UEs to facilitate operation on one or more WS channels.

In LTE, system information on the transport side is logically mapped to the broadcast channel (BCH), broadcast control channel (BCCH), or DL shared channel (SL-SCH). Different physical channels may be used.

In operation, a UE entering a cell will first synchronize (using, for example, PSS and SSS) with the cell's eNB, and then once synchronized receive broadcast information about the cell configuration (using, for example, the MIB and SIBs). In LTE a master information block (MIB) and system information blocks (SIBs) are used as part of radio resource control (RRC). The MIB includes a limited amount of information comprising the most frequently transmitted parameters which are essential to a UEs initial access to the network. SIB1 contains parameters needed to determine if a cell is suitable for cell selection, as well as information about the time-domain scheduling of the other eNBs. SIB2 includes common and shared channel information. SIBS3-8 include parameters used to control infra-frequency, inter-frequency, and inter-RAT (Radio Access Technology) cell reselection. Additional information may also be added to SIB, including information as described further herein, in various embodiments.

Once the UE has achieved synchronization, it will read the MIB to camp on the cell. Since the MIB contains very little information (i.e., information about the cell bandwidth, some information about the physical HARQ indicator channel (PHICH), and the system frame number (SFN)).

The SIB's are transmitted on DL-SCH mapped on PDSCH. To receive information about SIB's the UE needs information about PHICH, which is read from the MIB. The BCH channel has a TTI of 40 ms, and has a very small transport block size, while being protected with ⅓ convolutional code and 16 bit CRC. This helps to keep the overhead in an LTE system to a minimum.

Figure 6:
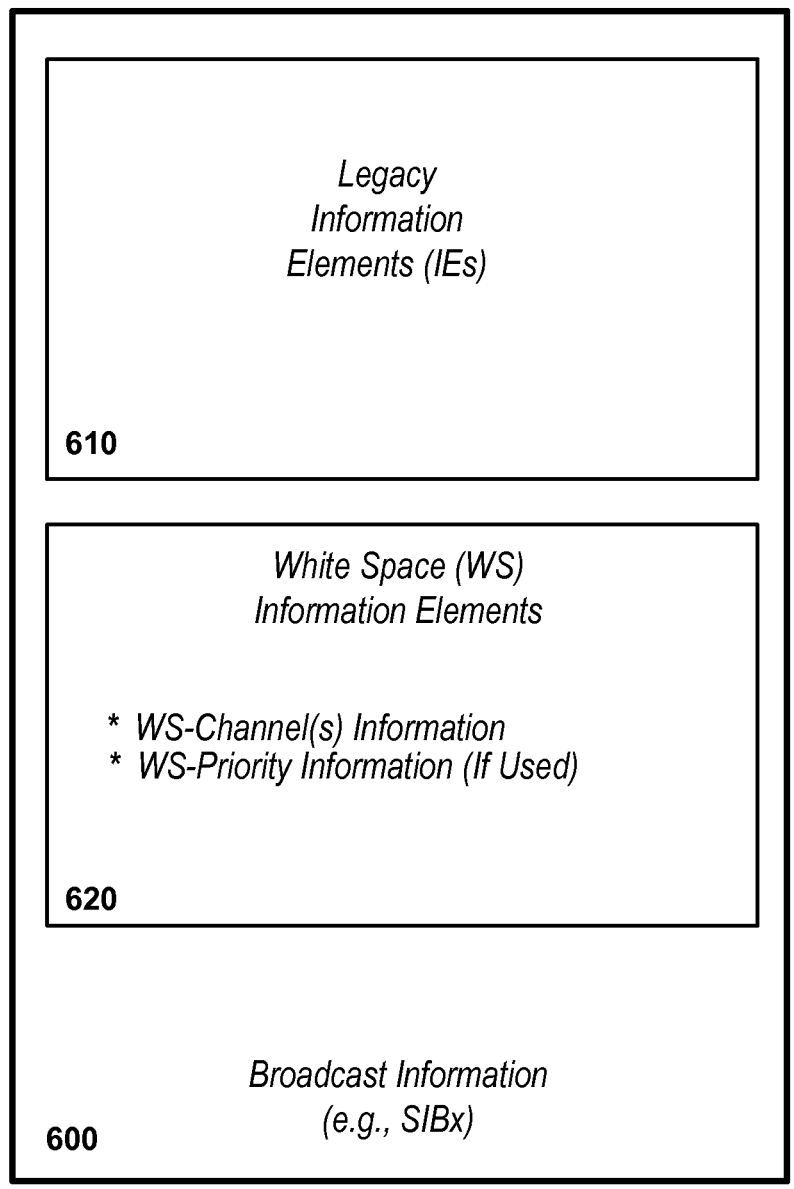
FIG. 6 illustrates an embodiment of a SIB for use in cognitive LTE.

In order to facilitate WS operation, in one implementation, alternate SIB configurations may be used. FIG. 6 illustrates one embodiment 600 of such a SIB configuration, where legacy SIB information 610, such as, for example, was described above, may be combined with WS-specific information elements (IEs) 620. These WS IEs may include information such as WS channel or channels information or data, WS channel priority information or data, or other WS-specific data or information. The WS-specific information may be incorporated in various SIBs, however, it may be desirable to include the information in the most frequently sent SIBs. For example, SIBs 1 and 2 may be preferable. In some implementations, additional control information related to cognitive operation may be provided. For example, control information related to quiet periods (i.e., used by UEs or other network nodes for sensing as described previously), cognitive capabilities at the eNB side, such as, for example, band support, support for distributed sensing processes wherein sensing is performed at multiple network nodes and combined. Other information related to control and cognitive processing may also be provided in various implementations.

Figure 7:
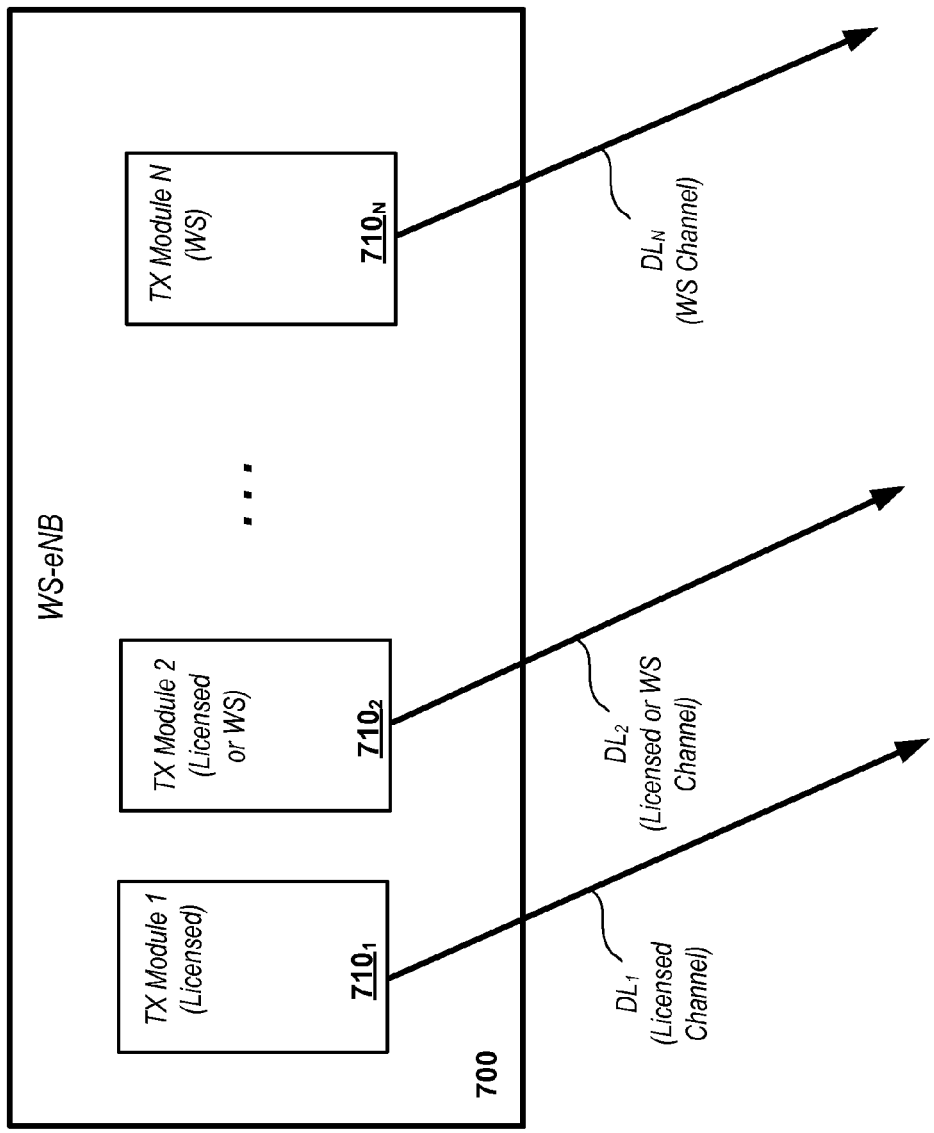
FIG. 7 illustrates an eNB configuration using multiple downlink (DL) channels.

Attention is now directed to FIG. 7, which illustrates a WS-enabled eNB having multiple DL transmitters 7101 thru 710N. Each of transmitters 710 may be configured to operate on a selected WS or licensed channel. At a minimum, two channels may be provided, with one being configured to use licensed spectrum and the second being configured for WS spectrum.

In many implementations, it is expected that a UE will need to search many potentially available WS channels during initial cell acquisition. This may create considerable limitations in acquisition since the UE would need to search PSS, SSS, PBCH, etc. for each WS channel, which may take significant time.

Consequently, rather than performing a blind search on a potentially large number of WS channels, it may be desirable for the UE to perform initial acquisition using a licensed channel, and then transfer some or all operation to one or more WS channels. This approach may speed up connection time and/or reduce overhead and/or UE power consumption.

Figure 8:
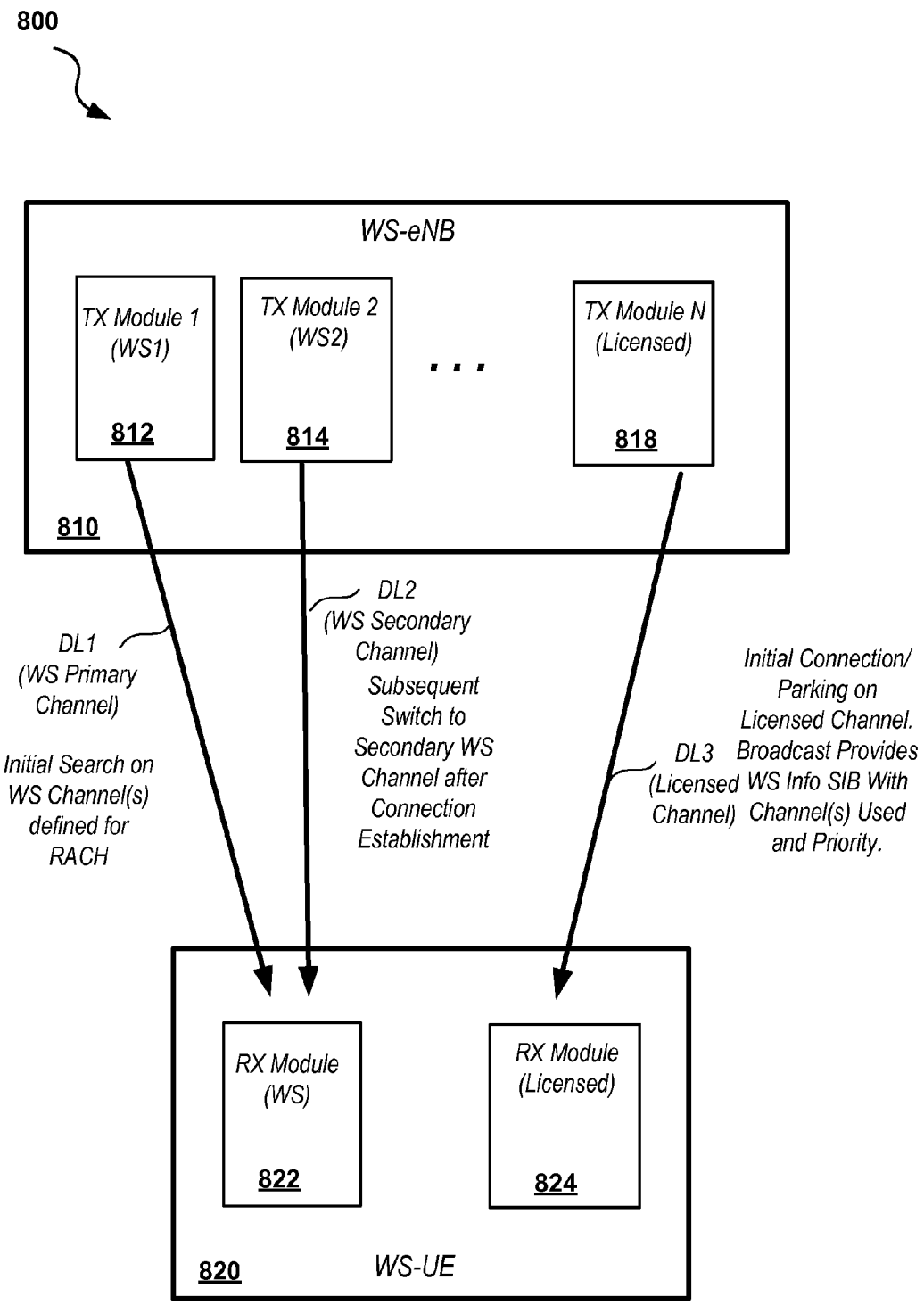
FIG. 8 illustrates a DL channelization for one embodiment of licensed to WS DL transition.

Attention is now directed to FIG. 8, which illustrates one embodiment of a WS-enabled system 800 on which such as process may be implemented. System 800 includes WS-enabled eNB 810 and UE 820, and may include other nodes (not shown). eNB 810 may be configured to operate on one or more WS channels with corresponding WS transmitters 812 and 814 (it is noted that in some implementations a single WS transmitter 812 may also be used). In addition, eNB 810 is configured to operate on at least one licensed channel using transmitter 818.

Likewise, UE 820 may be configured with a WS receiver module 822 and a Licensed receiver module 824. In some implementations, other receiver modules (not shown) may also be used. Alternately or in addition, in some implementations receiver functionality associated with 2 or more modules may be incorporated into a single receiver module.

In operation, UE 820 initially connects to eNB 810 by receiving signals on DL3 (on the licensed channel). This information may be limited to synchronization and/or broadcast information, such as described previously herein. Upon acquisition, UE 820 may then receive information on one or more SIBs to facilitate transition to one or more WS channels. This information may be provided in an IE in SIBs 1 or 2, for example. These WS channels may then be searched and acquired without the need to perform extensive WS channel searching. In some cases, a single WS channel (such as, for example, is provided via DL1 of FIG. 8). Alternately, in some implementations, multiple WS channels may be used. A second WS channel may be provided via DL2 as shown in FIG. 8). Additional WS channels (not shown) may also be provided.

In some implementations using multiple WS channels, the SIB information provided on the licensed channel may also include information associated with WS channel prioritization. For example, where multiple WS channels are used, they may be prioritized by the eNB scheduler and/or the associated core network. This may be based on channel characteristics, loading, or other factors such as presence of primary users, etc. Based on the priority, a UE may then select an appropriate WS channel and transfer operation to that channel. As noted previously, WS operation will generally be used primarily for the DL, however, in some implementations WS channels may also be used for UL transmission.

In the example configuration of FIG. 8, the WS channels may be further organized by functionality. For example, one WS channel may be configured for initial access, such as to perform RACH procedures, and then once a connection is established, the eNB may transfer operation to another WS channel. In this implementation, the RACH procedure signaling may be provided on only one or a few of the WS channels used.

Figure 9:
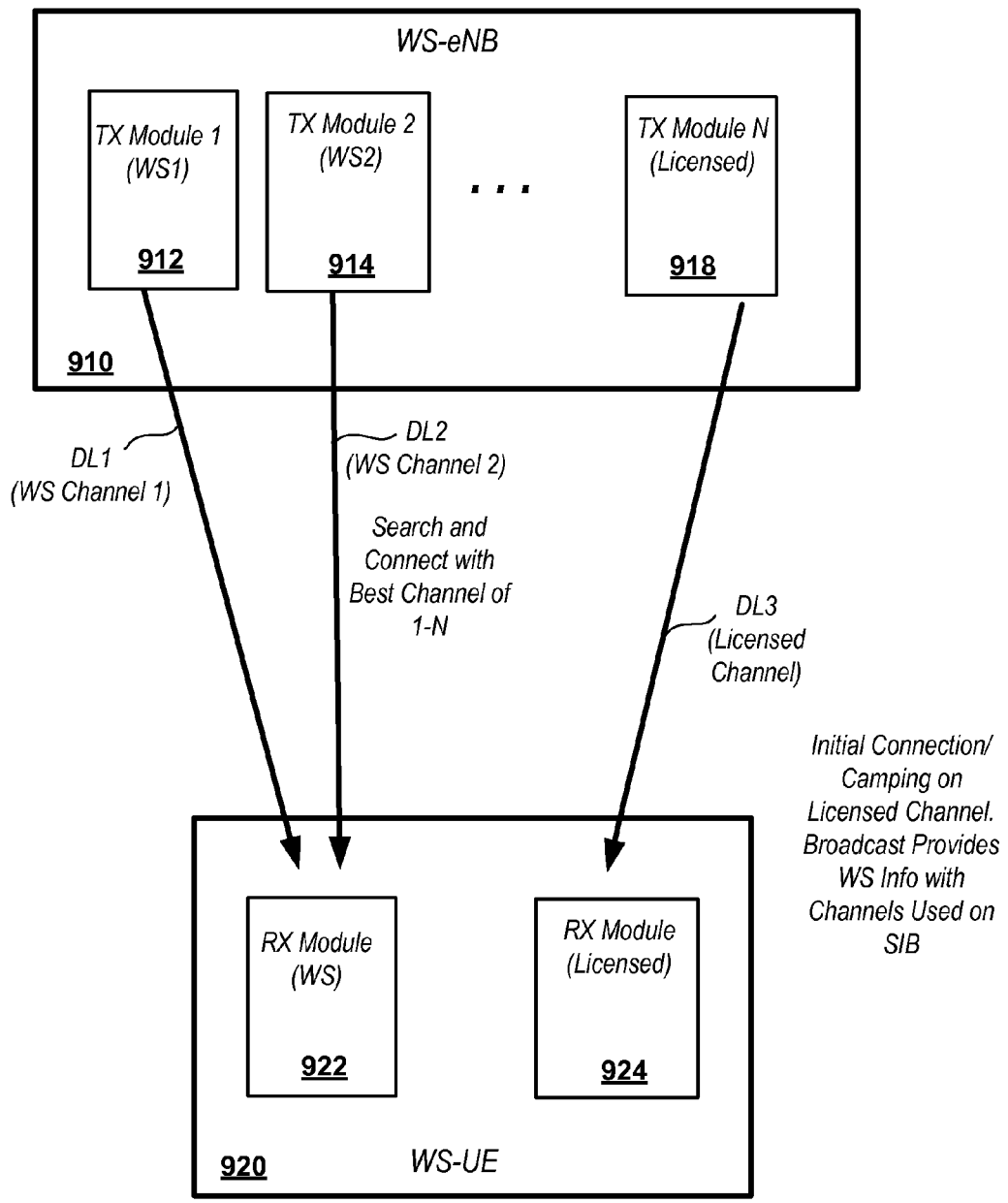
FIG. 9 illustrates a DL channelization for one embodiment of licensed to WS DL transition.
Figure 10:
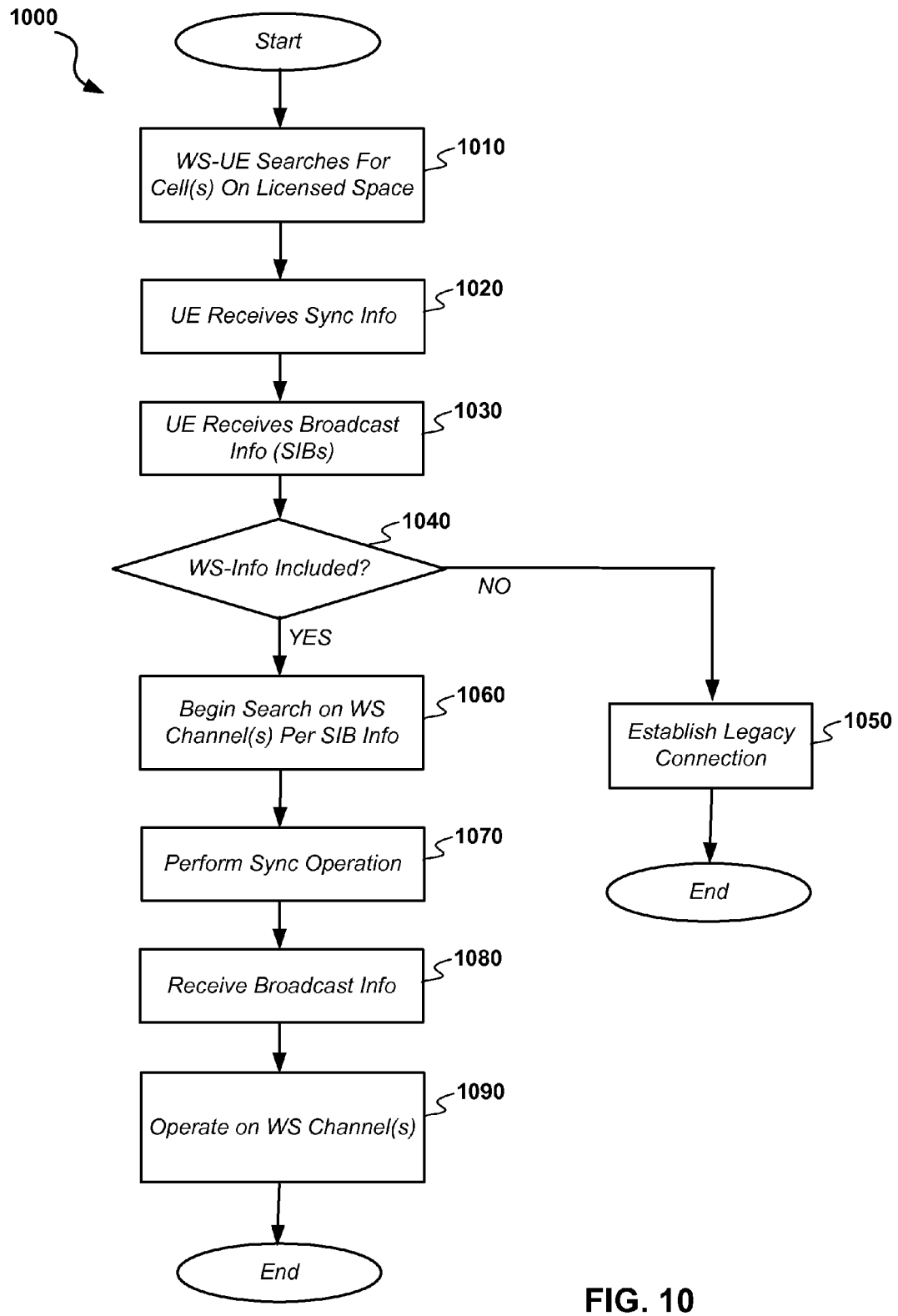
FIG. 10 illustrates an embodiment of a process for UE connection to an eNB.

FIG. 9 illustrates another configuration 900, where multiple WS transmitters are used by an eNB 910, similar to that shown in FIG. 10. In this implementation, however, the licensed channel provides only information regarding which WS channel or channels are being used. This information may be provided in an IE in SIBs 1 or 2, for example. Upon receipt of this information, a UE 920 may then transition operation to one or more of the available WS channels. In this case, the eNB will generally provide RACH procedure capability on multiple WS channels to allow connection with any of the channels, rather than a preferred or required channel as shown in FIG. 8.

In some cases, the UE 920 may have previously searched the available WS channels and may have determined one or more preferable channels. Alternately or in addition, the UE may have detected an unusable channel, such as, for example, a channel that is being used by a primary user (and it therefore restricted). If the UE has not done any previous searching, it may proceed to acquisition of a particular WS channel or, in some cases, multiple WS channels if supported by the UE.

Once UE operation has been established, the UE may signal information to the eNB regarding which channel or channels it has selected, and/or other information related to WS operation.

Attention is now directed to FIG. 10, which illustrates an embodiment of a process 1000 for connection and white space operation. At stage 1010, a WS-enable UE, such as the UEs shown in FIGS. 1-5 and 8-9, search for cells on licensed spectrum. The initial search process may be done only on licensed spectrum, even if the UE is capable of performing similar searching on WS channels. At stage 1020, the UE may receive synchronization signals (e.g., PSS, SSS) and perform synchronization operations such as are described in, for example, the LTE specifications. Once synchronized with a particular cell and associated eNB, the UE may then receive broadcast information, which may be provided in one or more SIBs such as described previously herein. The associated eNB may be WS enabled or may be a legacy eNB (i.e., not WS enabled). At decision stage 1040, a decision may be made based on the SIB information element(s). If no WS information is received, the UE may proceed to stage 1050 where a legacy connection may be established. Alternately, if WS-specific information (such as, for example, WS channelization and/or priorities) is received, the UE may proceed to stage 1060, where a search of WS channel or channels may be done. The channel search may be based on WS channel information provided in the SIB or SIBs received from the licensed channel. At stage 1070, a synchronization operation may be performed based on signaling (e.g., PSS, SSS) received on a detected WS channel or channels. At stage 1080, broadcast information (such as, for example, MIB, SIB1, SIB2, etc.) may be received via a WS channel. Finally, at stage 1090, the UE may begin operation on the WS channel. In particular, the UE may begin to receive DL transmissions on the WS channel, and in some cases may also use a WS UL channel to communicate with the eNB.

In some implementations, WS-enabled eNBs may be in communication only with legacy UEs (i.e., no WS-enabled UEs are present). In this case, licensed channel signaling as described previously herein may also be used, with the additional requirement that the eNB support data traffic on the licensed DL channel, in addition to the control information described previously (e.g., synchronization and broadcast information). In addition, in some implementations legacy UEs (as well as WS-UEs) may be operated in a network, such as a heterogenous network (hetnet), which further includes resource partitioning functionality. In some implementations, the resource partitioning functionality may be triggered only upon addition of a legacy UE. For example, if there is any interference coordination scheme (i.e., resource partitioning and interference coordination techniques), the hetnet may be configured based solely on legacy users and not WS users (unless the WS users are also impacting the licensed spectrum traffic).

Figure 11:
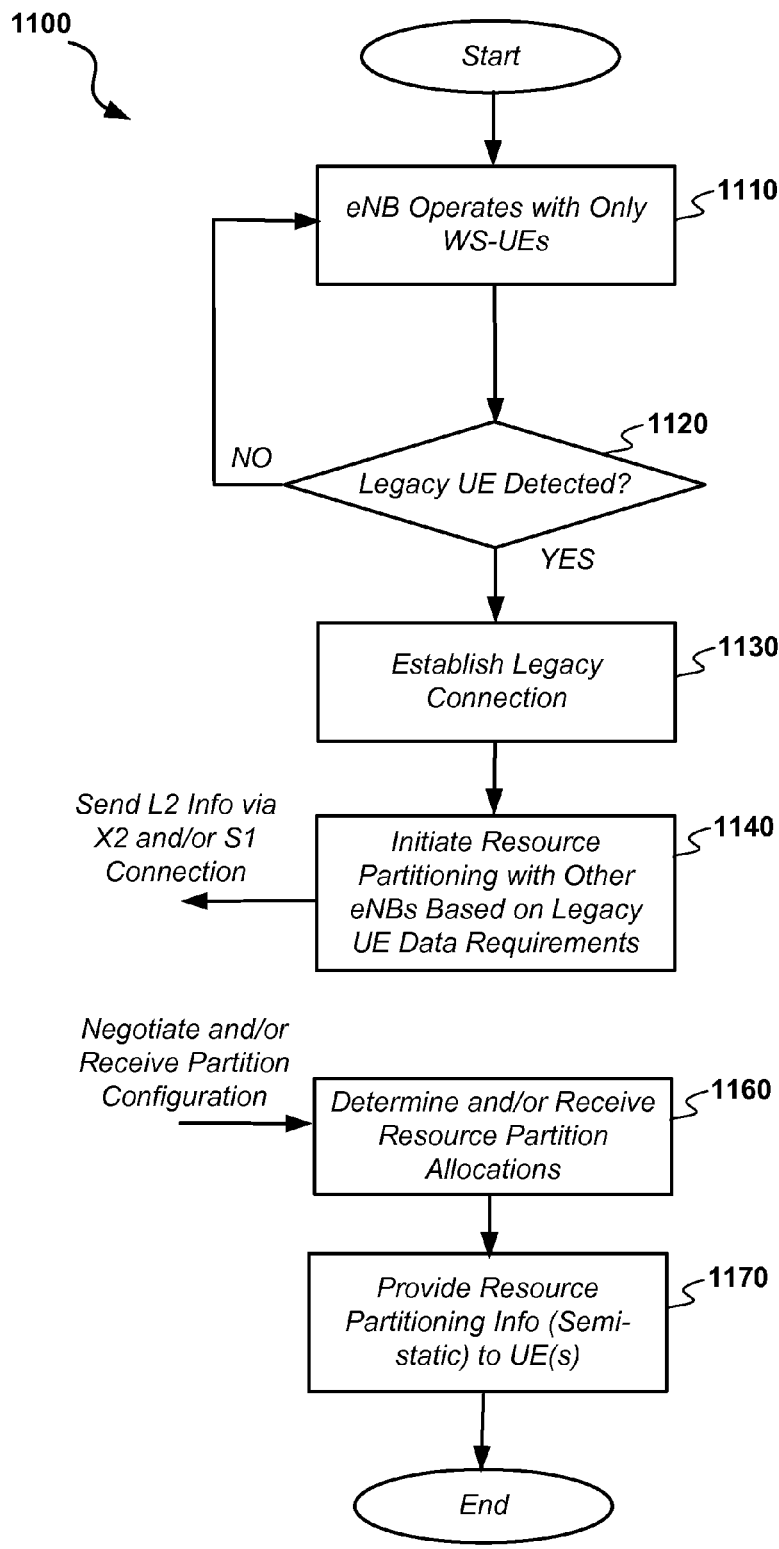
FIG. 11 illustrates an embodiment of a process for interference coordination in a cognitive LTE network.

An example of this is shown in FIG. 11, which illustrates a process 1100 for transitioning operation of an eNB from WS-only operation. Similar procedures may be used for addition of legacy UEs to a network already including one or more legacy UEs. At stage 1110, it is assumed that an eNB is operating only with WS-UEs and may not be using any interference coordination. At stage 1120, a new UE may be added, and a decision as to whether the new UE is a legacy UE or WS-UE may be made. If the new UE is a WS-UE, processing may continue to stage 1110. Alternately, if a legacy UE is detected, the eNB may then establish a legacy connection at stage 1130, such as solely through use of licensed channels. At stage 1140, the eNB may then initiate interference coordination with other adjacent eNBs, which may be done using L2 signaling. This may be done by using, for example, X2 and/or S1 connections with the adjacent eNBs which may include information such as loading, etc. Coordination may be determined by the eNB, by another eNB, in coordination between eNBs, and/or by a core network module. At stage 1160, the eNB may receive partition configuration information and/or resource allocations. The partition information may be signaled to the legacy UE or UEs (such as, for example, semi-static allocations), and/or to the WS-UEs.

In addition, at stage 1140, L2 signaling may include signaling information associated with both the legacy UE(s) using licensed spectrum, as well as WS-UEs. This may be useful, for example, if adjacent cells use the same WS, coordination of WS spectrum use may also be done. Moreoever, in some cases, coordination of use of both licensed and WS spectrum may be done between two or more adjacent eNBs, which may be of different classes and/or power levels.

Figure 12:
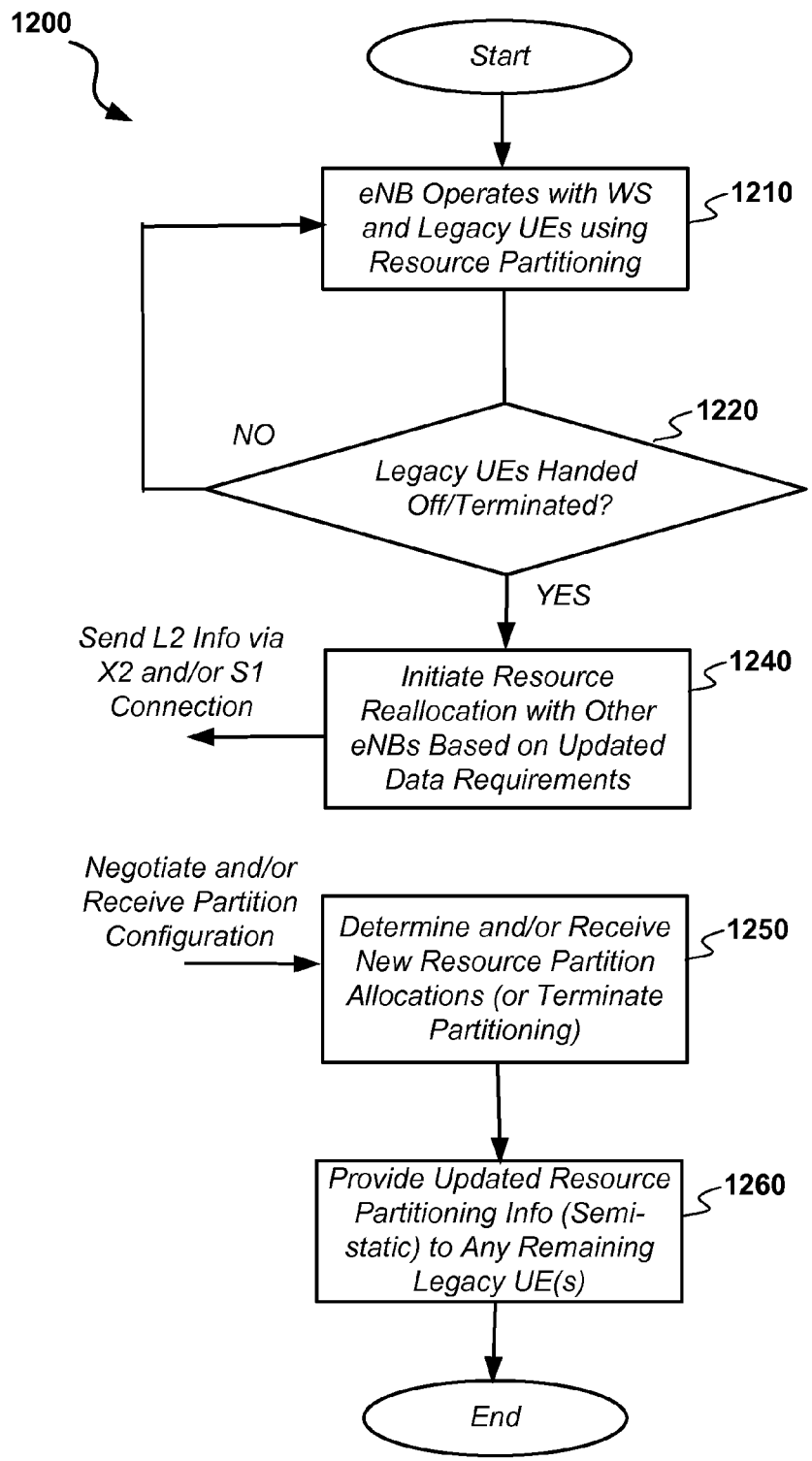
FIG. 12 illustrates an embodiment of a process for interference coordination in a cognitive LTE network.

Attention is now directed to FIG. 12, which illustrates an embodiment of a corresponding process 1200 for reallocating resources upon termination of a legacy UE connection in a WS-enabled cell. At stage 1210 it is assumed that a WS-enabled eNB in operating with both WS and legacy UEs, and interference coordination is being used, such as by use of resource partitioning. At stage 1220, a decision step may be performed to test for disconnection of a legacy UE (such as by power off, handoff, etc.). If a legacy UE has terminated operation, a resource reallocation request may be made at stage 1240. This may include sending L2 information, such as via an X2 or S1 connection, to adjacent eNBs. A resource reallocation may be negotiated or determined, and may be received at the eNB at stage 1250. If no legacy UEs remain, the eNB may wish to terminate resource partitioning. At stage 1260, updated resource partitioning information (such as, for example, semi-static subframe allocations) may be provided to any remaining legacy UEs. In addition, the information may also be provided to any WS-UEs.

Figure 13:
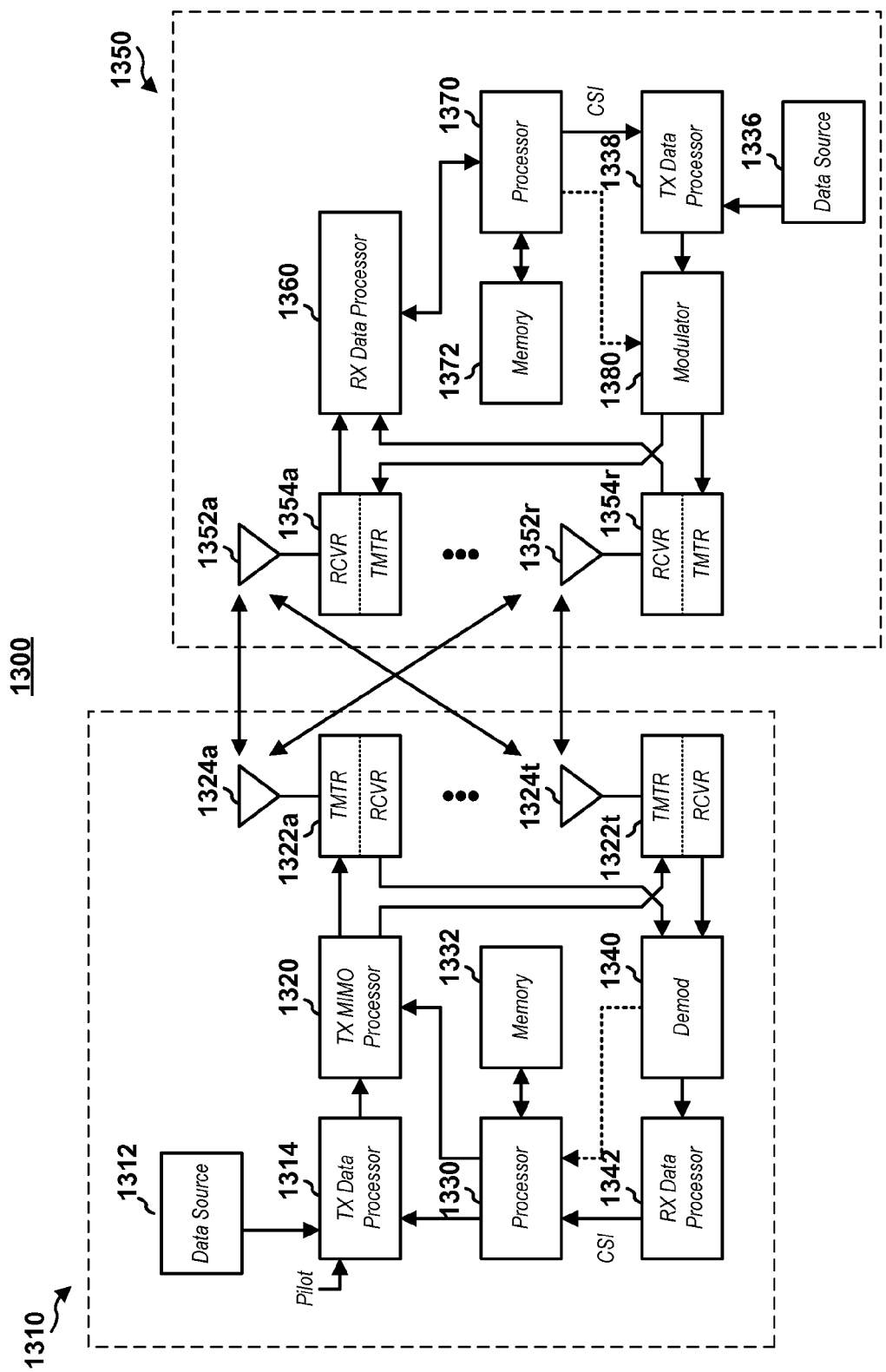
FIG. 13 illustrates details an embodiment of a cognitive network including a UE and eNB which may be WS-enabled.

Attention is now directed to FIG. 13, which illlustrates a system 1300 including a transmitter system 1310 (also known as the access point or eNB) and a receiver system 1350 (also known as access terminal or UE) in an LTE MIMO system 1300. At the transmitter system 1310, traffic data for a number of data streams is provided from a data source 1312 to a transmit (TX) data processor 1314. Each data stream is transmitted over a respective transmit antenna. TX data processor 1314 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1330.

The modulation symbols for all data streams are then provided to a TX MIMO processor 1320, which may further process the modulation symbols (e.g., for OFDM). TX MIMO processor 1320 then provides NT modulation symbol streams to NT transmitters (TMTR) 1322a through 1322t. In certain embodiments, TX MIMO processor 1320 applies beam-forming weights to the symbols of the data streams and to the antenna from which the symbol is being transmitted.

Each transmitter 1322 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1322a through 1322t are then transmitted from NT antennas 1324a through 1324t, respectively.

At receiver system 1350, the transmitted modulated signals are received by NR antennas 1352a through 1352r and the received signal from each antenna 1352 is provided to a respective receiver (RCVR) 1354*a* through 1354*r*. Each receiver 1354 conditions (e.g., filters, amplifies, and down-converts) a respective received signal, digitizes the conditioned signal to provide samples, and further processes the samples to provide a corresponding "received" symbol stream.

An RX data processor 1360 then receives and processes the NR received symbol streams from NR receivers 1354 based on a particular receiver processing technique to provide NT "detected" symbol streams. The RX data processor 1360 then demodulates, de-interleaves, and decodes each detected symbol stream to recover the traffic data for the data stream. The processing by RX data processor 1360 is complementary to that performed by TX MIMO processor 1320 and TX data processor 1314 at transmitter system 1310.

A processor 1370 periodically determines which pre-coding matrix to use (discussed below). Processor 1370 formulates a reverse link message comprising a matrix index portion and a rank value portion. The reverse link message may comprise various types of information regarding the communication link and/or the received data stream. The reverse link message is then processed by a TX data processor 1338, which also receives traffic data for a number of data streams from a data source 1336, modulated by a modulator 1380, conditioned by transmitters 1354*a* through 1354*r*, and transmitted back to transmitter system 1310.

At transmitter system 1310, the modulated signals from receiver system 1350 are received by antennas 1324, conditioned by receivers 1322, demodulated by a demodulator 1340, and processed by a RX data processor 1342 to extract the reserve link message transmitted by the receiver system 1350. Processor 1330 then determines which pre-coding matrix to use for determining the beam-forming weights then processes the extracted message.

Figure 14:
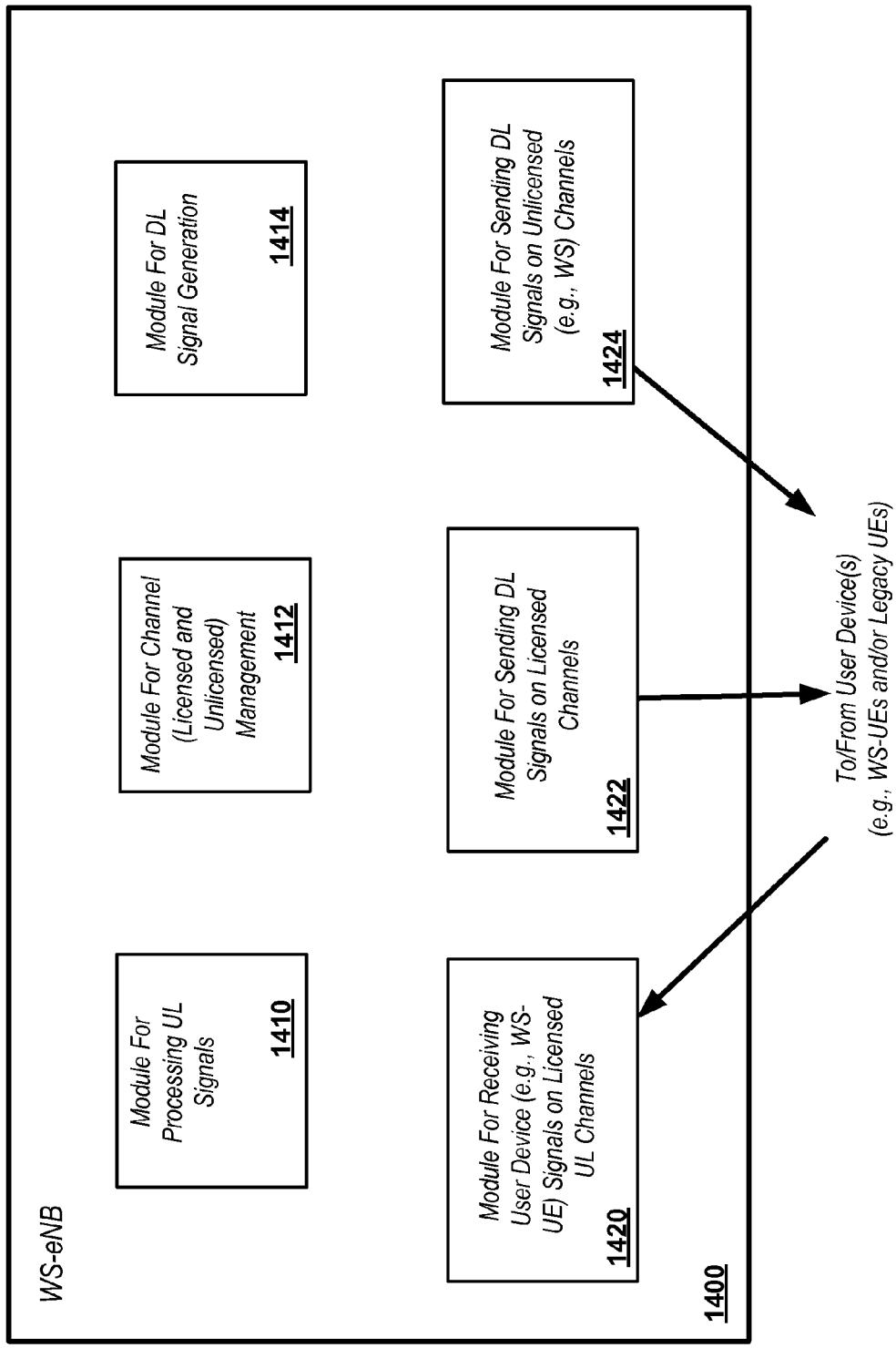
FIG. 14 illustrates details of an embodiment of a white space enabled eNB (WS-eNB).

Attention is now directed to FIG. 14, which illustrates details of an embodiment of a WS-enabled eNB (WS-eNB) 1400 configured for performing functionality as described herein. eNB 1400 may include a module 1420 for receiving signaling from a user device, such as a WS-UE or legacy UE, on a licensed UL channel or channels. eNB 1400 may also include a module 1422 for sending DL signals on one or more licensed channels. These signals may be limited to control signaling, such as synchronization and/or broadcast signaling. In addition, eMB 1400 may include a module 1424 for sending DL signals on one or more unlicensed channels (e.g., white space (WS)) channels. The WS channels may be, for example, WS channels in the UHF television band. The WS signaling provided from module 1424 may be based on a channel switch at a WS-UE, which may be further based on information provided to the UE on a licensed channel from module 1422.

eNB 1400 may further include a processing module 1410 for processing received UL signals, including access requests from UEs as well as other UL signals. eNB 1400 may also include a channel management module 1512, which may be configured for managing licensed and/or unlicensed (e.g., WS) channels and channel assignments. In addition, eNB 1400 may include a signal generation module 1414 for generating DL signals for provision to module 1422 and/or module 1424.

Figure 15:
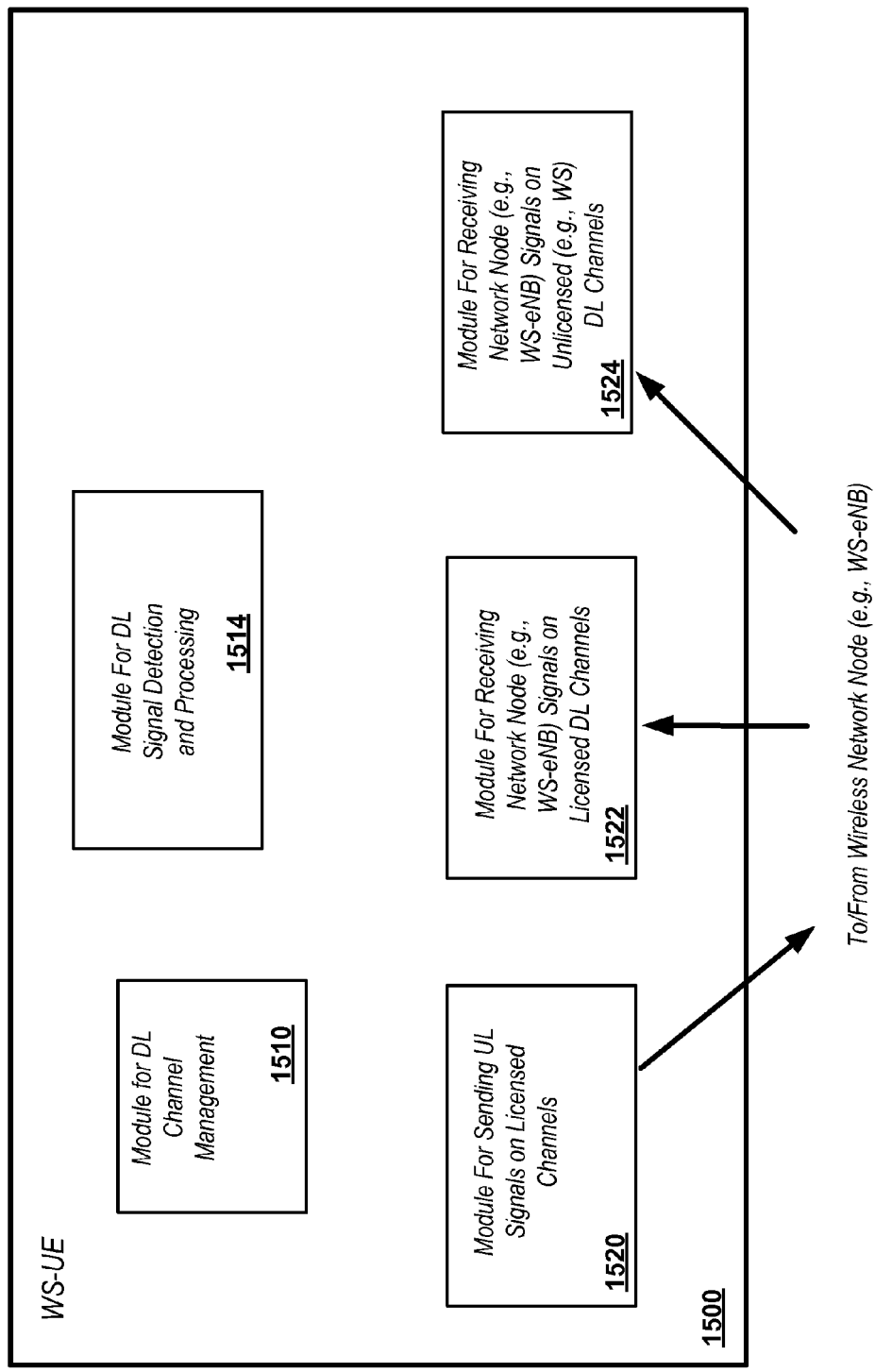
FIG. 15 illustrates details of an embodiment of a white space enabled user equipment (WS-UE).

Attention is now directed to FIG. 15, which illustrates details of an embodiment of a user device such as a WS-enabled user equipment (WS-UE). WS-UE 1500 may include an UL transmission module 1520 configured to send UL signals on licensed channels, such as to a WS-eNB. In some implementations, a WS-UE may also include a module for sending UL signals (not shown) on unlicensed channels (e.g., WS channels). In addition, UE 1500 may include a module 1522 for receiving signals on a licensed DL channel. This module may be the same or similar to that provided in a legacy UE. In addition, UE 1500 may include a module 1524 for receiving signals on one or more unlicensed (e.g., WS) channels. Module 1524 may be utilized in conjunction with modules 1522 and 1520, where initial access to a network node, such as a WS-eNB, is done using licensed channels with modules 1520 and 1522, and the DL transmission may be switched to operation on module 1524 when WS channel information is provided from the WS-eNB.

In addition, UE 1500 may include a channel management module 1510, which may be used to provide channel management and switching between licensed and unlicensed channels. In addition, UE 1500 ma include a module 1514 for signal detection and processing, which may be done in conjunction with signals received at modules 1522 and 1524. This processing may include, among other functions, synchronization processing, broadcast channel processing, channel detection and measurements, RSRP, RSRP, CQI, and/or other signal processing functions.

In some configurations, the apparatus for wireless communication includes means for performing various functions as described herein. In one aspect, the aforementioned means may be a processor or processors and associated memory in which embodiments of the invention reside, such as are shown in FIG. 13, and which are configured to perform the functions recited by the aforementioned means. The may be, for example, modules or apparatus residing in UEs, eNBs and/or other network devices such as are shown. In another aspect, the aforementioned means may be a module or any apparatus configured to perform the functions recited by the aforementioned means.

Figure 16:
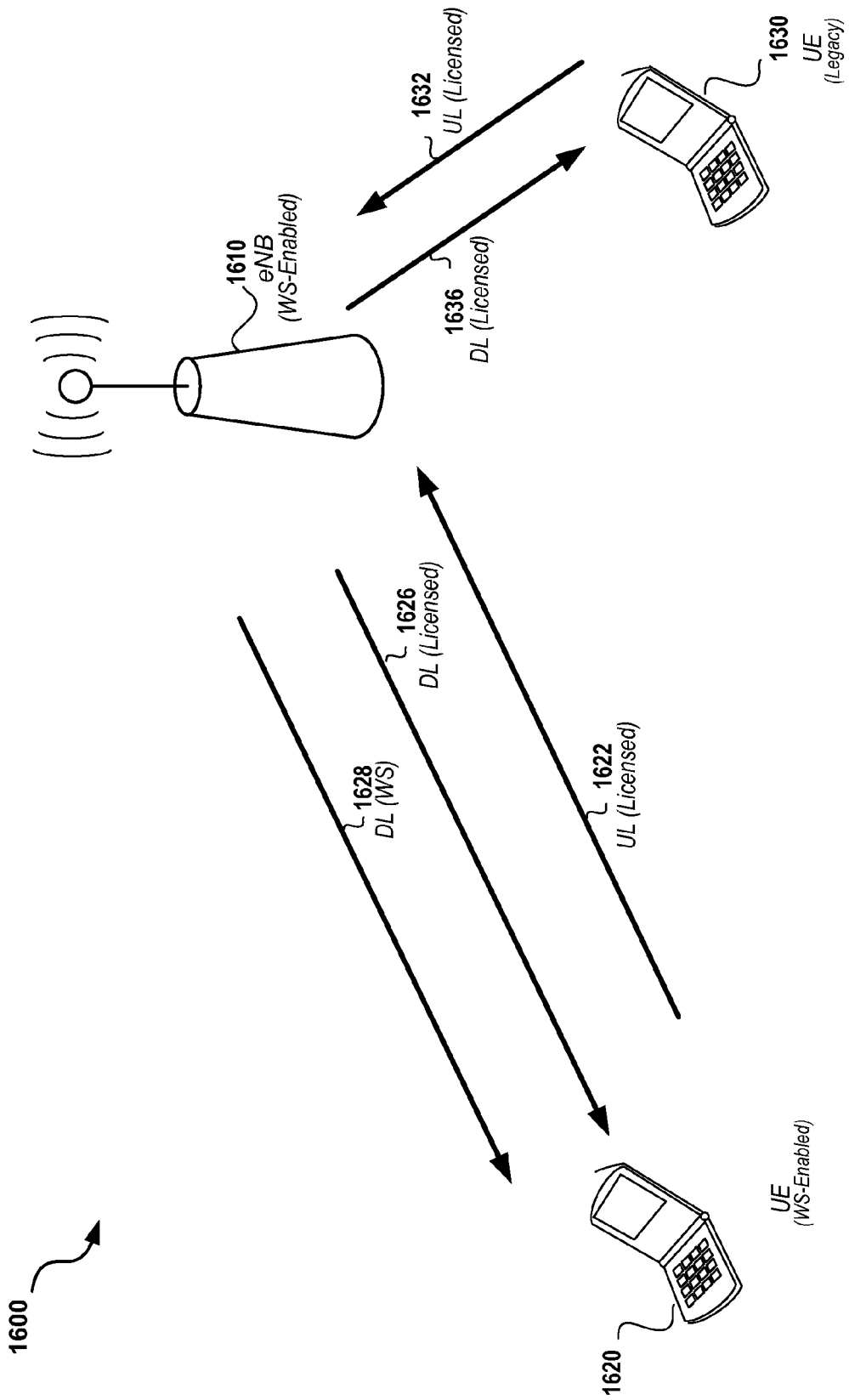
FIG. 16 illustrates an implementation of a WS-enabled LTE system including a legacy and a white space enabled UE.

Attention is now directed to FIG. 16, which illustrates a white space enabled system 1600, which may be part of an LTE advanced (LTE-A) wireless network including WS capability. System 1600 includes a WS-enabled eNB, shown as eNB 1610, which is configured for operation using white spaces, including at least one WS DL channel. In operation, eNB 1610 may receive access requests for its associated cell from a WS-enabled UE, shown as WS-UE 1620, which is configured for operation using white spaces, including at least one WS DL channel. In addition, eNB 1610 may be configured to support connection to legacy UEs, such as legacy UE 1630, which does not include WS functionality.

eNB 1610 may provide legacy connections to legacy UEs such as UE 1630 via a DL connection 1636 in licensed spectrum, as well as an UL connection 1632, also in licensed spectrum. In addition, eNB 1610 may provide WS connections to WS-UEs such as UE 1620 via multiple DL channels, such as DL channel 1626 on licensed spectrum and DL channel 1628 on WS spectrum. In general, a WS-UE will use a licensed channel for UL connections, such as UL connection 1622, however, in some implementations WS spectrum may also be used for UL connections.

Figure 17:
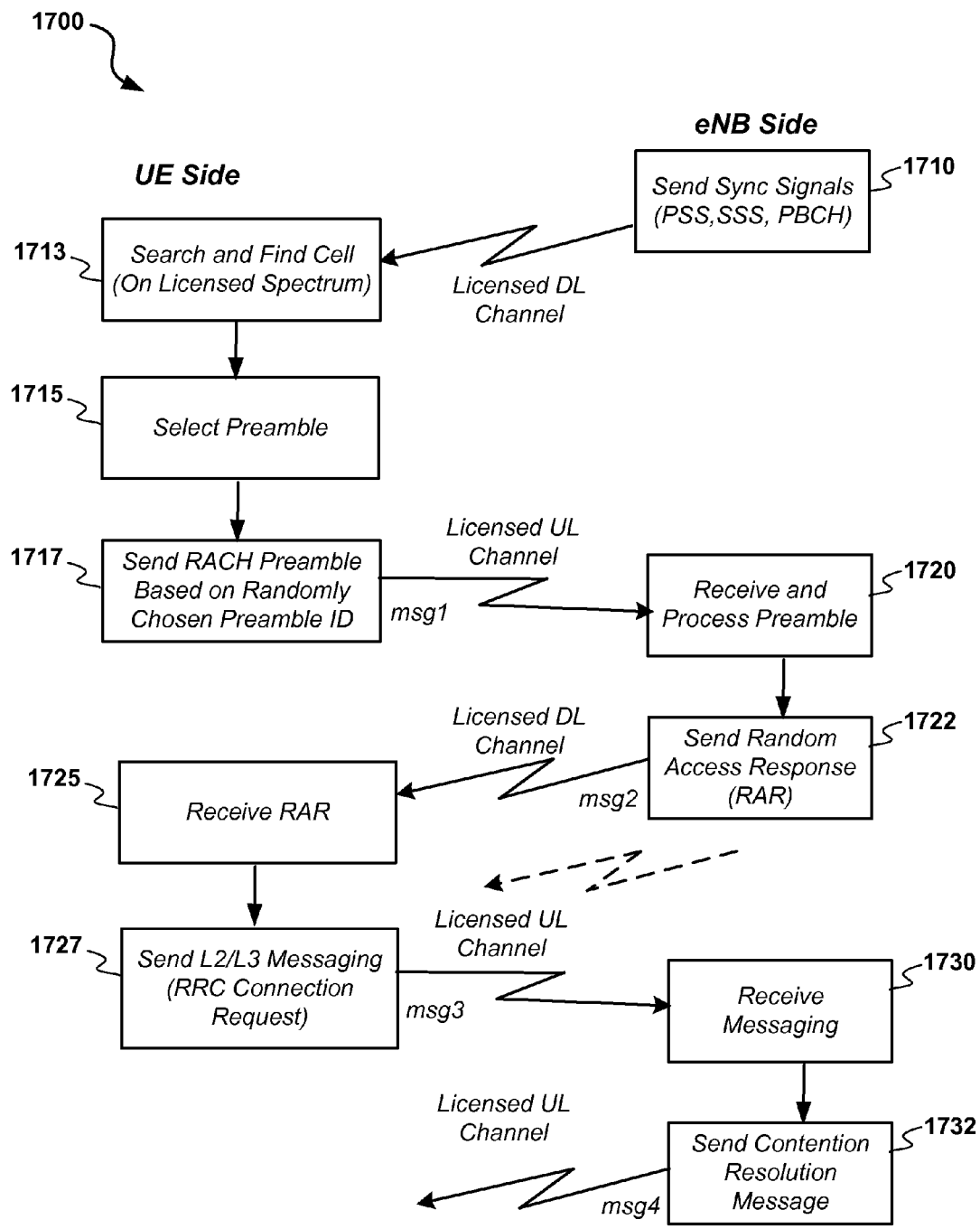
FIG. 17 illustrates details of an embodiment of a process for establishing cell connection using a random access procedure.

In order to support both legacy and WS-enabled devices, it may be desirable to provide efficient connection processing, particularly during initial connection, so that WS-enabled devices may be handed off to WS channels if they are available. To further illustrate this, attention is now directed to FIG. 17, which illustrates an implementation of a contention-based random access procedure 1700 in a legacy LTE system. Processing stages associated with the UE are shown on the left side and eNB processing stages are shown on the right.

An eNB will send signaling it its cell to facilitate connection. This is illustrates at stage 1710, where synchronization signals, such as PSS, SSS, and PBCH signaling is provided within the cell range. This signaling is provided in licensed spectrum on a licensed DL channel. A UE entering the cell and wishing to camp will search the licensed spectrum for available eNBs at stage 1713. This stage may include performing synchronization and receiving broadcast information. The broadcast information may be provided on a SIB, which may include cell information including available time-frequency resources (i.e., resource elements within time-frequency resource blocks) allocated for random access (which may be in a physical random access channel (PRACH).

At stage 1715, after initial synchronization, the UE may select a cell ID from an available set of preambles. In one LTE implementation, 64 legacy cell IDs may be available, and a cell ID may be selected at random. A random access preamble may then be generated based on the cell ID. At stage 1717, the preamble may be sent to the eNB on a licensed UL channel using allocated time-frequence resources associated with the cell ID. The eNB may then receive and process the preamble at stage 1720, and may then send a random access response (RAR) based on the preamble on the licensed DL channel. At stage 1725, the UE may receive the RAR and may then generate and send L2/L3 messaging at stage 1727, such as, for example, an RRC connection request. This message may be denoted as "msg3," via the licensed UL channel, which may then be further processed at the eNB up to the radio resource control (RRC) level. The processing may include contention-based processing to facilitate handling requests from multiple UEs at stage 1732, where the UE may be configured to wait and send subsequent preambles depending on data provided from the eNB.

Figure 18:
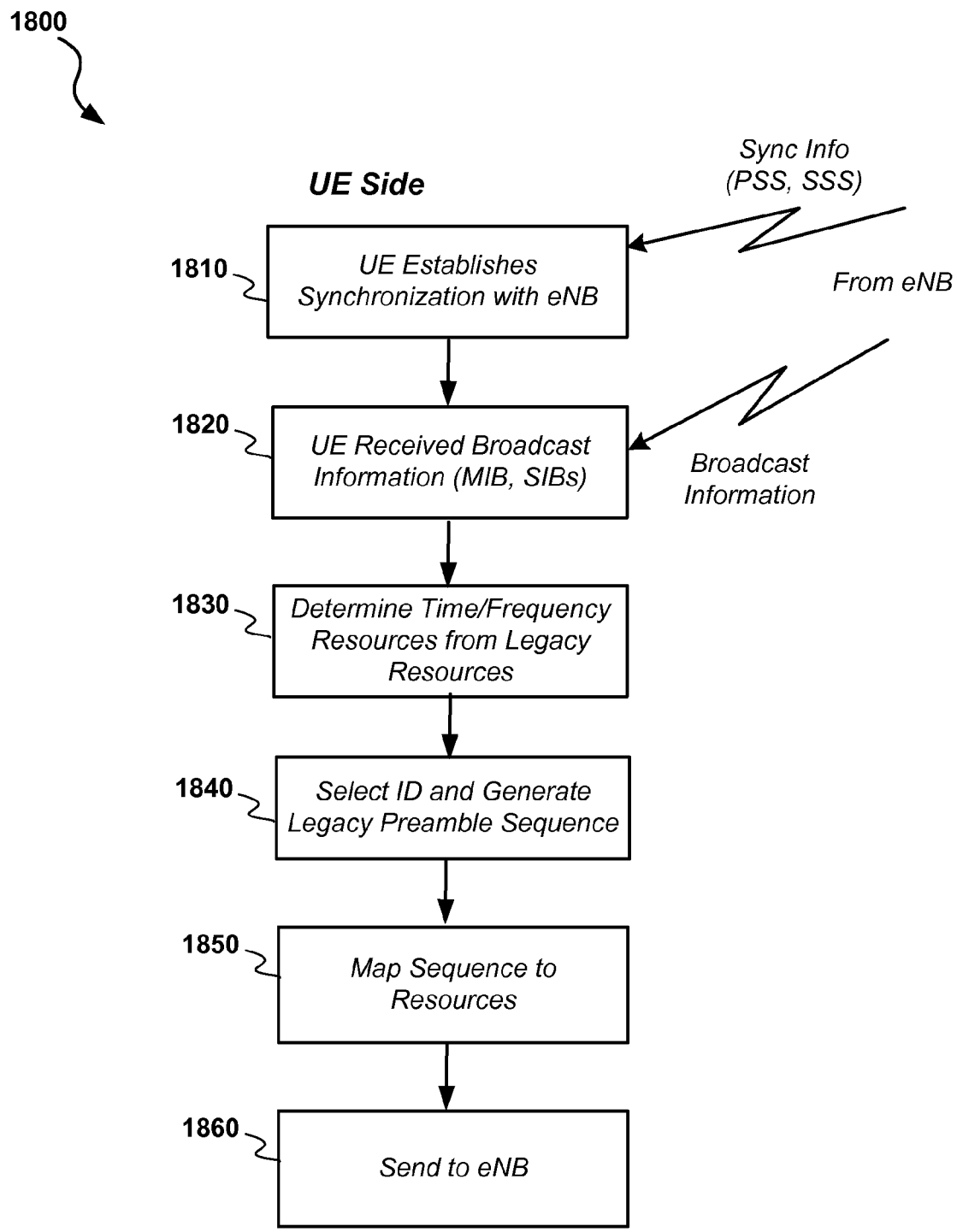
FIG. 18 illustrates an embodiment of a random access procedure.

Attention is now directed to FIG. 18, which illustrates a process 1800 to provide random access channel (RACH) signaling from a UE to an eNB in a legacy system. Process 1800 may be implemented on a UE such as UE 430 of FIG. 4. At stage 1810, the UE searches for available eNBs, and upon detection, performs synchronization. Once synchronized, the UE may then receive broadcast information at stage 1820, which may be information provided in the MIB and/or SIBs. At stage 1830, the UE may extract RACH resource information (e.g. allocated time-frequency resources) provided in information elements (IEs) in one or more SIBs. At stage 1840, the UE may select an ID and generate a legacy preamble sequence, which may be, for example, one of 64 available zadoff-chu sequences. At stage 1850, the sequence may be mapped to the provided resource information, with the preamble sequence sent at stage 1860 in the resource, which may be in the physical random access channel (PRACH).

As noted previously, the DL processing as shown in FIGS. 17 and 18 is done on legacy systems solely using licensed DL channels. However, use of WS channels may be advantageous where WS-enabled nodes are used. Moreover, fast transfer of operation to WS channels may be desirable to reduce loading and overhead on licensed channels. However, there is no mechanism for signaling an eNB whether the UE is WS-enabled or merely a legacy UE.

Figure 19:
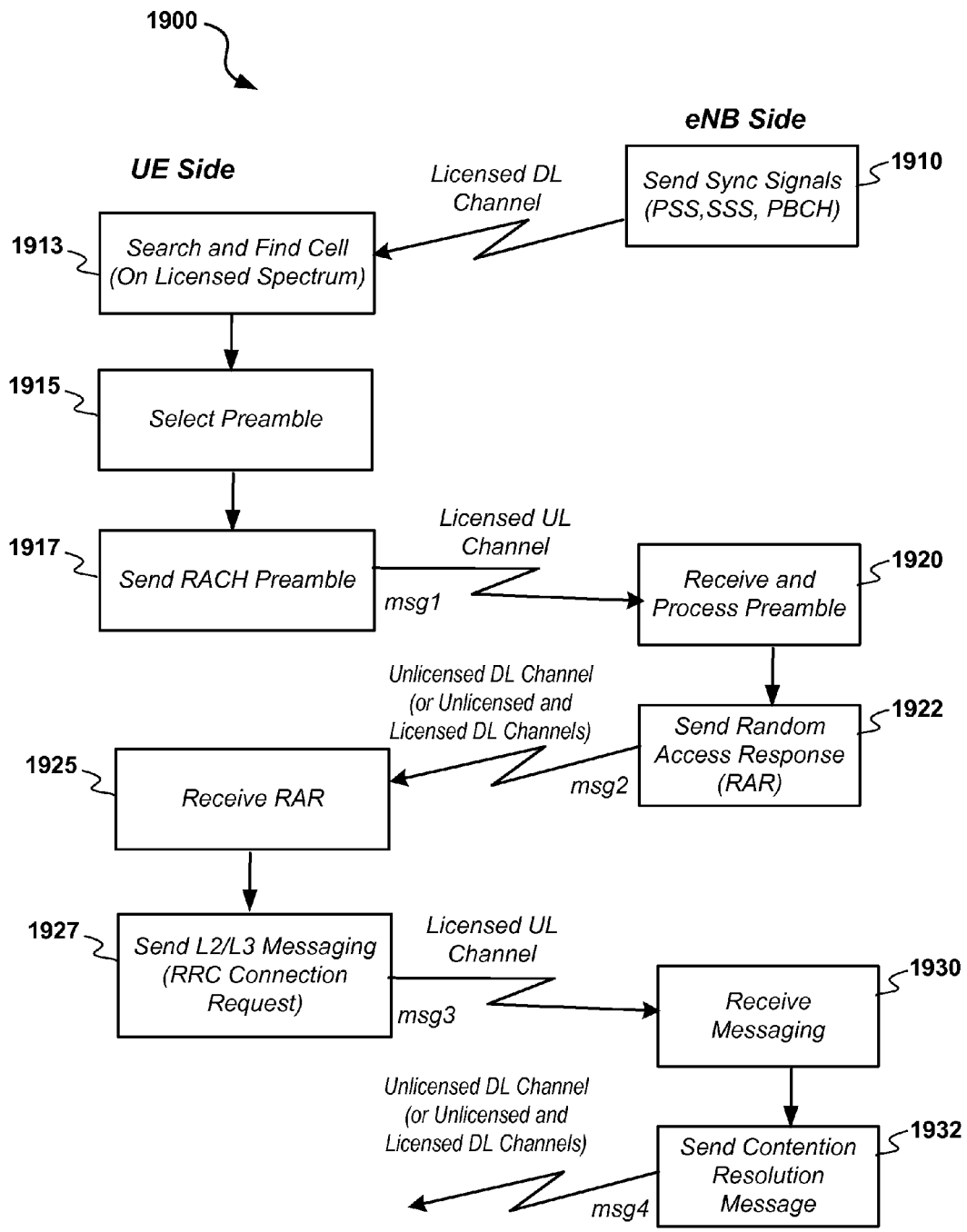
FIG. 19 illustrates details of an embodiment of a process for establishing cell connection using a random access procedure.

FIG. 19 illustrates one embodiment of a process 1900 for providing UE type information related to WS capability to a WS-enabled eNB. At stage 1910, a WS-eNB sends synchronization signals on a licensed DL channel, which may then be used by a WS-UE to perform search and synchronization at stage 1913. At stage 1915, the UE may select a preamble, which may be based on legacy IDs and associated preamble, or may be based on WS-specific preambles as further described below. At stage 1917, the preamble may be sent on a particular time-frequency resource. The resource may be based on legacy resource allocation or may be based on WS-specific resource allocation as further described below.

This transmission is done on a licensed UL channel, where it may then be received and processed at the WS-eNB at stage 1920. At stage 1922, the WS-eNB may generate and send a random access response (RAR). Based on the UL transmission, the eNB may handoff further DL transmissions, which may start at transmission of the RAR, to one or more WS channels. In addition, DL transmissions may be provided on both a WS channel and a licensed channel and/or on multiple WS channels. At stage 1925, the UE may receive the RAR, which may be on a WS receiver or on both a WS receiver and a licensed channel receiver. Further transmissions may proceed as shown in FIG. 19.

Figure 20:
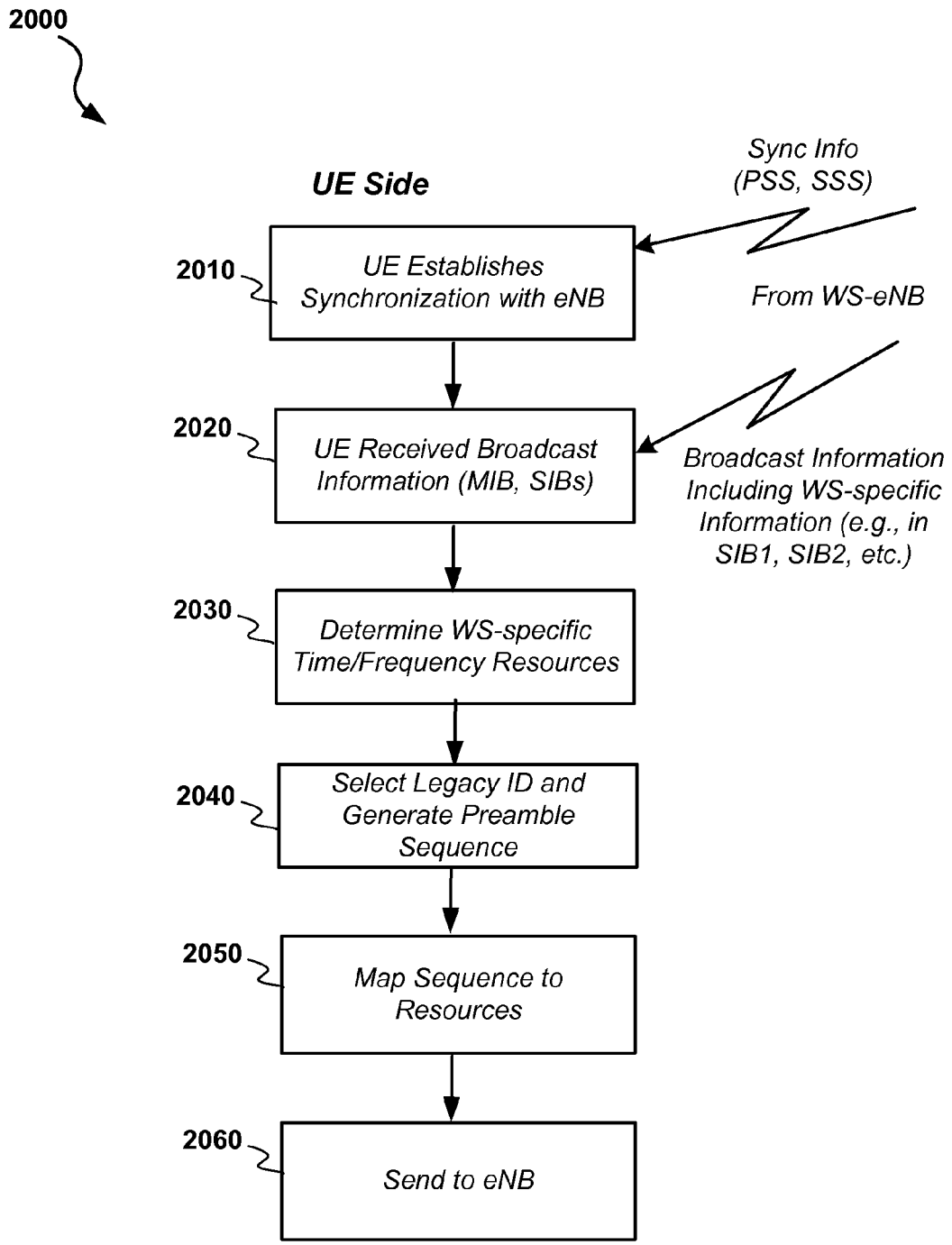
FIGS. 20-23 illustrate embodiments of random access procedures.

Attention is now directed to FIG. 20, which illustrates details of one embodiment of a process 2000 for UE transmission of WS capability to a WS-enabled eNB. At stage 2010, the UE may establish synchronization with the eNB, such as may be done based on signals received on a licensed DL channel as described previously. Following synchronization, at stage 2020 the UE may receive broadcast information. The broadcast information may include legacy MIB and SIB IEs. In addition, the broadcast information may include WS-specific information, which may be provided in, for example, additional IEs in SIB1, SIB2, or in other SIBs. In one implementation, a SIB may include both legacy IEs as well as WS-specific IEs, which may provide information related to WS operation.

At stage 2030, the UE may determine WS-specific time-frequency resources for transmission of the preamble. In one implementation, the SIB may include alternate WS time-frequency resource allocations for use in transmitting information from WS-enabled UEs. These resources will be different from legacy resources, so that the eNB may determine, based on presence of the preamble in the WS resource, that the UE is WS-enabled.

At stage 2040, an ID may be selected, and a preamble may be generated. The ID may be a legacy ID, with generation of a legacy preamble. At stage 2050, the preamble may be mapped to the WS resource and transmitted to the eNB at stage 2060

Upon reception at the WS-eNB, the eNB may determine that the UE is WS-enabled based on location of the preamble in the WS-specific resource allocation. The UE may then initiate handoff of the DL to a WS channel.

Figure 21:
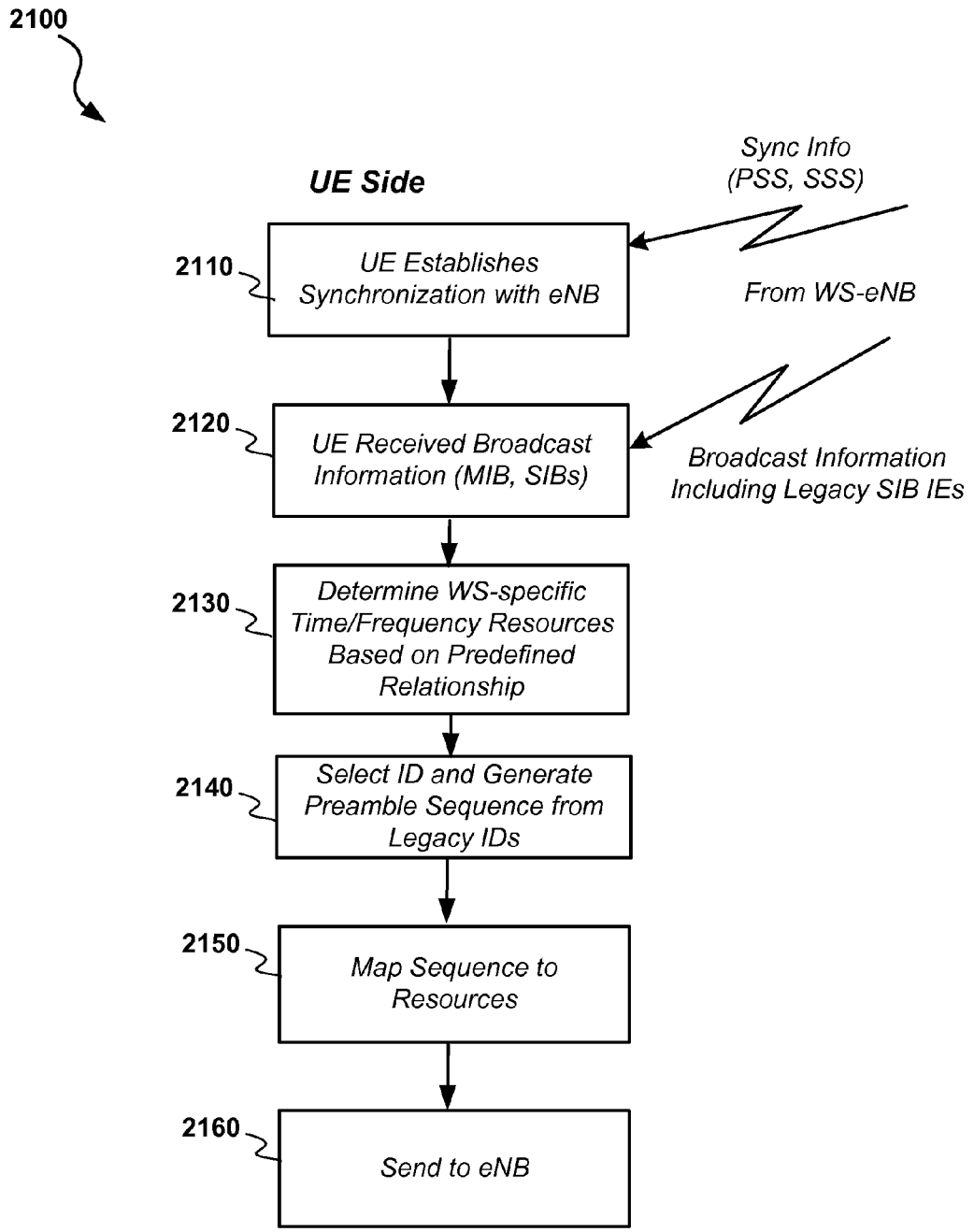

FIG. 21 illustrates another embodiment of a process for UE transmission of WS capability. Process 2100 may begin at stage 2110, with the UE establishing synchronization with a WS-eNB, such as may be done based on signals received on a licensed DL channel as described previously. Following synchronization, at stage 2120 the UE may receive broadcast information. In this implementation, the broadcast information may include only legacy MIB and SIB IEs.

At stage 2130, the UE may determine time-frequency resources for transmission of the preamble. These may be based on a predefined relationship between time-frequency resources allocated for legacy implementations. For example, the predefined relationship may be a time and/or frequency offset from the legacy resource allocation. Examples are further described and illustrated below with respect to FIGS. 13A-13C. Other predefined relationships may also be used.

At stage 2140, an ID may be selected, and a preamble may be generated. The ID may be a legacy ID, with generation of a legacy preamble. At stage 2150, the preamble may be mapped to the WS resource and transmitted to the eNB at stage 2160.

Upon reception at the WS-eNB, the eNB may determine that the UE is WS-enabled based on location of the preamble in the WS-specific resource allocation. The UE may then initiate handoff of the DL to a WS channel.

Figure 22:
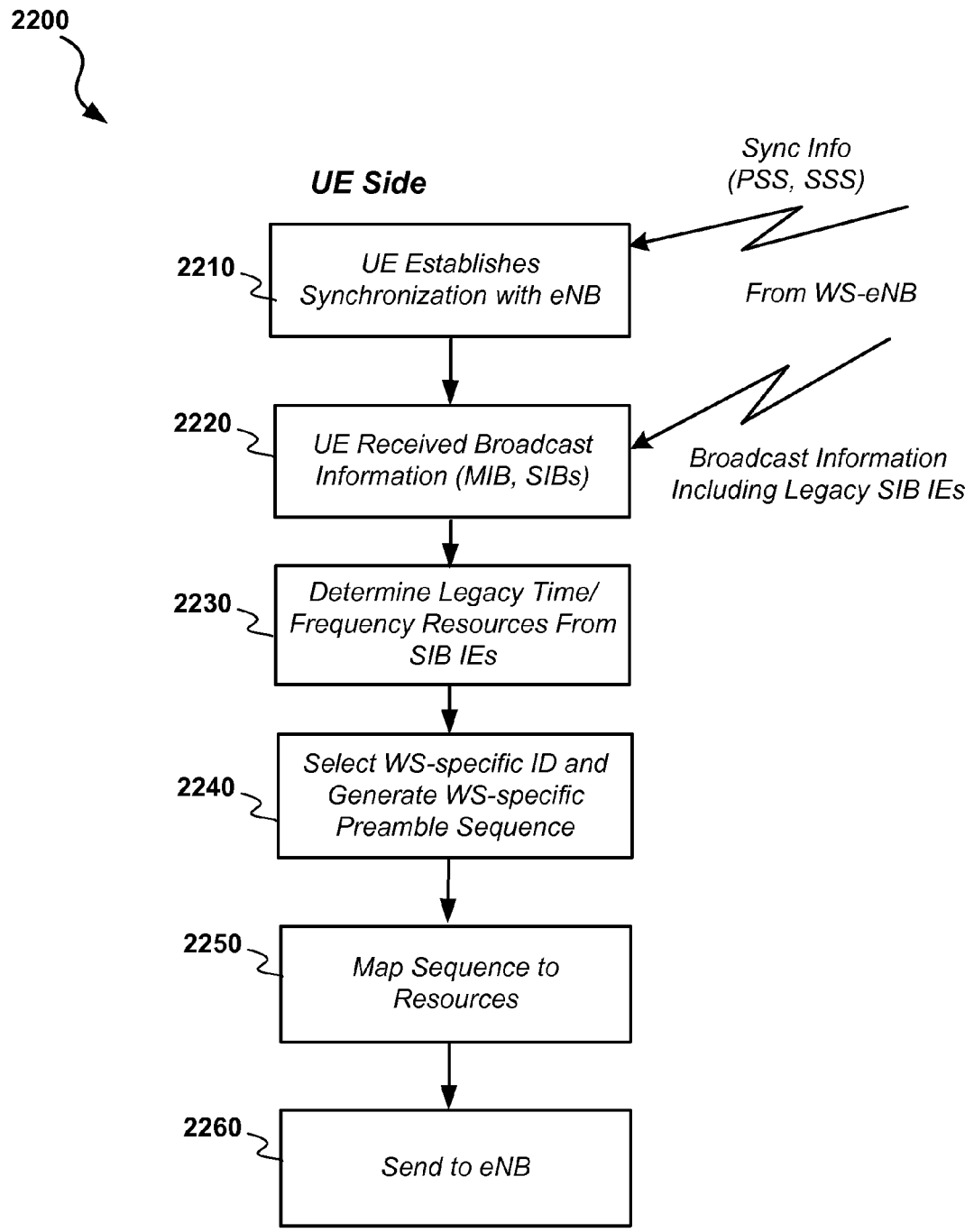

FIG. 22 illustrates another embodiment of a process for UE transmission of WS capability. Process 2200 may begin at stage 2210, with the UE establishing synchronization with a WS-eNB, such as may be done based on signals received on a licensed DL channel as described previously. Following synchronization, at stage 2220 the UE may receive broadcast information. In this implementation, the broadcast information may include only legacy MIB and SIB IEs.

At stage 2230, the UE may determine time-frequency resources for transmission of the preamble. These may be based on legacy resource information, which may be provided in the SIBs.

At stage 2240, an ID may be selected, and a preamble may be generated. In this implementation, the ID may be a WS-ID, which may be selected from a set of IDs associated only with WS-UEs. A WS preamble sequence may then be generated using this ID. Preambles may be generated so as to be substantially orthogonal to preamble generated in legacy implementations. At stage 2250, the WS preamble may be mapped to the resource and transmitted to the eNB at stage 2260.

Upon reception at the WS-eNB, the eNB may determine that the UE is WS-enabled based on the WS-specific preamble. The UE may then initiate handoff of the DL to a WS channel.

Figure 23:
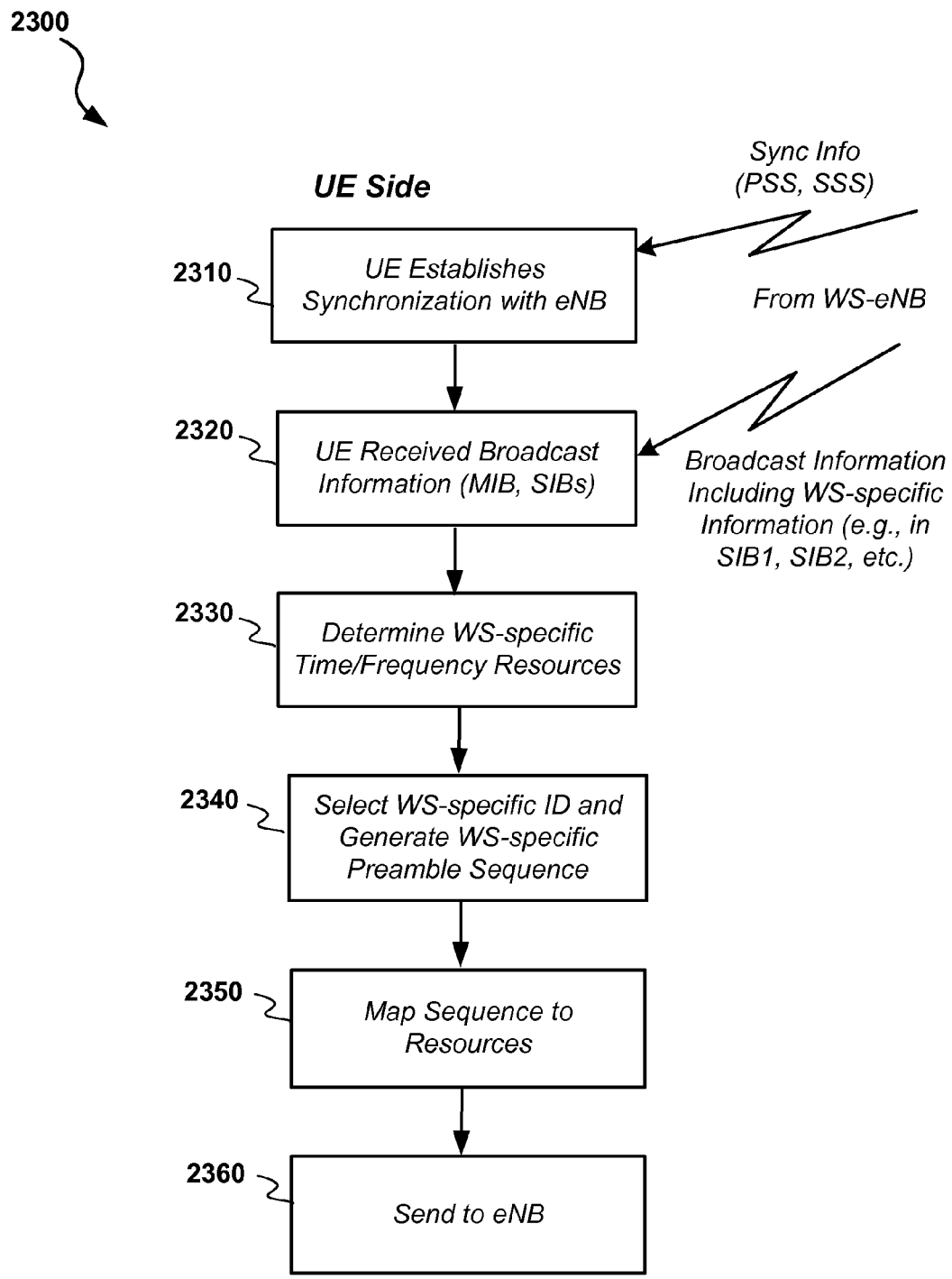

FIG. 23 illustrates another embodiment of a process for UE transmission of WS capability. Process 2300 includes a combination of WS-specific resources and WS-specific ID and WS-specific preamble. Process 2300 may begin at stage 2310, with the UE establishing synchronization with a WS-eNB, such as may be done based on signals received on a licensed DL channel as described previously. Following synchronization, at stage 2320 the UE may receive broadcast information. The broadcast information may include legacy MIB and SIB IEs. In addition, the broadcast information may include WS-specific information, which may be provided in, for example, additional IEs in SIB1, SIB2, or in other SIBs. In one implementation, a SIB may include both legacy IEs as well as WS-specific IEs, which may provide information related to WS operation.

At stage 2330, the UE may determine WS-specific time-frequency resources for transmission of the preamble. In one implementation, the SIB may include alternate WS time-frequency resource allocations for use in transmitting information from WS-enabled UEs. These resources will be different from legacy resources, so that the eNB may determine, based on presence of the preamble in the WS resource, that the UE is WS-enabled.

At stage 2340, an ID may be selected, and a preamble may be generated. In this implementation, the ID may be a WS-ID, which may be selected from a set of IDs associated only with WS-UEs. A WS preamble sequence may then be generated using this ID. Preambles may be generated so as to be substantially orthogonal to preamble generated in legacy implementations. At stage 2350, the WS preamble may be mapped to the resource and transmitted to the eNB at stage 2360.

Upon reception at the WS-eNB, the eNB may determine that the UE is WS-enabled based on location of the preamble in the WS-specific resource allocation and/or based on the WS-specific preamble. The UE may then initiate handoff of the DL to a WS channel.

In another embodiment, a process similar to process 2300 may be implemented, with the WS resources determined based on a predefined relationship as described previously with respect to process 2100. In some embodiments, the processes described previously may be used in UE handover between eNBs in different cells.

Figure 24:
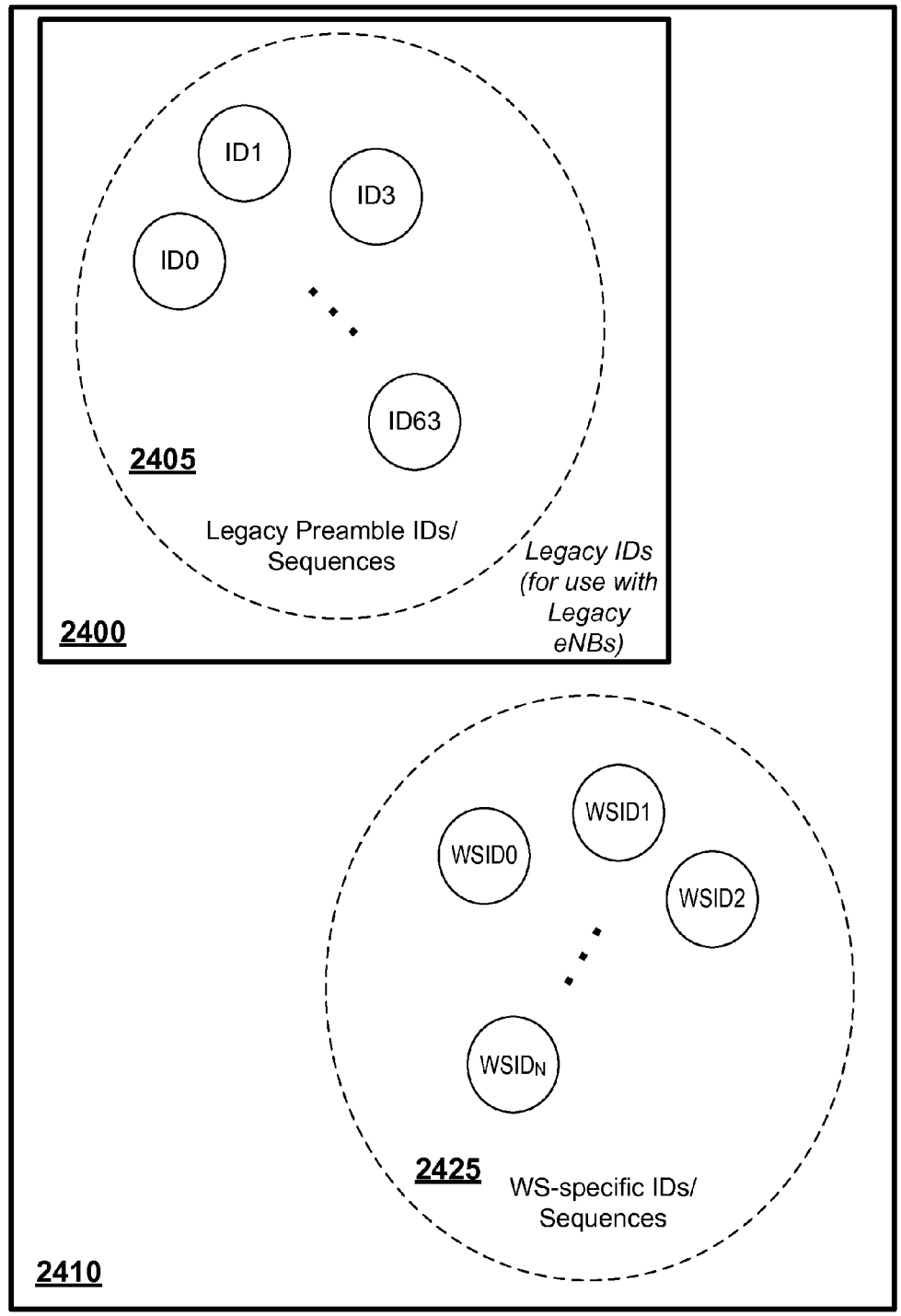
FIG. 24 illustrates example cell IDs for WS-enabled LTE networks.

Attention is now directed to FIG. 24, which illustrates an example set of IDs 2400 and associated preamble sequences that may be used in a WS-enabled system including a WS-UE and WS-eNB. Set 2400 may include legacy IDs 2405, which may be based on the 64 ID set defined in the LTE Release 8 Specifications. These IDs may be used in implementations where a WS-UE is connecting to a legacy eNB.

In addition, set 2400 may include a set of WS-specific IDs 2425, which may be used in implementations where a WS-UE is connecting with a WS-eNB, such as described previously with respect to FIGS. 22 and 23.

Figure 25A:
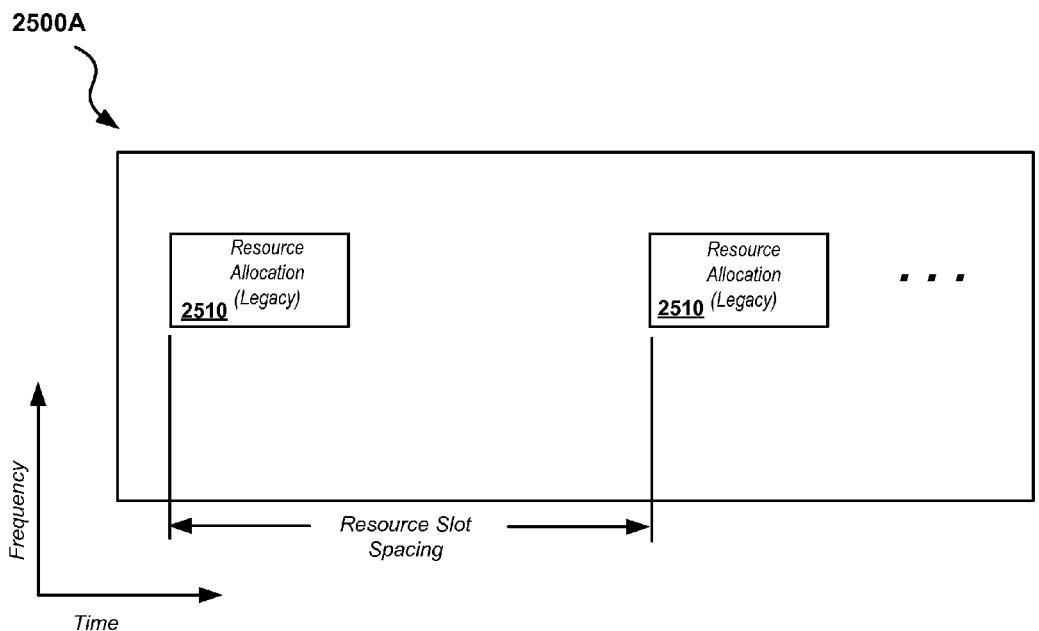

Attention is now directed to FIG. 25A, which illustrates an example legacy time-frequency resource allocation for RACH signaling. As shown, resources 2510 may be allocated to a particular set of UL resource elements in one or more resource blocks. This allocation may be in the PRACH as defined in the LTE Release 8 Specifications.

Figure 25B:
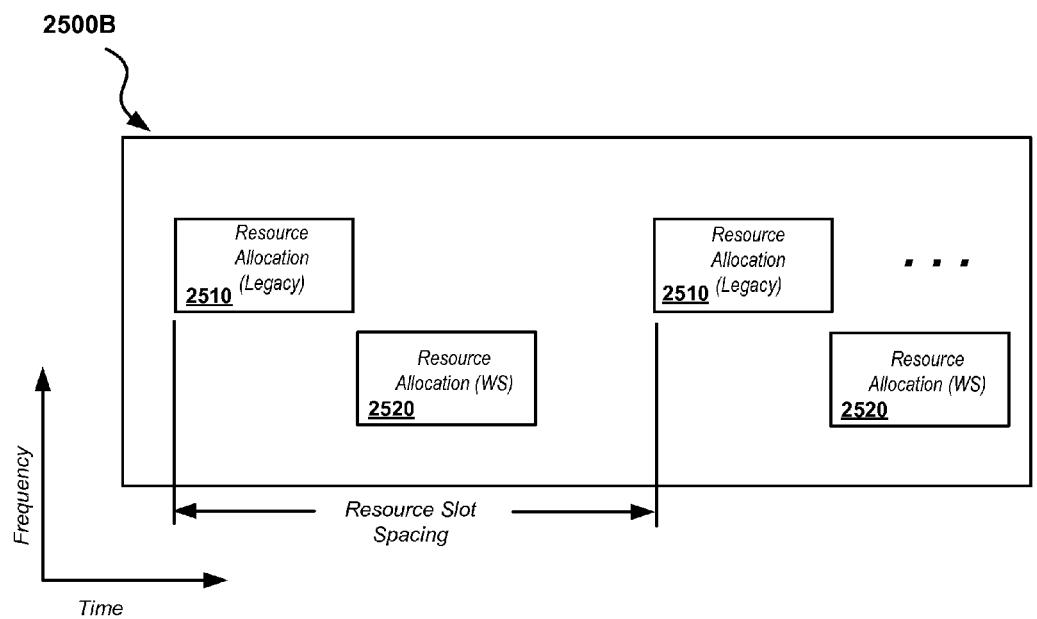

FIG. 25B illustrates one embodiment of WS-specific resource allocation. Assuming a legacy resource allocation 2510, a WS-specific allocation may be defined in different time-frequency resources 2520. These resources may be offset in time, frequency, or both relative to the legacy resource allocation and may be specified as a particular resource allocation or allocations, such as in a SIB.

FIG. 25C illustrates another embodiment of WS-specific resource allocation. In this implementation, the WS-specific resource allocation is provided in accordance with a pre-defined relationship. This relationship may be, for example, a predefined offset from a legacy resource allocation. As shown in FIG. 25A, one example relationship is offsetting the WS-specific allocation in time by a fixed amount relative to the legacy allocation. Other relationships may also be used in various implementations.

Figure 26:
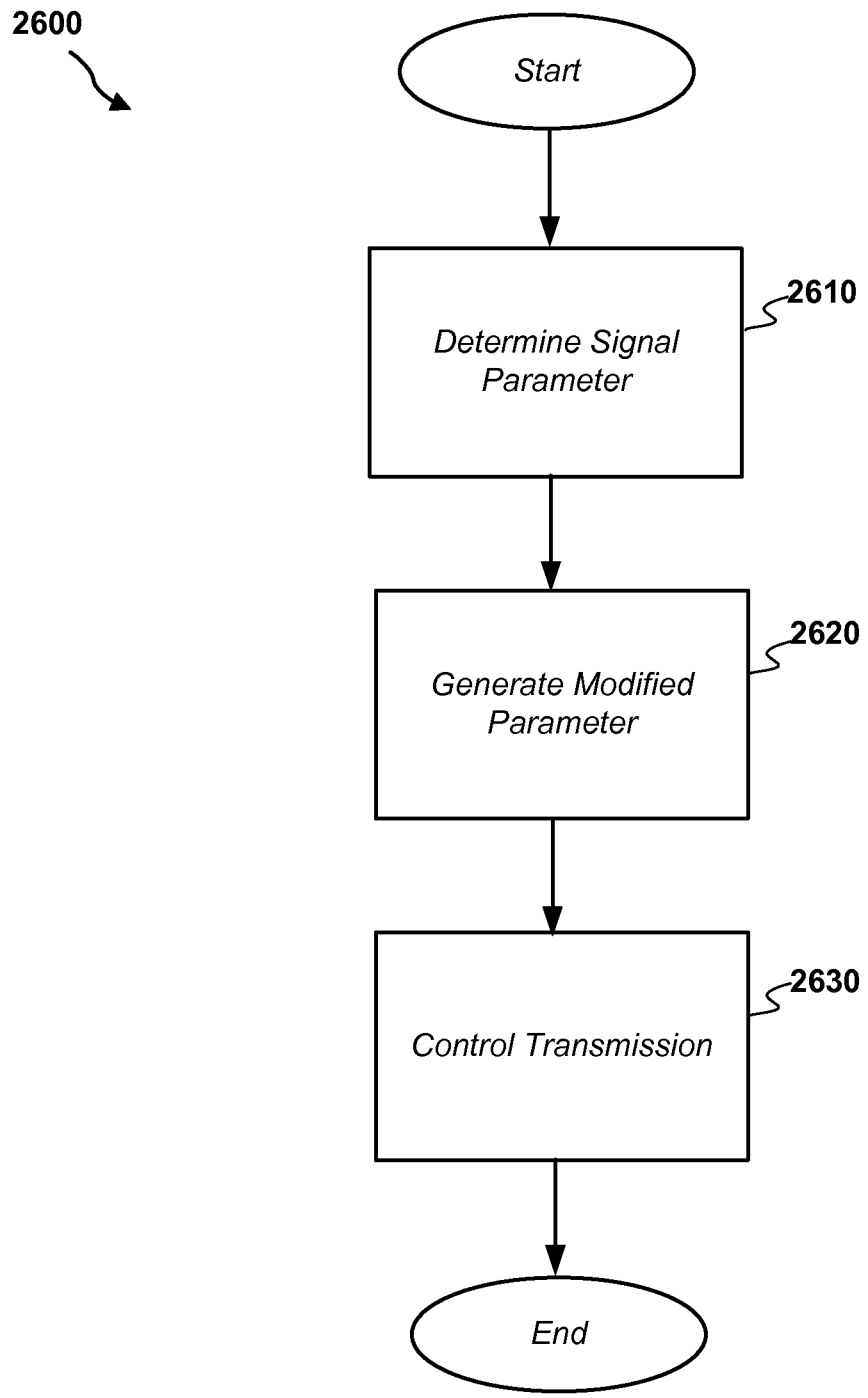
FIG. 26 illustrates a process for providing wireless communications.

Attention is directed to FIG. 26, which illustrates an embodiment of a process 2600 for bias adjustment. At stage 2610, a signal parameter may be determined, such as at a WS-enabled UE. The signal parameter may be related to a received signal, which may be a reference signal. The parameter may be a power metrics, which may be an RSRP or RSRQ. The parameter may be based on a WS channel from which the signal is received. At stage 2620, a modified parameter may be generated. The modified parameter may be based on a correction applied to the signal parameter, such as a correction for differences between the path loss in the received channel and a path loss in a second channel, which may be a licensed channel. At stage 2630, a transmission may be controlled based in part on the modified parameter. The transmission may be, for example, an UL transmission in a licensed channel. The transmission may be adjusted to compensate for path loss differences between a WS channel and a licensed channel.

In another aspect, when a first preamble is be transmitted during random access in an LTE system, a transmit power evaluation based on a target receive power and estimated DL path loss is used. This is described in 3GPP specification 36.212, Section 6.1. However, this may create problems similar to those described previously. For example, in a frequency division duplex (FDD) WS implementation, DL path loss may be too optimistic to provide the above information.

Based on UL/DL band separation, a UE may add a bias factor to the estimated DL path loss when evaluating msg1 transmit power. In effect, a bias, which may be similar to that described previously, but generally of opposite polarity, may be determined and sent from a UE to a WS-enabled eNB. Consequently, the bias will typically be a positive value, thereby increasing the actual msg1 power. In one embodiment, the bias may be determined as:

$$ULPL = DLPL + \text{Bias}(fsep) + \text{Bias}SIB1$$

Where ULPL is the UL path loss, DLPL is the DL path loss, and Bias (fsep) and BiasSIB1 are as described previously. The transmit power from a WS-enabled eNB may then be adjusted in accordance with the determined UL path loss parameter.

Figure 27:
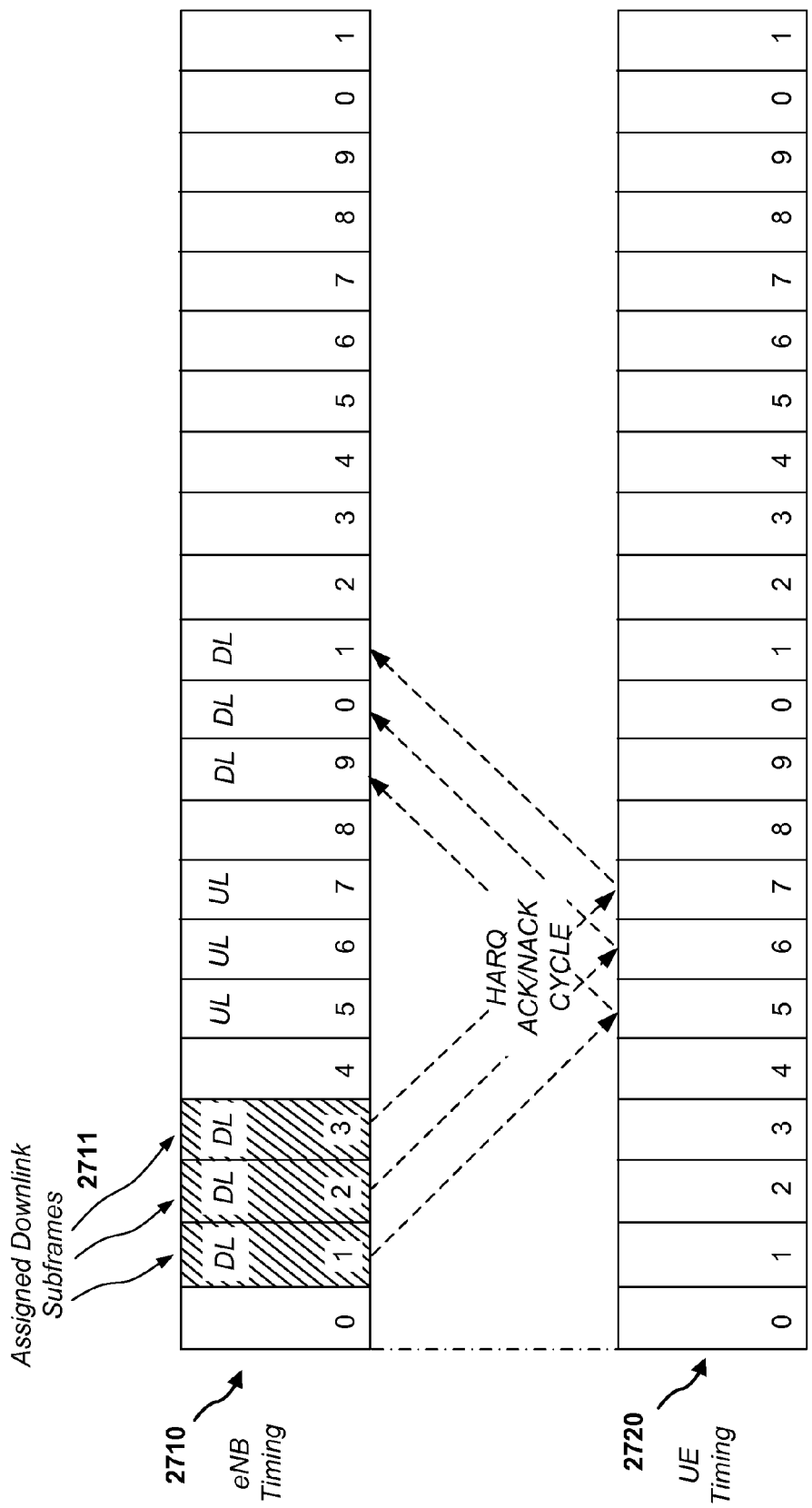
FIG. 27 shows a timing diagram illustrating resource partitioned DL and UL signaling.

In WS-enabled systems, other problems may arise when communications include both licensed and WS channels. For example, if the UL uses a licensed channel, in some LTE systems a co-channel deployment may be used to mitigate inter-cell interference. For example, in heterogeneous network implementations, subframes may be allocated to two or more eNBs such that each eNB has one or more exclusive subframes which may not be used by the other eNBs (i.e., the subframes may be partitioned between multiple eNBs for exclusive use). As a consequence, only certain subframes may be available for UL transmission. However, if a WS channel is used for the DL, channel partitioning may not be used. This is illustrated in FIG. 27, where timing diagram 2710 represents eNB timing in a partitioned system where subframes 1, 2, and 3 are allocated for use in DL transmission from an eNB. In implementing HARQ in one embodiment, the corresponding UE must reply with an ACK/NACK four subframes after the eNB transmission. This is illustrated in UE timing diagram 2720, where the UE will send an ACK/NACK responsive to the eNB transmission in subframe 1 at subframe 5, and corresponding ACK/NACKS from subframes 2 and 3 at subframes 6 and 7, respectively.

Figure 28:
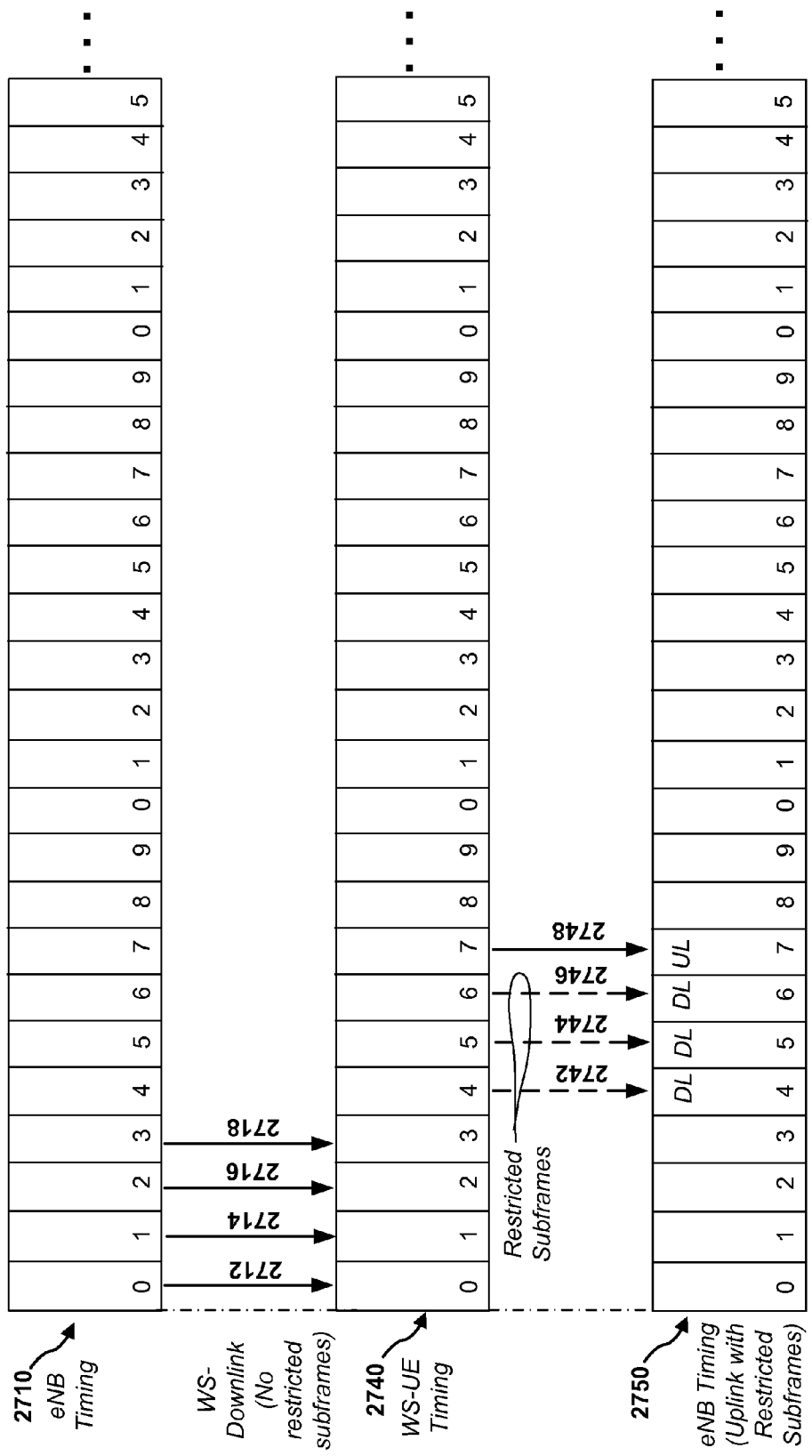
FIG. 28 shows a timing diagram illustrating WS timing conflicts.

In WS-enabled systems, however, all subframes may be available for DL transmission (for example, in the WS channels), however, only certain subframes may be available to the UE for UL transmission if the subframe partitions are interleaved. This would be the case if, for example, resource partitioning is implemented on the licensed UL channel, but not on the WS DL channel. Consequently, HARQ ACK/NACK responses that should be sent in certain subframes (i.e., typically 4 subframes after a corresponding DL transmission) may not be allowed due to restrictions on UL transmissions during those time slots/subframes. This is shown in FIG. 28, which illustrates restricted slots 4, 5, and 6 in UL in the licensed channel shown in timing diagram 2750. Timing diagram 2710 corresponds to diagram 2710 of FIG. 27. Assuming DL transmissions are provided in subframes 0, 1, 2, and 3 (illustrated in transmissions 2712, 2714, 2716, and 2718) from an eNB to a WS-UE, in order to maintain HARQ, corresponding UL transmissions would be expected in subframes 4, 5, 6, and 7 (shown as transmissions 2742, 2744, 2746, and 2748). However, in this example, subframes 4, 5, and 6 may be allocated for DL as shown in diagram 2750. Consequently, an eNB would not be expected to receive ACK/NACK transmissions during those subframes. Therefore, ACK/NACK signals 2742, 2744, and 2746 would be prohibited. Subframe 7 may be allocated for UL as shown in diagram 2750, in which case the ACK/NACK from the DL transmission 2748 in subframe 7 could still be sent during this subframe since it is allocated for UL transmission.

Figure 29:
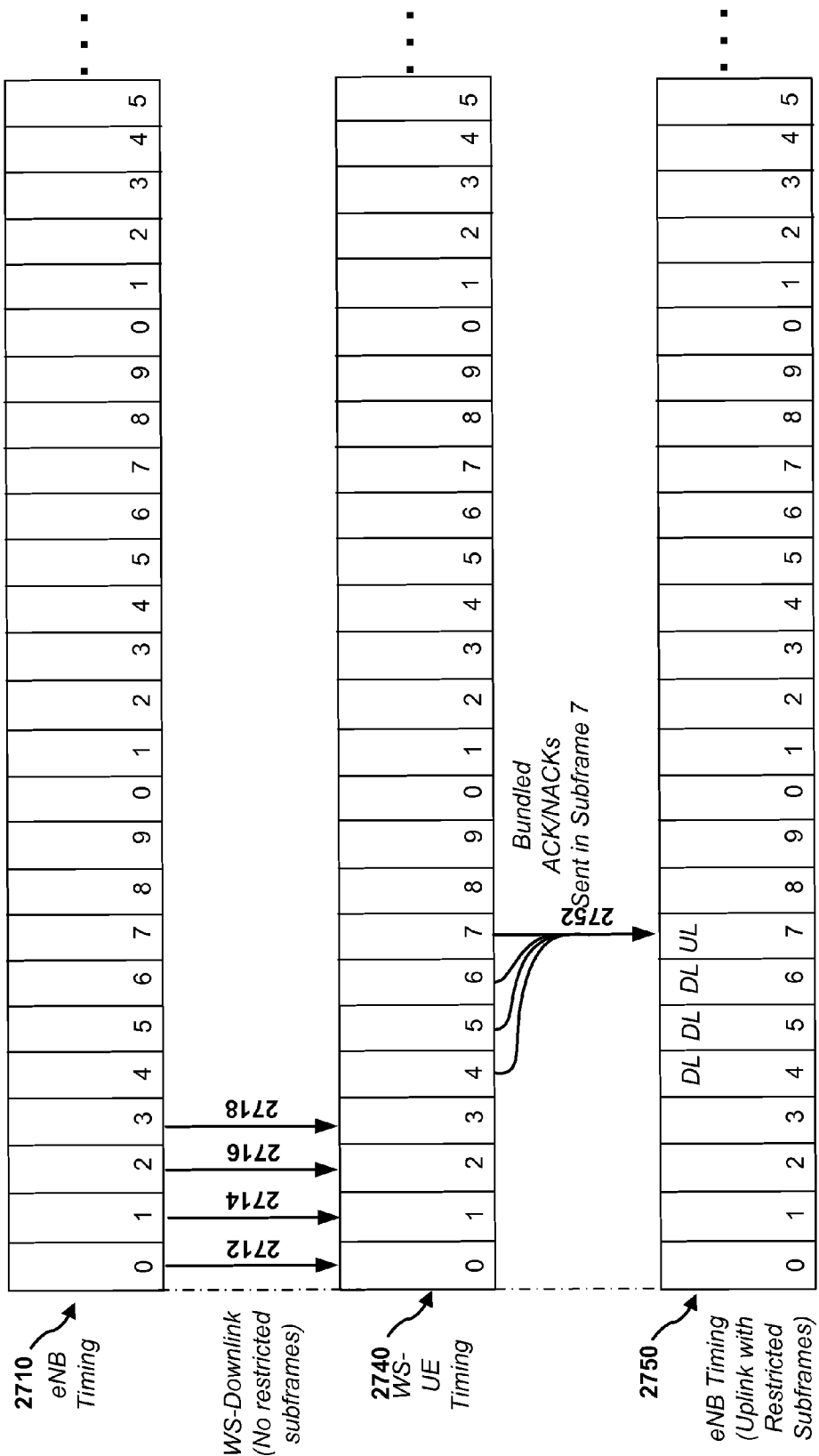
FIG. 29 shows a timing diagram illustrating an embodiment of bundled ACK/NACK transmission.

One approach to addressing this concern is to provide bundled ACK/NACK in the next available subframe as a bundled HARQ UL report. A bundled ACK/NACK is a response that combined ACK/NACKs from multiple signals into a combined or bundled response. An example implementation is shown in FIG. 29. In this example, ACK/NACK transmissions associated with DL transmissions 2712, 2714, 2716, and 2718 may be combined into a single bundled ACK/NACK transmission 2752, which may be sent in subframe 7, which is allocated for UL transmission. The bundling may be done by, for example, performing a logical AND on the ACK/NACK bits for DL transmissions 2712, 2714, 2716, and 2718. Other bundling methods, such as, for example, adding additional bits or multiplexing bits may also be used.

Similar problems may also occur in other implementations that don't use resource partitioning. For example, similar problems may occur where there are different interference patterns and/or different loadings between UL and DL. For example, if there are a number of WS channels available, each of them may be lightly loaded, whereas a single shared UL channel operating in licensed spectrum may be heavily loaded.

In some implementations, ACK/NACK bundling and/or multiplexing may also be used to address asymmetry between UL and DL subframe assignments.

Figure 30:
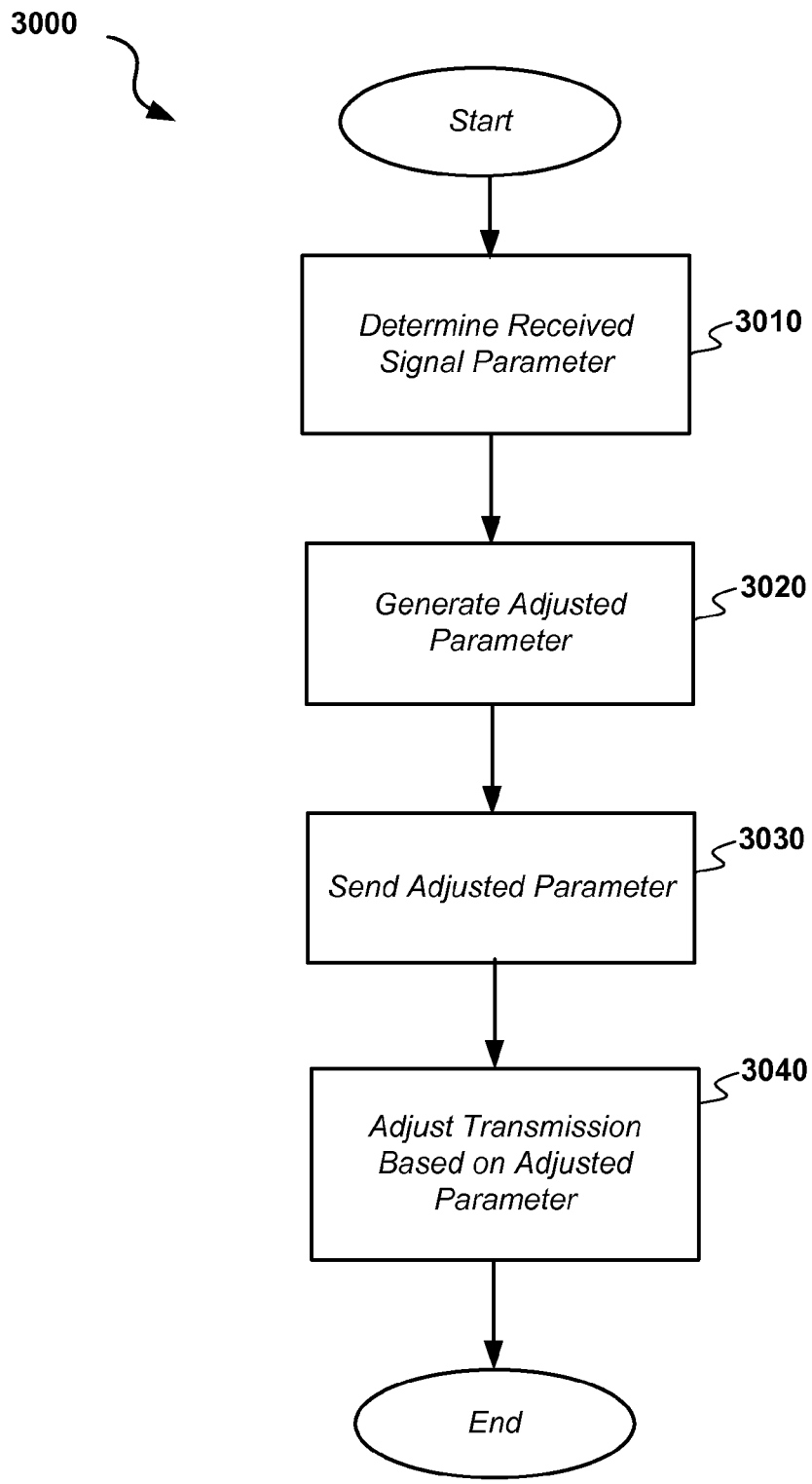
FIG. 30 illustrates an embodiment of a process for providing wireless communications.

Attention is now directed to FIG. 30, which illustrates an embodiment of a process 3000 for providing wireless communications. At stage 3010, a signal is received, such as at a WS-UE, with the signal being transmitted from an WS-eNB. The signal may be sent in a WS, which may be a TV band WS. At stage 3020, an adjusted parameter may be generated. The adjusted parameter may be generated based on one or more bias values. The bias values may be based on a difference in frequency between the WS band and a licensed band, which may be used for UL. The bias value may also be based on an apparatus parameter, such as an antenna gain. At stage 3030, the adjusted parameter may be sent to another wireless network node. The other node may be the WS-eNB. At stage 3040, the WS-eNB may use the adjusted parameter to adjust an output such as a transmit signal output provided to the WS-UE.

Figure 31:
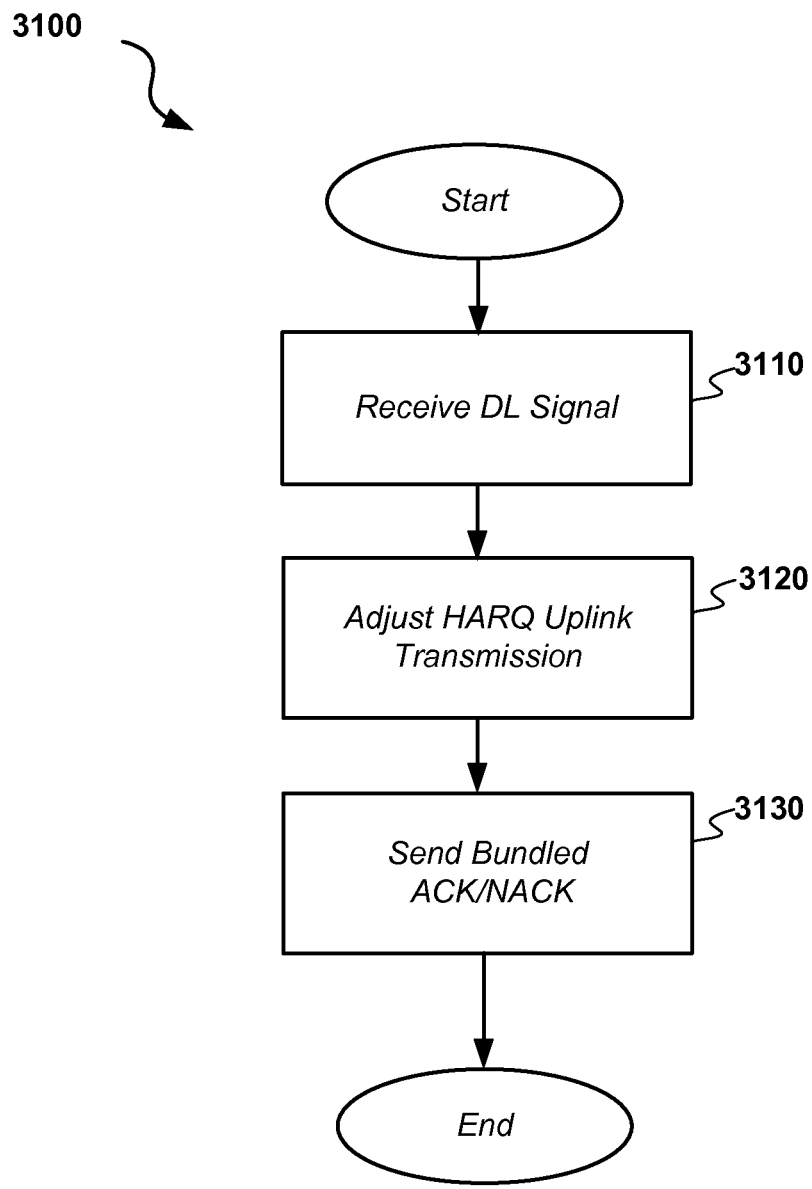
FIG. 31 illustrates an embodiment of a process for performing bundled ACK/NACK transmission.

Attention is now directed to FIG. 31, which illustrates an embodiment of a process 3100 for providing wireless communications. At stage 3110, a signal may be received. The signal may be received at a UE and provided from an eNB. The signal may be transmitted in a WS channel, and the UE and eNB may be WS-enabled. At stage 3120, a response may be adjusted based on a timing requirement imposed on the eNB. The timing requirement may be associated with a UL subframe restriction, such as where UL transmission is prohibited during particular subframes. The timing requirement may relate to an ACK/NACK required to implement HARQ. At stage 3130, a transmission may be sent based on the timing requirement. The transmission may include a bundled set of ACK/NACKs from particular subframes. The particular subframes may be the prohibited subframes. The bundled ACK/NACKs may be sent in a particular subframe configured for UL transmission, which may be on a licensed channel.

Figure 32:
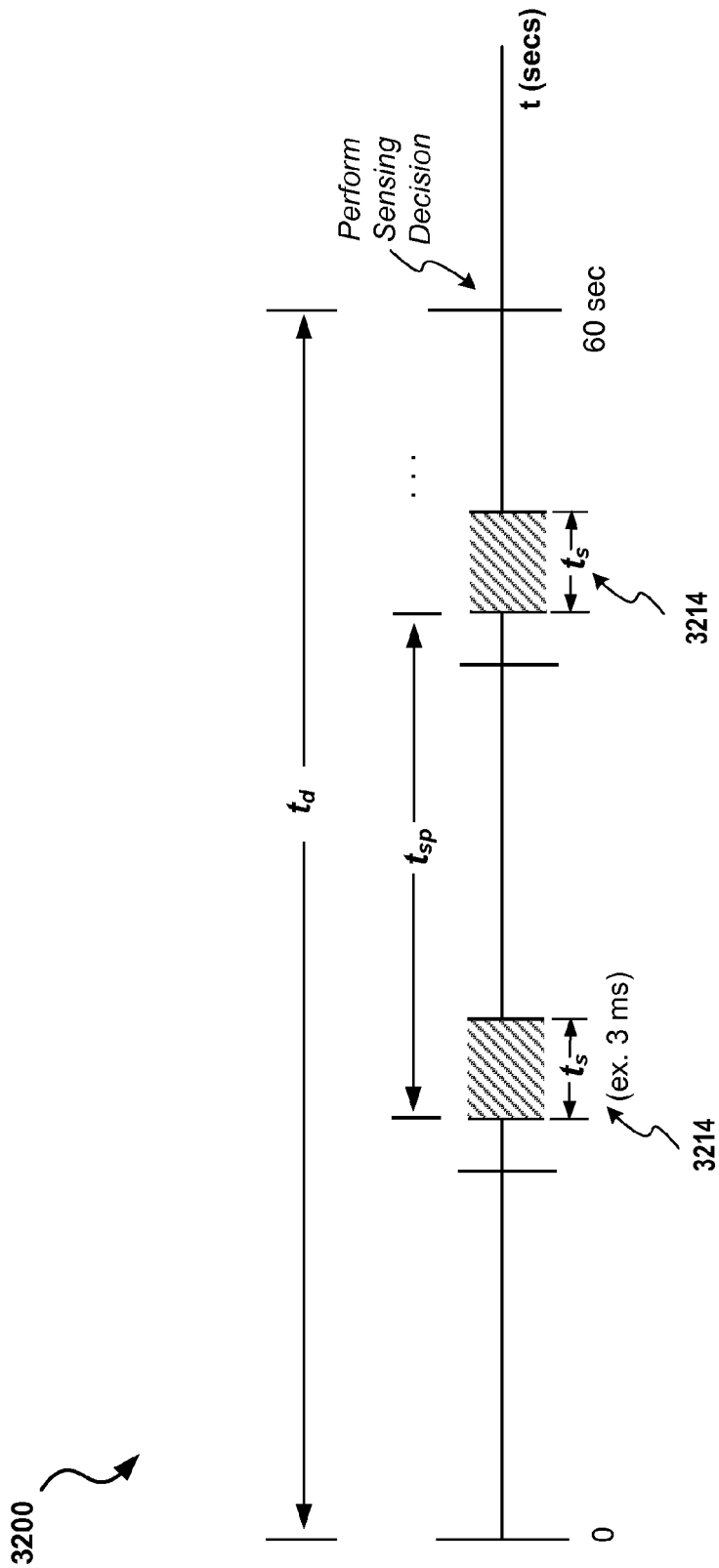
FIG. 32 illustrates an implementation of a timing configuration for providing quiet periods.

Suppression of CRS Transmission to Enable Sensing in Cognitive LTE: In another aspect, sensing in systems such as cognitive LTE systems may be aided by supression of common reference signal (CRS) transmissions. Attention is now directed to FIG. 32, which illustrates one embodiment of a signaling configuration for providing coordinated quiet periods, such as for channel sensing. Time interval td represents the required 60 second sensing period. During this period, one or more sensing intervals, denoted as ts, may be implemented, where all network devices refrain from transmitting (i.e., are quiet) during these time intervals. In some cases, a single sensing interval may be used to monitor the channel to detect other users. However, in other implementations multiple sensing intervals may be provided. In the example shown in FIG. 32 sensing intervals 3212 and 3214 are shown, which may be repeated periodically during the 60 second sensing period (tD). The specific timing may be predefined in the system or may be sent to the network devices, such as in a SIB message, such as a SIB1 or SIB2 message. Alternately, sensing intervals may be done in asynchronous fashion, however, the quiet interval information will need to be sent to other network devices, which may increase control signaling. In the example illustrated, sensing intervals have a duration ts, where ts may be 3 milliseconds. This may be advantageous due to LTE system signaling requirements, however, other durations may alternately be used.

LTE systems impose various timing requirements for DL and UL signaling. For example, LTE requires periodic transmission of control channels, such as PSS/SSS, PBCH, SIB1, etc., as well as CRSs. This creates potential problems when utilizing WS because of the requirement for periodic quiet periods, such as the 60 second sampling and associated quiet period for monitoring described previously. Consequently, cell-wide coordination of quiet periods, along with modification of standardized LTE signaling, may be required.

Figure 33:
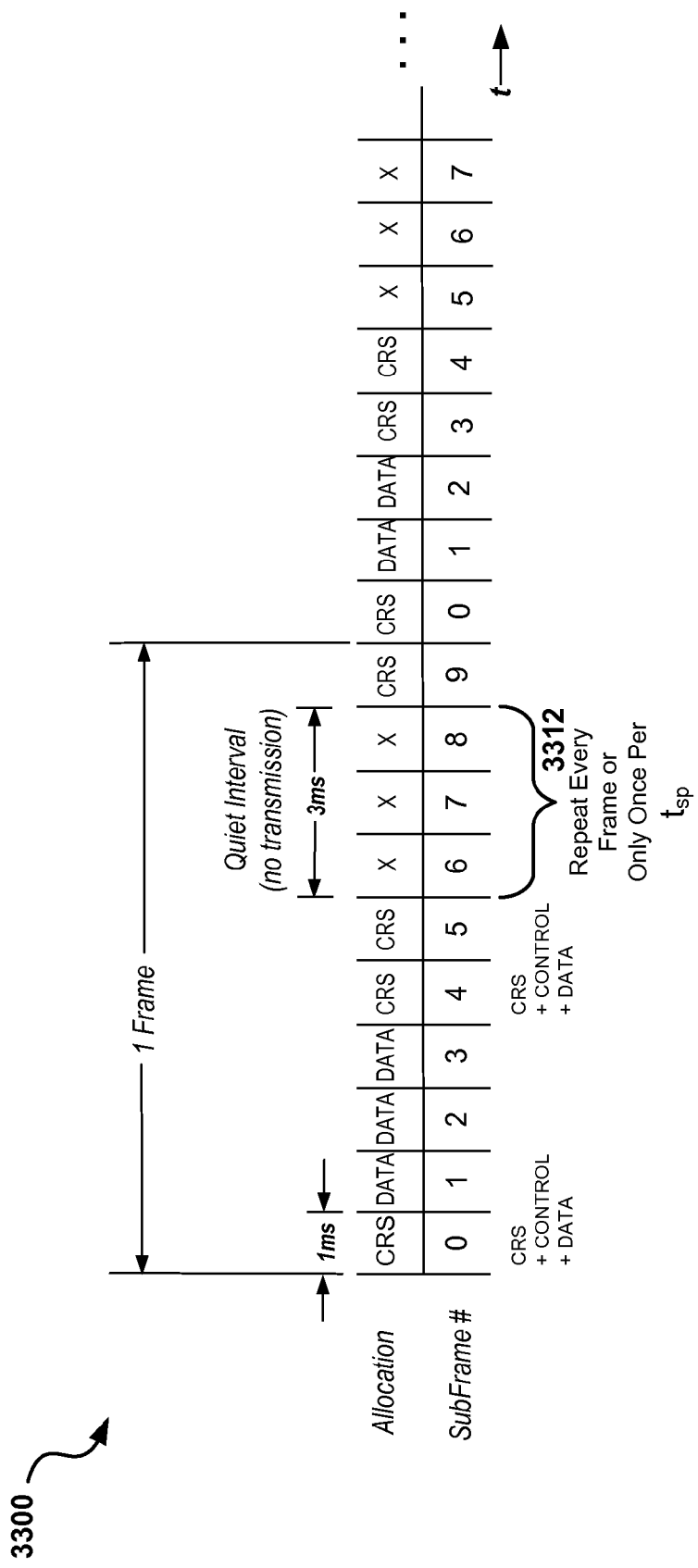
FIG. 33 illustrates details of an embodiment of subframe allocation for providing a quiet period as shown in FIG. 32.

In one aspect, this concern may be addressed by adjusting transmission during certain subframes provided from WS-enabled eNBs (WS-eNBs). This may involve omission of cell-specific or common reference signals (CRS), which are mandatory DL reference signals used for various UE processing functions, during certain subframes. Attention is now directed to FIG. 33, which illustrates one embodiment of a timing configuration 3300 for adjusting subframe transmissions to provide quiet periods. An LTE frame may be divided into 10 subframes, denoted subframes 0 thru 9, which periodically repeat. If it is assumed that there is at least one legacy carrier available, which will carry all control signals as well as CRS (cell specific or common reference signals) in all subframes, then other DL carriers may be configured as shown in FIG. 33 to transmit only in subframes potentially carrying broadcast control channels (including paging). In one embodiment, these may be subframes 0, 4, 5 and 9. In other subframes CRS are omitted, and demodulation of control/data transmission may be done using DRS (demodulation reference signals).

This approach is illustrated in FIG. 33, where subframes 0, 4, 5, and 9 include CRS (as well as control and data information as necessary). Subframes 1, 2, and 3 may carry data (if data is available in DL buffer). Subframes 6, 7, and 8 are quiet subframes where nothing is transmitted by the eNB on the DL. As noted previously, if the UL is done on a licensed spectrum, this presents no issue with the WS quiet period even if UL transmissions are done during the quiet period.

Since each subframe has a time duration of 1 mS, this provides a 3 mS quiet interval, consistent with the timing configuration illustrated in FIG. 32. In some implementations, the quiet interval at subframes 6, 7 and 8 may be provided during each frame. However, in other implementations, the quiet interval may only be provided during each sampling period (i.e., only once during each time interval tsP as shown in FIG. 32, such as once each second). Other periodic or anychronous quite intervals may also be used in some embodiments.

In various implementations, coordination of quiet interval timing may be done via a communication from a WS-eNB, such as an eNB 310 as shown in FIG. 3, to connected WS-UEs, such as UE 314. Alternately, the quiet interval timing may be in a lookup table or hard-coded in WS-eNBs, WS-UEs, or other network devices.

In addition to functionality as described previously with respect to WS-eNBs, associated functionality may be implemented in WS-UEs. In particular, a UE in a WS capable system may need to address timing issues associated with omission of CRS from certain subframes, such as from subframes 6, 7, and 8 as shown in FIG. 33. Since UEs may expect CRS during these subframes, such as to perform monitoring functions related to radio link monitoring (RLM), and radio link failure (RLF), as well as to perform other functions, WS-UEs may benefit from reconfiguration to accommodate WS signaling. For example, WS-UEs may include filters that assume CRS in all subframes, e.g., for RLF detection and/or CQI/PMI/RI estimation. In order to address this, a WS-UE may be configured to freeze loops and filters whose inputs are computed from CRS during those subframes where CRS is not transmitted. Using this approach, inputs to these loops and filters would remain at the previous value provided at the last subframe having CRS, and resuming operation at the next available CRS. This may avoid failures such as improperly declaring radio link failure (RLF) based on omitted CRS, which would result in substantial additional system processing to effectively re-establish connection with the WS-UE.

Coordination of this processing may be done based on information sent from the WS-eNB with signal freezing during the quiet periods done in the WS-UE based on the information provided from the WS-eNB. Alternately it may be hard-coded in the WS-UE, or otherwise determined from signals received from the WS-eNB or other network device.

Figure 34:
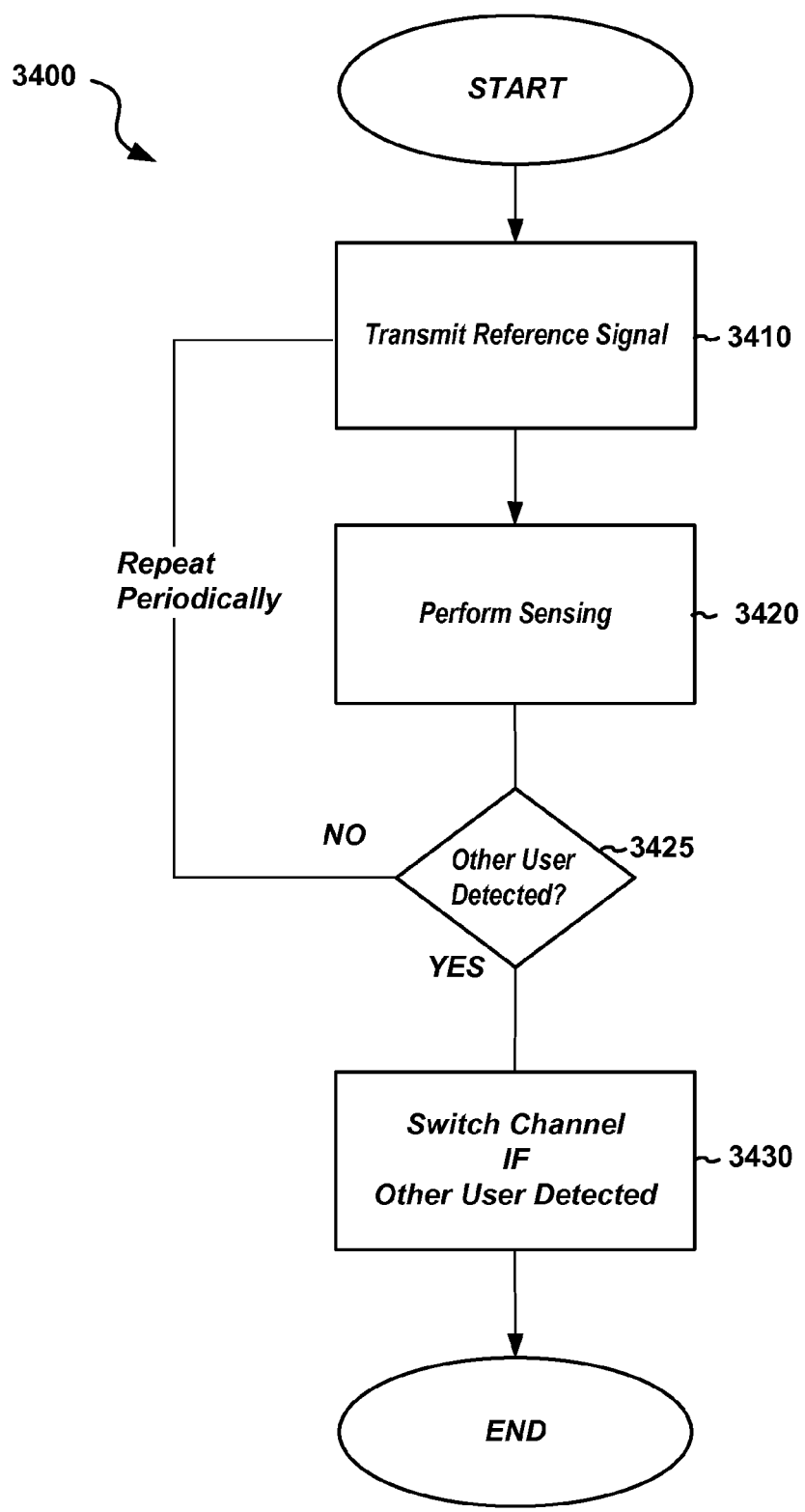
FIG. 34 illustrates an embodiment of a process for providing quiet period signaling and monitoring.

Attention is now directed to FIG. 34, which illustrates a process 3400 for providing wireless communications. At stage 3410, a reference signal is transmitted from a network node, such as a WS-eNB, in a first channel, exclusively during a plurality of subframes of a first frame period. The first frame period further includes a second plurality of subframes, wherein no signal is transmitted from the network node during this second plurality of subframes. The network node, such as a WS-eNB, may notify other network nodes, such as WS-UEs, of the quiet period so that the other network nodes may refrain from transmitting during the quiet period. At stage 3420, a sensing operation may be performed. This may be a sensing operation to determine whether other users are occupying the channel. The other users may be, for example, primary users of the channel such as licensed users. The sensing process may be repeated periodically if no other users are sensed. The sensing may be based on standards for operation in WS channels, such as FCC standards or standards applicable in other jurisdictions.

Alternately, if other users are detected at stage 3420, transmission may be switched to another channel. For example, if a primary user is detected, operation may be terminated within a predefined time frame, such as, for example, two seconds, and transmission switched to another channel. In addition, transmission in other frames may include reference signals transmitted on all subframes, or on a different set of subframes.

The channel may be a WS channel, such as a UHF television white space channel. The second plurality of subframes may consist of two subframes or three subframes. The reference signal may be a common or cell-specific reference signal (CRS), that is a DL reference signal provided for channel characteristic determination.

Figure 35:
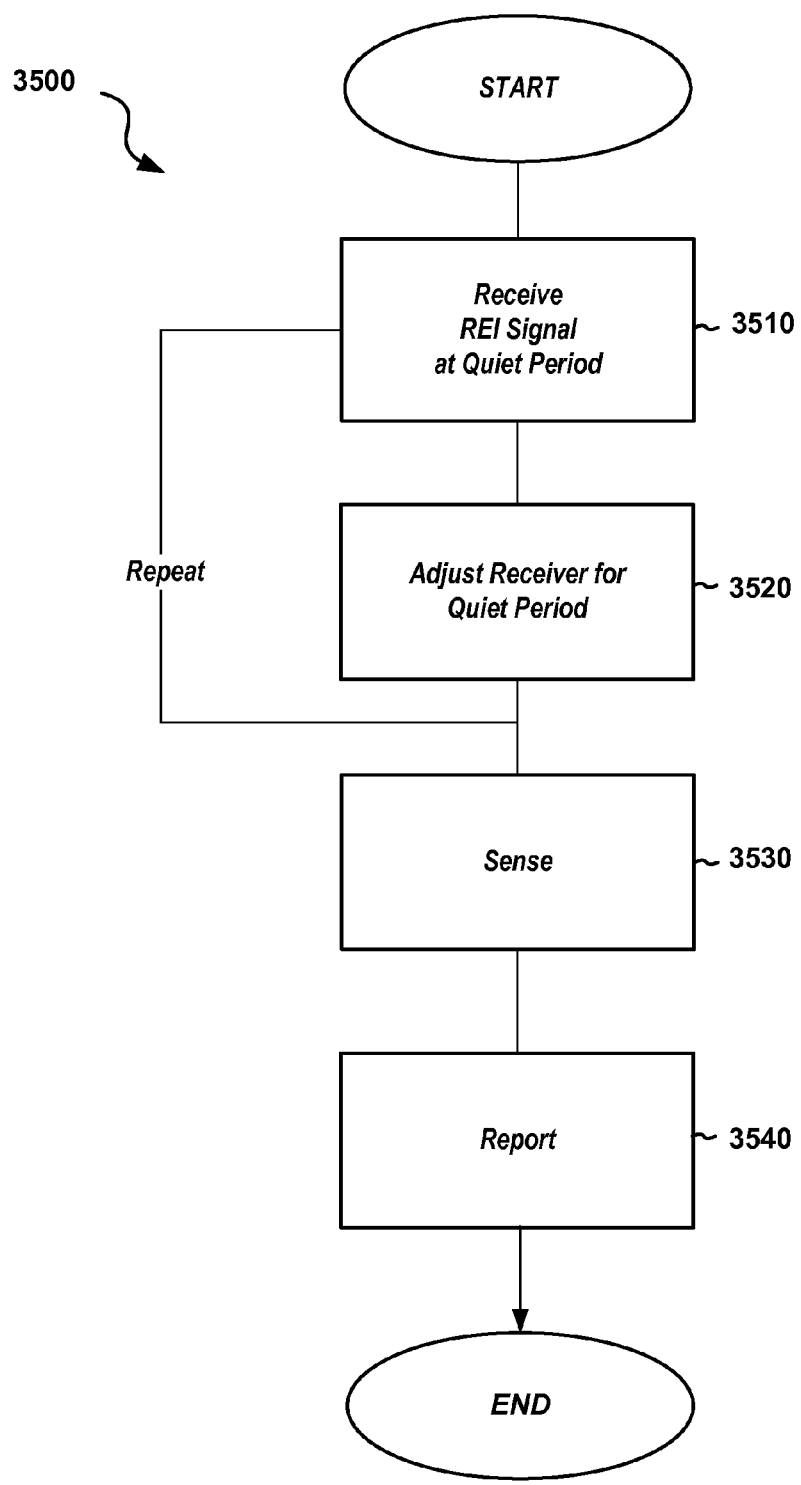
FIG. 35 illustrates an embodiment of a process for performing quiet period processing and monitoring.

Attention is now directed to FIG. 35, which illustrates a process 3500 for wireless communications. At stage 3510, a reference signal may be received in a first channel exclusively during a first plurality of subframes of a first frame period, wherein the first frame period further includes a second plurality of subframes corresponding to a quiet period during which no reference signal is transmitted. During the quiet period, the reference signal may be omitted from received signals transmitted from an associated wireless network node, such as a WS-eNB. At stage 3520, a receiver parameter may be adjusted to compensate for omission of the reference signal during the quiet period. The adjusting may include freezing an input to a receive filter or loop. The filter or loop may be associated with a received signal metric, such as radio link (RLM) monitoring or other receiver functions. At stage 3530, a transmission may be made on a second channel. The second channel may be a licensed channel.

The first channel may be a WS channel. The second plurality of subframes may consist of two or three subframes. The reference signal may be a CRS. Process 3500 may further include a stage of performing a sensing operation during the quiet period. The sensing operation may relate to detecting a primary user. Information associated with the sensing operation may be reported, via a second channel, information determined from the sensing operation. The information may relate to a primary user, and the second channel may be a licensed channel.

Figure 36:
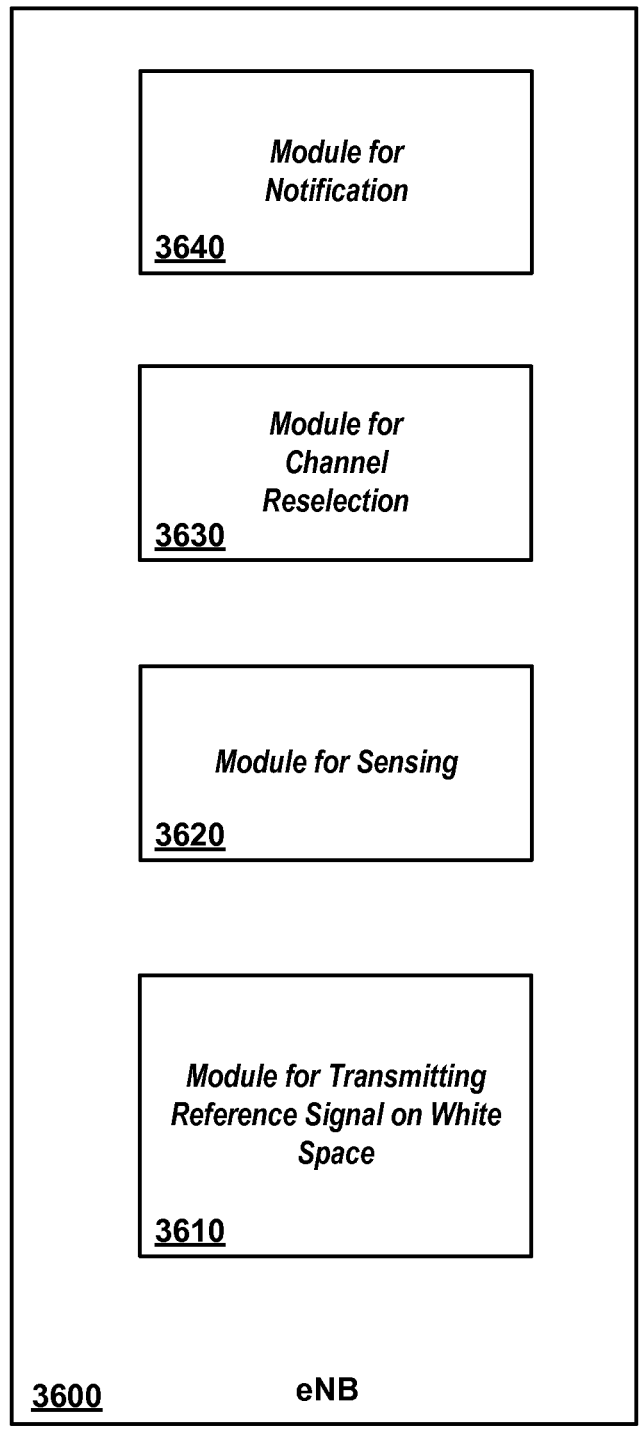
FIG. 36 illustrates an embodiment of a WS-enabled wireless network eNB.

Attention is now directed to FIG. 36, which illustrates details of an embodiment of an WS-eNB 3600 configured for performing the functionality described herein. WS-eNB 3600 may include a module 3610 for sending a reference signal in a WS channel, wherein the reference signal may be halted during a quiet period. Sensing module 3620 may be provided for monitoring the WS channel to determine whether other users are present, such as primary users. Channel switching module 3630 may be provided to monitor and select a new channel or channels based on sensing and detection as may be performed in module 3620. Module 3630 may also be configured for initial WS channel monitoring before initiating use of the WS channel. Notification module 3640 may be provided to notify other network nodes of particular quiet periods, such as via a SIB such as a SIB1. WS-eNB 3600 may be configured as shown in FIG. 33.

Figure 37:
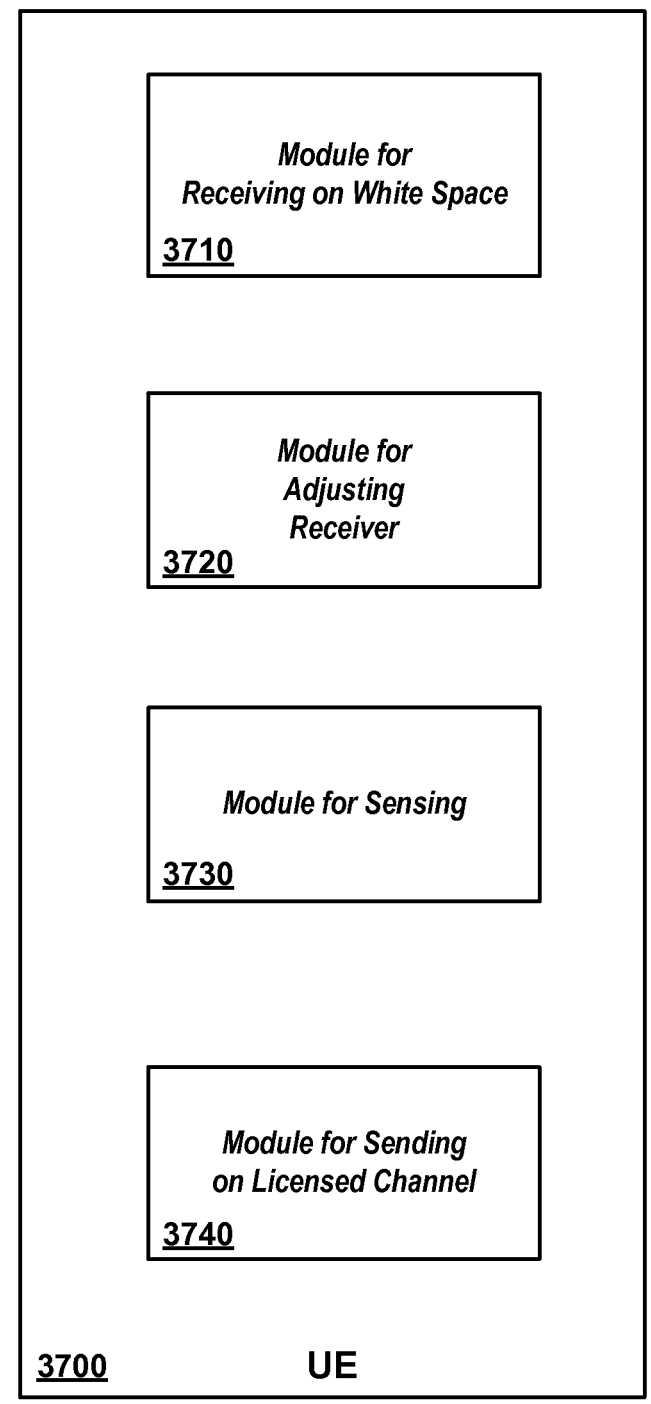
FIG. 37 illustrates an embodiment of a WS-enabled wireless network UE.

Attention is now directed to FIG. 37, which illustrates details of an embodiment of aWS-UE 3700 configured for performing the functionality described herein. WS-UE 3700 may include a receiver module 3710 configured to receive signals including reference signals on a WS channel and perform associated control and demodulation functions. Adjustment module 3720 may be configured to adjust a receiver parameter based on omitted signals during the quiet period, such as omitted CRS. UE 3700 may also include a sensing module 3730 configured to monitor the WS channel during the quiet period and detect, if present, other users, such as primary users. WS-UE 3700 may also include a sending module 3740 configured to send information to another network node, such as a WS-eNB. The information may include information regarding detection of other users at the WS-UE. The sending may be done on a licensed channel. WS-UE 3700 may be configured as shown in FIG. 36.

White Space Capability Declaration and Channel Measurements: Some aspects of the disclosure relate to white space capability declaration and channel measurements. As described previously herein, in some implementations a UE must perform a suitable random access procedure so that the eNB recognizes its WS capability, and may therefore go ahead with access procedure on white space, starting, in that case, from msg 2. However, in some cases, use of licensed channels may be a better option for certain WS-enabled UEs. For example, in some cases a WS-UE advertising itself as a WS-capable device during execution of random access procedures may be detrimental for UE and/or overall system performance.

In one aspect, this may be addressed by configuring a WS-UE to perform cell search by measuring channel quality on licensed spectrum and/or white space channels, and decode SIB2, and/or other broadcast signals needed for acquisition, where the employed WS channel is advertised. This may be followed by performing inter-frequency measurement of the advertised WS channel. Primary user sensing and detection, such as described previously herein, may also be performed by the WS-UE.

Based on channel quality and/or primary user diction, a decision may then be made as to whether to declare particular capabilities (e.g., whether the UE should declare itself as a WS-UE or as a non WS or legacy UE, or provide no particular declaration). For example, if reference signal received quality (RSRQ) on the licensed spectrum channel or channels is larger than RSRQ on a WS spectrum channel or channels, or if a primary user has been detected on the WS channel, the UE may declare itself as a non-WS-capable UE (e.g., may follow the baseline random access procedure followed by legacy UEs). In this way, eNB will continue the random access procedure by using the DL licensed spectrum, and the UE will tune its RF receiver on the licensed channel or channels.

However, after access and bearer setup, the WS-UE (declared initially as a non WS or legacy UE) may want to declare its true WS capability, so as to take advantage of its white space capabilities. This may be done, for example, as described subsequently using suitable RRC signaling. In one exemplary approach, a new information element (IE) can be added to UE-EUTRA-Capability, such as is defined in 3GPP, 36.331. In one exemplar embodiment, the new IE may be provided by the UEs within the particular RRC message denoted as "UECapabilityInformation."

The new IE to be added may include, for example, at least a flag specifying white space capability support. In addition, other cognitive-specific capabilities may be included, such as, for example, support of primary user sensing and detection.

In another implementation, WS capability may be declared by simply adding the supported WS bands in "SupportedBandListEUTRA." However, since this method only allows specifying band support, there may be a need to signal additional cognitive-specific capabilities through the RRC messaging described above.

Once the RRC message "UECapabilityInformation" is received by the serving eNB, if the eNB finds out that a UE declared itself as non-WS during access but actually has WS capabilities (e.g., signaled through the flag in UECapabilityInformation), it may then consider the UE for possible inter-frequency handover over a WS channel. Examples of implementation of this functionality are further described below with respect to FIGS. 38-40.

Figure 38:
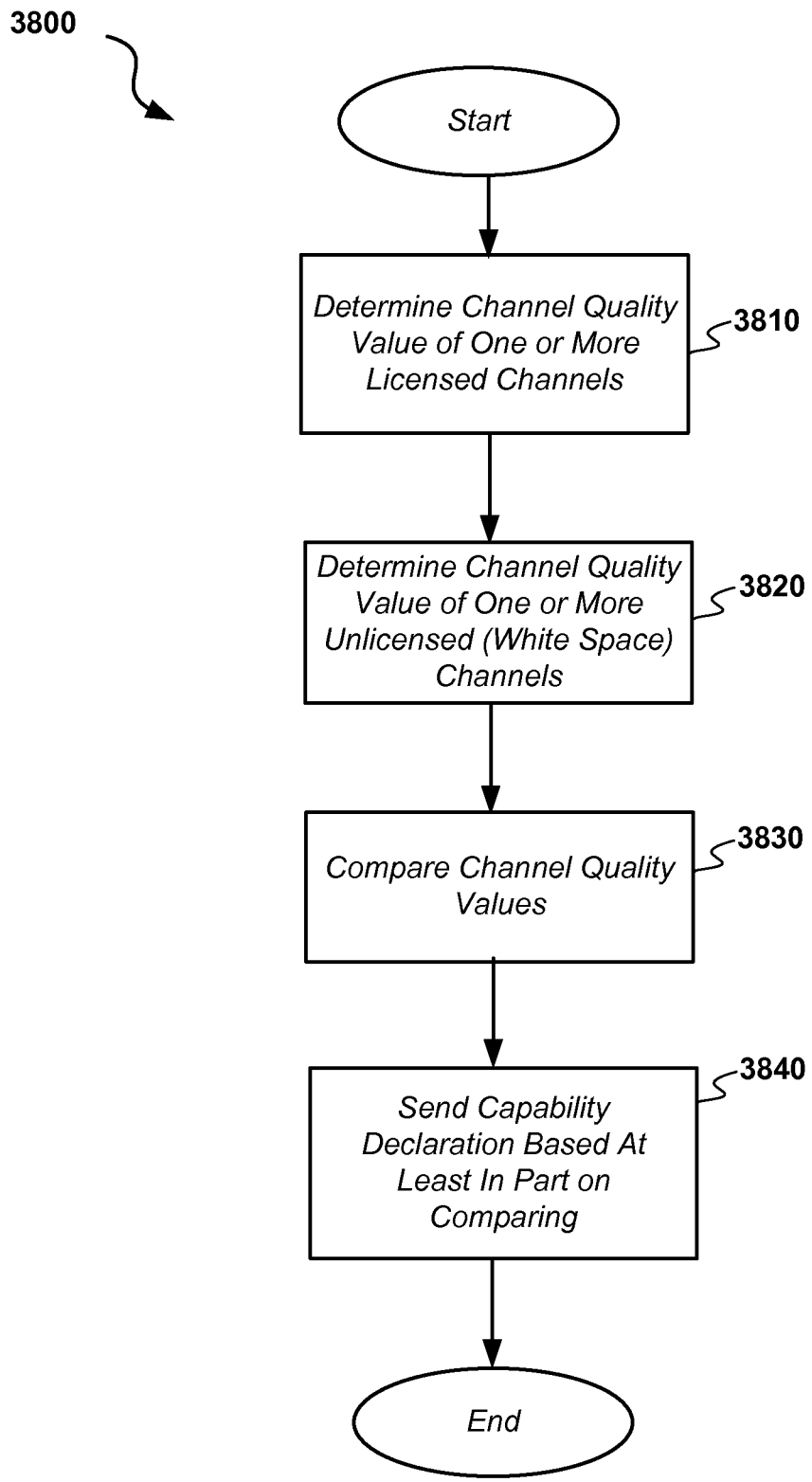
FIG. 38 illustrates an embodiment of a process for providing a capability declaration.

FIG. 38 illustrates an embodiment of a process 3800 for providing a capability declaration, such as from a terminal such as a WS-UE, to a serving base station, such as a WS-eNB, such as are shown previously herein. At stage 3810, a channel quality value or parameter may be generated based on one or more received channels or spectrum used for licensed operation, such as in a licensed cellular band. For example, a receiver in a terminal, such as a UE, may receive signaling in the one or more licensed channels and may then perform channel quality measurements, such as are described, for example, for 3GPP LTE. At stage 3820, a second channel quality value or parameter may be generated. The second channel quality value or parameter may be generated based on measurements of white space channels or spectrum, such as, for example, in television WS spectrum or other white space spectrum. In some embodiments, the second measurement may be facilitated by the same receiver as used for the licensed spectrum measurement, or, in other embodiments, separate receivers may be used. One or more processor elements, which may be, for example, special purpose processors configured for communications applications as described previously herein may also be used for generation of channel quality values or parameters. In other cases, the processor may be a general purpose processor or other programmable device or module.

At stage 3830, a comparison may be done based on the first and second values or parameters (and/or additional or alternate measurements or values) to determine a preferable channel or spectrum. For example, a WS channel or spectrum may be desirable because of better channel quality and/or for other reasons, such as loading in the licensed spectrum, number of users of licensed spectrum, presence of other nodes in the vicinity, and the like. Alternately, in some cases, a licensed spectrum may be desirable, such as, for example, when there are other uses, such as primary users, operating in the WS channels. For example, even if a WS channel has a better channel quality value, presence of a primary user may preclude WS operation. Depending on the comparison, a capability declaration may then be generated. The capability declaration may be, for example, a declaration that the terminal/UE is WS-capable, which may be used by a receiving base station or other nodes to configure the UE for white space operation. In another example, the declaration may be that the terminal/UE is non-WS capable or is a legacy UE. This may be done even if the UE is configured for WS operation, such as when the UE determines that the licensed channel(s) provide better quality, if primary users are detected, or for other reasons where white space operation may be prohibited or less desirable.

At stage 3840, the terminal/UE may then send the declaration, which may be based, as noted above, at least in part on the channel quality value and comparing stage. The declaration may then be received at the serving base station/eNB and may then be used to configure operation between the eNB and UE.

In some cases, the capability declaration may be indicative of an inability to operate on white space channels, or the capability declaration may be indicative of an ability to operate on white space channels. The process may further include stages such as, for example, initiating, based upon the comparing, a random access procedure. The random access procedure may be initiated with respect to at least one of a plurality of licensed channels. The process may further include tuning a receiver to the at least one of the plurality of licensed channels. The stage of initiating may include using at least one of a plurality of licensed channels when the second value (e.g., the unlicensed/WS channel) represents an inferior channel quality relative to a channel quality represented by the first value corresponding to the licensed channel or channels.

In addition, the process may further include transmitting a second capability declaration. The second capability declaration will typically be different in at least one respect from the first capability declaration. For example, the initial or first capability declaration may be indicative of an inability to operate on white space channels or a desire not to operate on a white space channel, and the second capability declaration may be indicative of a capability to successfully operate on white space channels. Alternately, in some cases the first capability declaration may be indicative of an ability to operate on white space channels, and the second capability declaration may be indicative of an inability to operate on white space channels or a desire not to operate on white space channels. The second capability declaration may be transmitted from a network node, such as a UE, which may be a WS-UE, subsequent to establishment of bidirectional communication between the UE and a network node, such as a base station or eNB. The second capability declaration may be conveyed through, for example, radio resource control (RRC) signaling. In addition, the second capability declaration may be included within an information element of an LTE RRC message. The LTE RRC message may comprise a UECapabilityInformation message, such as is defined for 3GPP LTE systems.

In addition, the process may further include transmitting a second capability declaration different from the first capability declaration, and further participating in an inter-frequency handover procedure, which may be initiated in response to the second capability declaration. The method may further include a stage of receiving, on a licensed broadcast channel, information identifying the at least one white space channel, which may be done prior to determining channel quality for the unlicensed/WS channels or spectrum.

Figure 39:
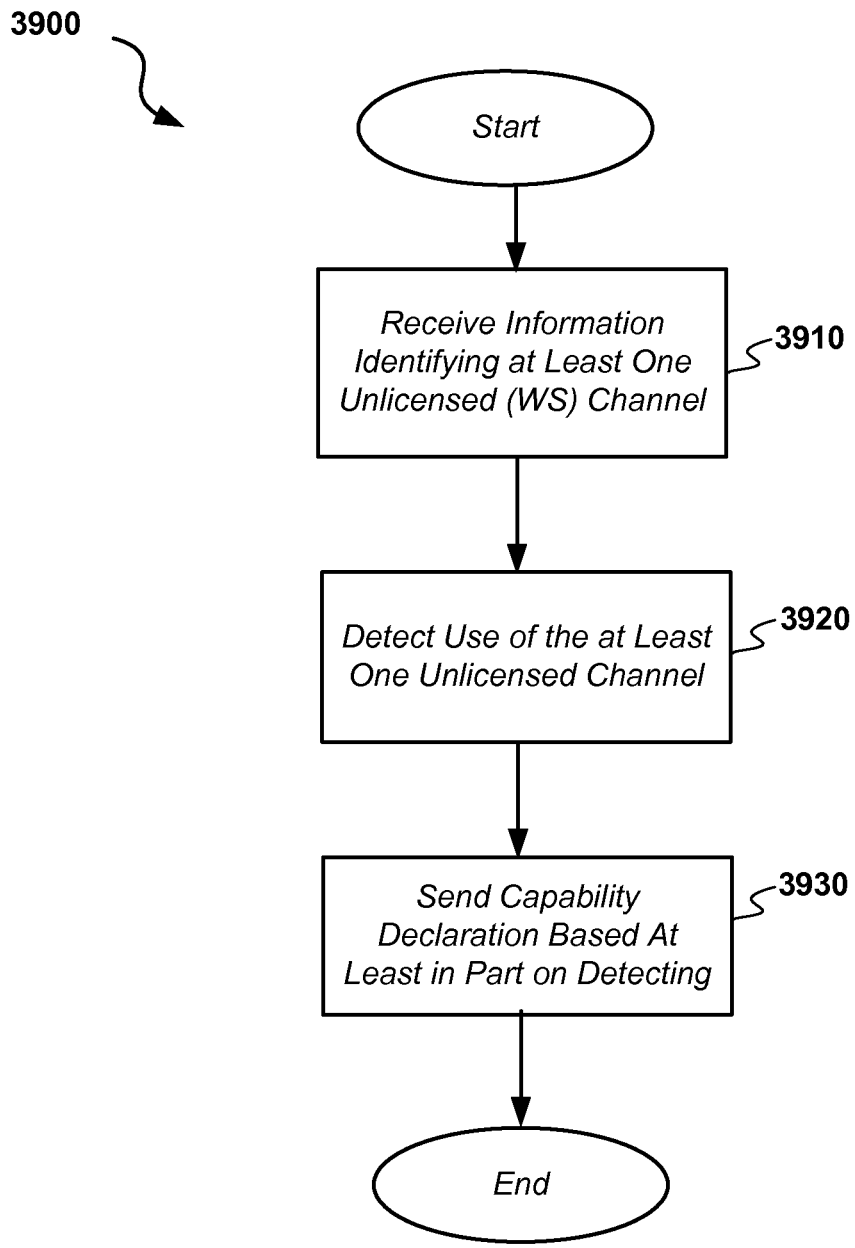
FIG. 39 illustrates an embodiment of a process for providing a capability declaration.

FIG. 39 illustrates details of an embodiment of a process 3900 for providing a capability declaration, such as from a WS-UE to a serving base station, such as a WS-eNB, such as are shown previously herein. Process 3900 may be used in conjunction with, and/or integrated with, process 3800, or, in some implementations, may be used alone or separately from process 3800.

At stage 3910, information may be received, such as at a WS-UE, that includes information identifying one or more unlicensed/WS channels or spectrum. The information may be provided by, for example, a serving base station, such as a WS-eNB, and may be included in or part of a broadcast message, such as described previously herein, for identifying available WS channels or spectrum. At stage 3920, a search may be performed to detect and measure characteristics of the unlicensed/WS channel or channels. The measurements may include, as described previously herein, monitoring for and detection of other WS users, such as primary users or other priority users of the white space channel or channels. The measurements may also include, as described with respect to process 3800, channel quality metrics or other metrics related to the WS channels. At stage 3930, a capability declaration may be sent, such as from the WS-UE to the serving WS-eNB, or to other or additional network nodes. The capability declaration may be generated based at least in part on the detection of at least one unlicensed user, which may be, as noted previously, a primary user or other priority user. For example, a WS-UE, upon detecting a primary user in the WS, may send a capability declaration that indicates that the WS-UE is not WS capable (e.g., the WS-UE may declare itself as a non WS-UE or legacy UE). The serving WS-eNB may then configure operation with the WS-UE only in the licensed channel(s) or spectrum. The information identifying at least one unlicensed channel may be provided on a broadcast channel.

The process 3900 may further include determining a first channel quality value by measuring channel quality of at least one licensed channel, and determining a second channel quality value by measuring channel quality of at least one unlicensed channel. The capability declaration may be indicative of an inability to operate on white space channels, such as if either a primary or other priority user is detected or if the WS channel quality is inferior to the licensed channel quality. In some cases, the capability declaration may be indicative of an ability to operate on white space channels. The process may further include initiating, based upon the detecting, a random access procedure. The random access procedure may be initiated with respect to at least one of a plurality of licensed channels. The process may further include tuning a receiver to the at least one of the plurality of licensed channels.

In addition, the process 3900 may further include transmitting a second capability declaration, which will typically be different in at least one respect from the first capability declaration. For example, the initial or first capability declaration may be indicative of an inability to operate on white space channels or a desire not to operate on white space channels, and the second capability declaration may be indicative of a capability to successfully operate on unlicensed channels. In some cases, the first capability declaration may be indicative of an ability to operate on white space channels, and the second capability declaration may be indicative of a capability or desire not to operate on white space channels. The first and/or second capability declarations may be conveyed through RRC signaling.

The process may further include transmitting a second capability declaration different from the initial or first capability declaration, and then participating in an inter-frequency handover procedure initiated in response to the second capability declaration. The inter-frequency handover procedure may be performed from, for example, a white space channel to a licensed channel, or, in some cases, from a licensed channel to a white space channel.

In some implementations, the process 3900 may include evaluating the suitability of the at least one white space channel to support wireless communication, and transmitting a first capability declaration based upon the evaluating stage. This may be combined with or provided in place of states such as stage 3920. The stage of evaluating may include determining whether the at least one white space channel is being used, which may or may not result in detection of a user such as a primary user or priority user in the WS channel or channels. The stage of evaluating may further include determining a first quality of the at least one white space channel, and comparing the first quality to a second quality of a licensed channel. The first capability declaration may, for example, be indicative of an inability to operate on white space channels. The process may further include initiating, based upon the evaluating, a random access procedure. The random access procedure may be initiated with respect to at least one of a plurality of licensed channels. The process may further include tuning a receiver to the at least one of the plurality of licensed channels.

Figure 40:
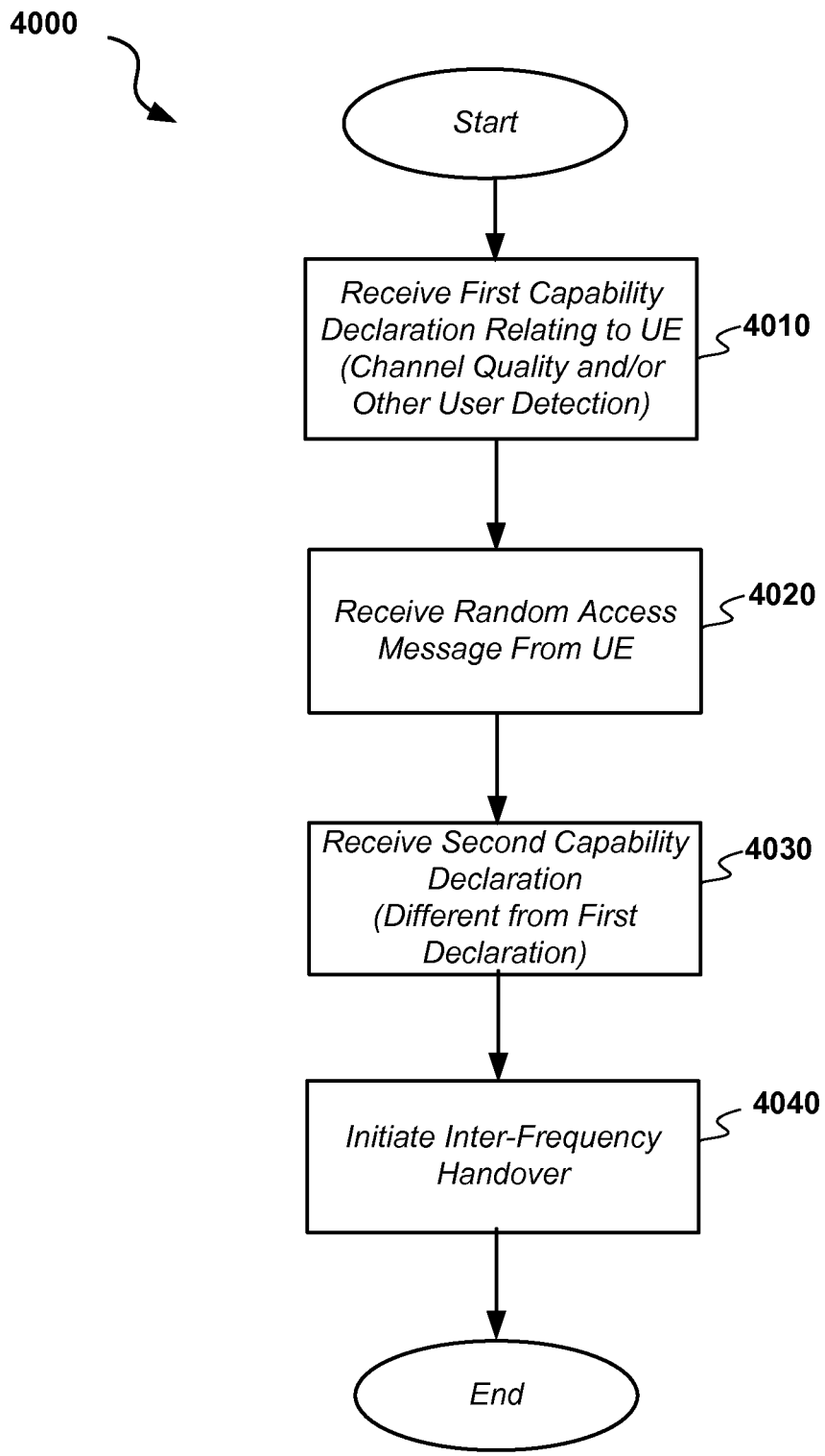
FIG. 40 illustrates an embodiment of a process for performing a handover in response to receipt of a capability declaration.

FIG. 40 illustrates details of an embodiment of a process 4000 for facilitating wireless communications using unlicensed/WS channels or spectrum. Process 4000 may be implemented in, for example, a base station, such as a WS-eNB as shown previously herein. The WS-eNB may be in communication with one or more terminals, such as WS-UEs as shown previously herein.

At stage 4010, a first capability declaration may be received, such as at a WS-eNB from a WS-UE, which may be attempting to access the cell served by the WS-eNB. The first capability declaration may be a capability declaration of the UE as to its white space capability (e.g., as a WS-UE or a non WS or legacy UE). For example, the UE, which may be WS capable, may nevertheless declare itself as a non WS or legacy UE, such as described previously herein. This may be based on, for example, a determination that the WS channel quality is inferior to that of an available licensed channel, based on presence of another user, such as a primary user, or based on a combination of these or other factors associated with white space or licensed channel operation. In some cases, the received declaration may inform the base station that the UE is WS capable, such as if the WS channel quality is better and no other users of the WS are detected.

At stage 4020, a random access message may be received from the UE. For example, the message may be part of random access signaling, such as msg 3, or other messaging. An initial channel configuration may then be established between the eNB and UE, such as, for example, using only licensed channels. At stage 4030, a second capability declaration may be received, which may be different from the first capability declaration. For example, the first capability declaration may indicate that the UE is not a WS-UE, whereas the second capability declaration may indicate that the UE is a WS-UE. This may result from, for example, changes in channel characteristics and/or others of the WS channel or licensed channel. In response to the second capability declaration, an inter-frequency handover may be initiated at stage 4040, such as, for example, from operation on a licensed channel to operation on an unlicensed channel. The handover may be performed consistent with the processing described previously herein for channel handovers. In some cases, the handover procedure may be done between a white space channel and a licensed channel. The first capability declaration may be conveyed using the LTE RACH, and the second capability declaration may be included within an LTE RRC message. Alternately, or in addition, the stage of initiating a handover may be performed in response to one or more operational conditions associated with a network node. The inter-frequency handover procedure may include transitioning the UE from communication on a licensed channel to communication on a white space channel. The one or more operational conditions may relate to, for example, one or more of an interference level, a loading level, and a channel quality.

Figure 41:
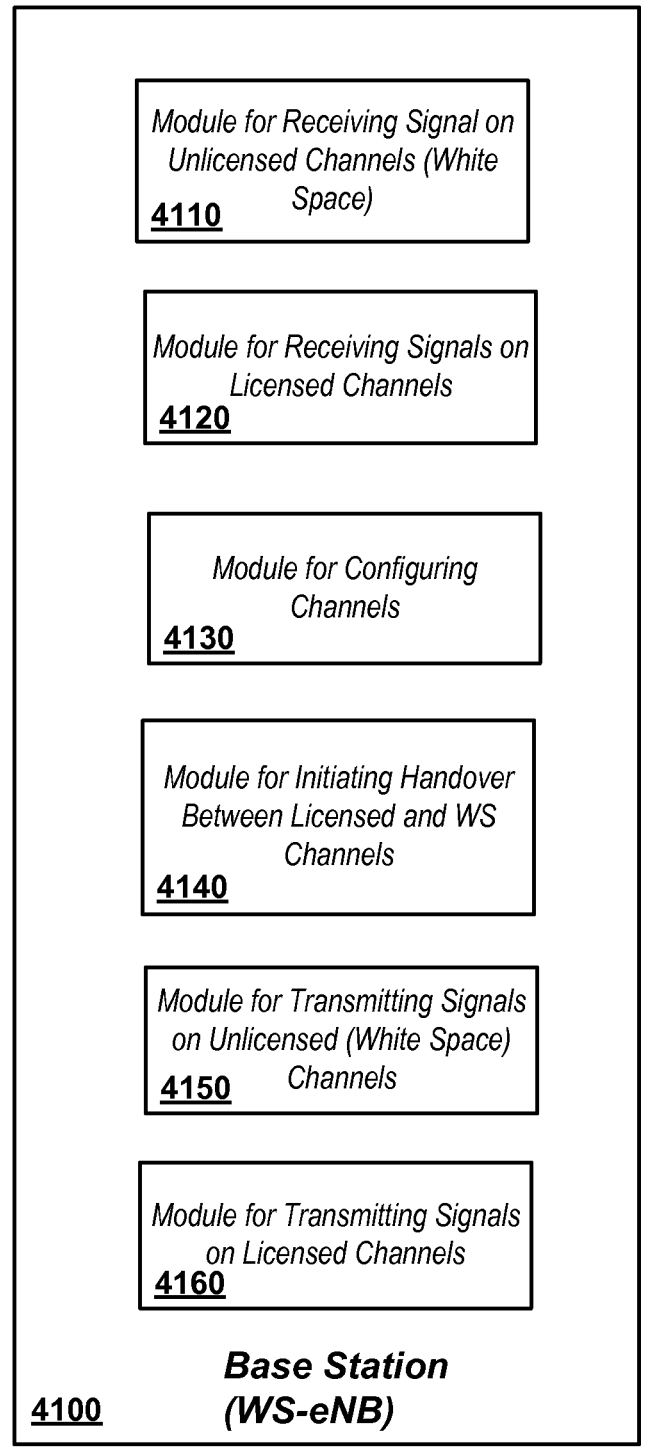
FIG. 41 illustrates details of an embodiment of a WS-enabled eNB.

FIG. 41 illustrates details of an embodiment of a WS-eNB 4100 configured for performing the functionality described herein, and in particular with respect to the processes illustrated in FIGS. 38-40. WS-eNB 4100 may include a module 4110 configured for receiving signals on unlicensed spectrum, such as white space channels, as well as module 4120 configured for receiving signals on licensed spectrum, such as licensed cellular channels. In some implementations, modules 4110 and 4120 may comprise separate modules, however, in some implementations they may comprise a single receiver module (which may be, for example, coupled to different antennas and/or front end modules, etc.).

WS-eNB 4100 may also include a module 4130 disposed for configuring channels, as well as performing other related functionality such as is described in the 3GPP LTE standards. Channel configuration may be performed in module 4130 consistent with the functionality described herein, and in particular with respect to the processing illustrated in FIGS. 38-40. WS-eNB 4100 may also include a module 5150 for facilitating handover initiation between channels. In particular, in one aspect, handovers may be initiated between licensed spectrum and white space spectrum, such as described previously herein with respect to FIGS. 38-40. Module 4130 may also include modules 4150 and 4160 for sending signals on unlicensed channels, such as white space channels, as well as licensed channels, respectively. Various additional modules and related components (not shown) may be incorporated in WS-eNB 4100. For example, WS-eNB 4100 may be configured consistently with the example eNB illustrated in FIG. 13.

Figure 42:
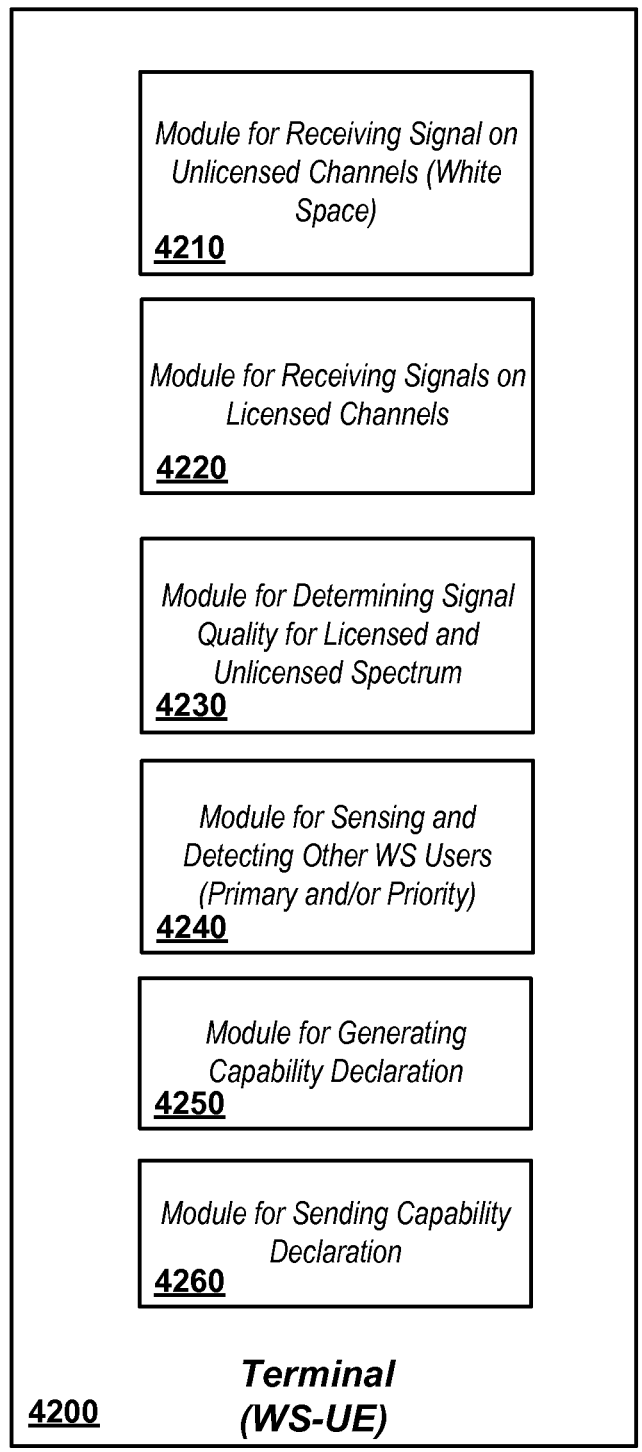
FIG. 42 illustrates details of an embodiment of a WS-enabled UE.

FIG. 42 illustrates details of an embodiment of a WS-UE 4200 configured for performing the functionality described herein, and in particular with respect to the processes illustrated in FIGS. 38-40. WS-UE 4200 may include a module 4210 configured for receiving signals on unlicensed spectrum, such as white space channels, as well as module 4220 configured for receiving signals on licensed spectrum, such as licensed cellular channels. WS-UE 4200 may further include a module 4230 configured for determining signal quality, which may be based on signals received at modules 4210 and 4220. WS-UE 4200 may also include a module 4240 configured to detect other users in the unlicensed/white space channels, such as, for example, primary users.

In addition, WS-UE 4200 may include a module 4250 for generating a capability declaration, which may be based on, for example, a signal quality difference between licensed and unlicensed/white space channels, and/or presence of other users in the white space channels, such as primary users. WS-UE 4200 may further include a module 4260 configured to send the capability declaration, such as via a transmission to an associated or serving base station, such as a WS-eNB as shown in FIG. 41. Various additional modules and related components (not shown) may be incorporated in WS-UE 4200. For example, WS-UE 4200 may be configured consistently with the example UE illustrated in FIG. 13.

Determination and Broadcast of White Space Channel Information: In some communication systems using licensed channels as well as unlicensed channels, such as white space channels, it may be desirable to provide information regarding WS channel utilization between base station nodes, such as eNBs, as well as from base stations to user terminals, such as UEs.

For example, in some implementations, a wireless network, such as an LTE network, may include a macrocell controlled by a macronode base station, such as a macro eNB. One or more additional nodes, such as, for example, low power nodes, may also be partially or fully within the coverage area of the macronode (e.g., within a coverage umbrella of the macrocell). The low power nodes may be, for example, low power base stations or eNBs, such as femtocell nodes (femtonodes), picocell nodes (piconodes), and/or other lower power nodes. In addition, in some cases, the other nodes may also be macrocell nodes of the same or different power levels. For example, macronodes of various power classes may be deployed within overlapping coverage areas of a primary macronode. Although the various embodiments described below are described with respect to a macrocell node (e.g., macro base station or eNB) and one or more low power nodes (e.g., pico or femto base station or eNB), the techniques and apparatus may also be used in configurations with macrocells of different types and/or power levels. In a typical implementation, the macrocell base station may be an eNB configured such as is shown in, for example, FIG. 13.

In some embodiments, the macrocell node may be configured to transmit and receive signals from connected or served user terminals, such as UEs, only on licensed spectrum. However, in cognitive systems, the macro and/or additional low power nodes may be further configured to operate on both licensed spectrum and unlicensed spectrum, such as WS spectrum and associated WS channels. In a typical implementation, the licensed spectrum may be spectrum licensed for LTE operation, while the unlicensed spectrum may be WS spectrum, such as TV WS spectrum as described previously herein. In one example implementation, approximately 40 WS channels may be available within the WS spectrum. It will, however, be apparent that other spectrum and channel configurations may be used in some implementations.

In implementations such as LTE systems, several basic broadcast signals including cell-related information are periodically transmitted by a base station of each cell to allow user terminals, such as UEs, to locate or discover the cell, measure cell signal characteristics and determine cell information, such as cell identification (cell ID), and possibly access or camp on the cell.

As described previously herein, in LTE implementations, broadcast signals, such as PSS, SSS, PBCH, RS, SIB1, and SIB2 are defined to be always sent on licensed spectrum. However, this may create various problems. For example, high network density may create problems with use of available licensed spectrum. In heterogenous networks or "hetnets" (i.e., networks comprising multiple base station nodes of different types and/or power levels), interference problems may be created between base stations and associated or served UEs. In some cases, the interference may be large, thereby limiting performance and/or potentially creating radio link failure or other connection problems. In order to mitigate these types of problems, as well as provide other potential advantages, it may be desirable to determine and/or provide information on available unlicensed channel resources, such as WS channels. For example, WS channel lists or other channel information regarding which WS channels may be used to provide broadcast signals for use in channel identification and access may be provided.

In an exemplary embodiment, some or all of the broadcast signals may be sent on unlicensed spectrum, such as on available white space channels. This may be done without the need to send the broadcast signals on licensed spectrum as is traditionally done. However, in order to facilitate fast and efficient access to these channels, a list of available or in use white space channels may be provided to user terminals such as UEs. The list may be sent on a licensed channel or channels.

For example, in one exemplary embodiment, each macrocell node (e.g., macro eNB) is configured to broadcast a list of unlicensed or WS channels used by associated low power nodes for sending broadcast signals such as PSS, SSS, PBCH, RS, SIB1, and SIB2. The associated low power nodes may be, for example, low power nodes within the coverage umbrella of the macrocell or may be low power nodes having a coverage area at least partially overlapping with the macrocell coverage area. The list may be broadcast, for example, in one or more SIBs transmitted by the macronode on a licensed channel or channels. For example, SIB2 and/or SIB3 may be used, and may include the list as additional information elements (IEs).

At WS-UEs served by low power WS-enabled eNBs, such as femtonodes or piconodes, the UEs need only receive the list and then search on the WS channels included in the list to improve cell access performance. In this way, the channel search process may be accelerated, potentially substantially, over a blind channel search. For example, if 40 WS channels are available, and a list of available WS channels provided to the UE includes only 2 channels, access may be speeded up by a factor of approximately 20 to 1.

Figure 43:
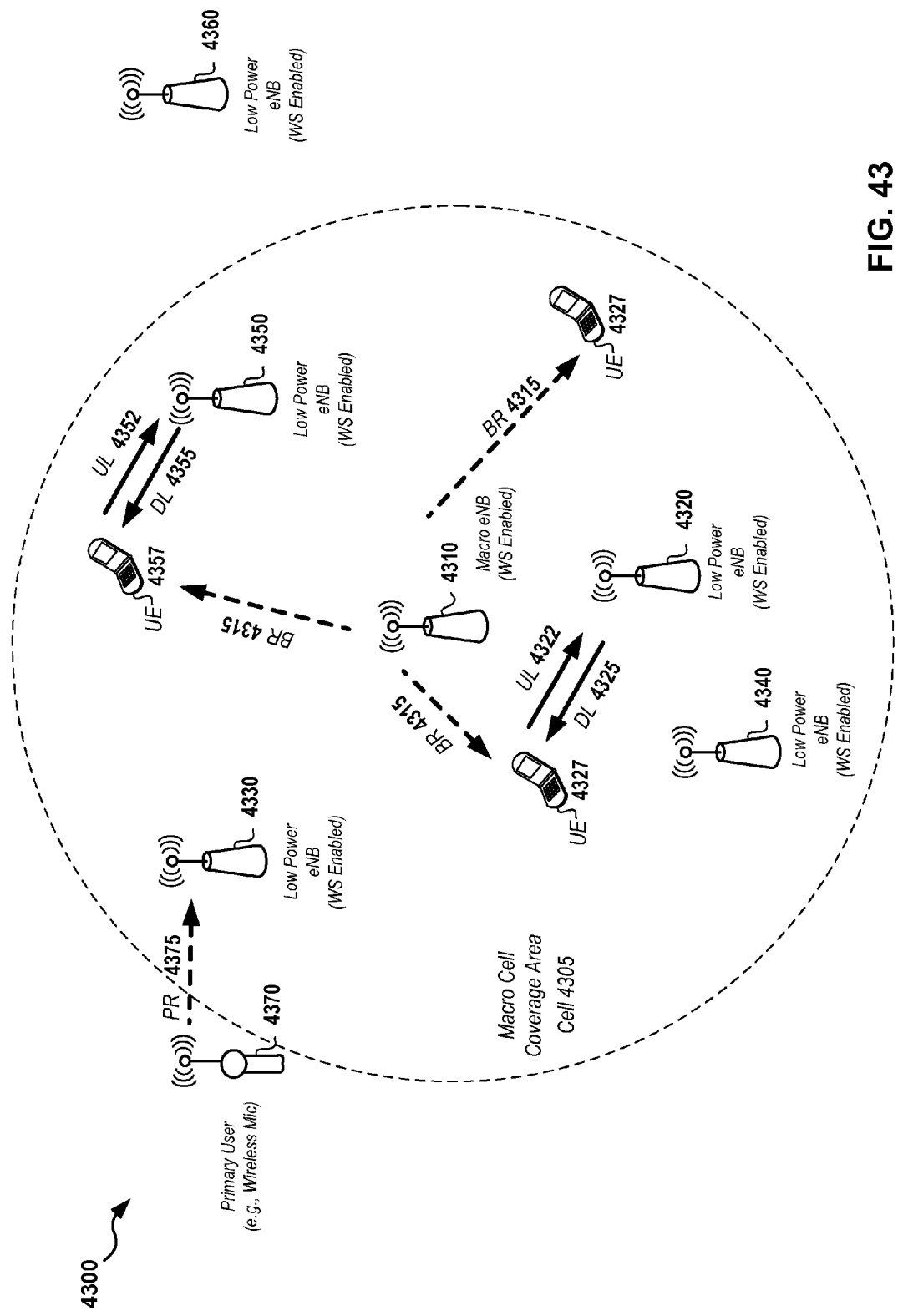
FIG. 43 illustrates details of an embodiment of a WS-enabled wireless network.

To further illustrate this and other aspects, FIG. 43 illustrates an example network configuration 4300 on which embodiments may be implemented. Network 4300 may include one or more base stations or eNBs. For example, network 4300 may include a macrocell base station or eNB 4310. The coverage area or umbrella of eNB 4310 may include the cell coverage area 4305. Base station 4310 may be configured as is shown in, for example, FIGS. 13 and/or 55, and/or may have additional components to provide associated licensed channel functionality.

One or more additional base stations, which may be low power base stations such as femtonodes or piconodes, may be within the coverage area 4305 of eNB 4310. The low power base stations or eNBs may be configured as is shown in, for example, FIG. 13, and/or may have additional components to provide associated unlicensed or white space functionality.

For example, network 4300 may include low power eNBs 4320, 4330, and 4350. It will be apparent that various other configurations of base stations including more or fewer base stations may also be used. Network 4300 may include one or more user terminals or UEs, which may be served by eNB 4310 or the lower power eNBs 4320-4350. The UEs may be configured as shown in, for example, FIGS. 13 and/or 54, and/or may have additional components to provide associated licensed and/or WS functionality. In the example shown in FIG. 43, only three UEs are shown for clarity; however, other network configurations may include fewer or typically more UEs, which may be distributed throughout coverage area 4305. Other low power nodes may be outside the typical coverage area or near the edge of the coverage area of eNB 4310, such as eNB 4360. Other nodes, such as, for example, a primary user device 4370, such as a wireless microphone, may be within or near the coverage area of eNB 4310.

As noted previously, macro eNB 4310 may broadcast, via communication links BR 4315, a list of WS channels used by the associated low power eNB(s). The UEs may then use the broadcast WS channel information to detect and/or camp on associated low power cells, which may be done on WS channels, such as described previously herein.

For example, UE 4327 may establish communication with eNB 4320 via UL 4322 and DL 4325, which may be on WS channel(s). The communication may be established via a WS channel included in the list information provided on a licensed channel by eNB 4310. Likewise, UE 4357 may establish communication with eNB 4350 via DL 4355 and UL 4352, which may be done in a similar fashion. UE 4327 may establish communication with macro eNB 4310 on a licensed channel, or with other base stations, such as eNB 4320, on licensed and/or WS channels (not shown). Various other UEs (not shown in FIG. 43 for clarity) may be in communication with the various eNBs shown in FIG. 43.

Figure 44:
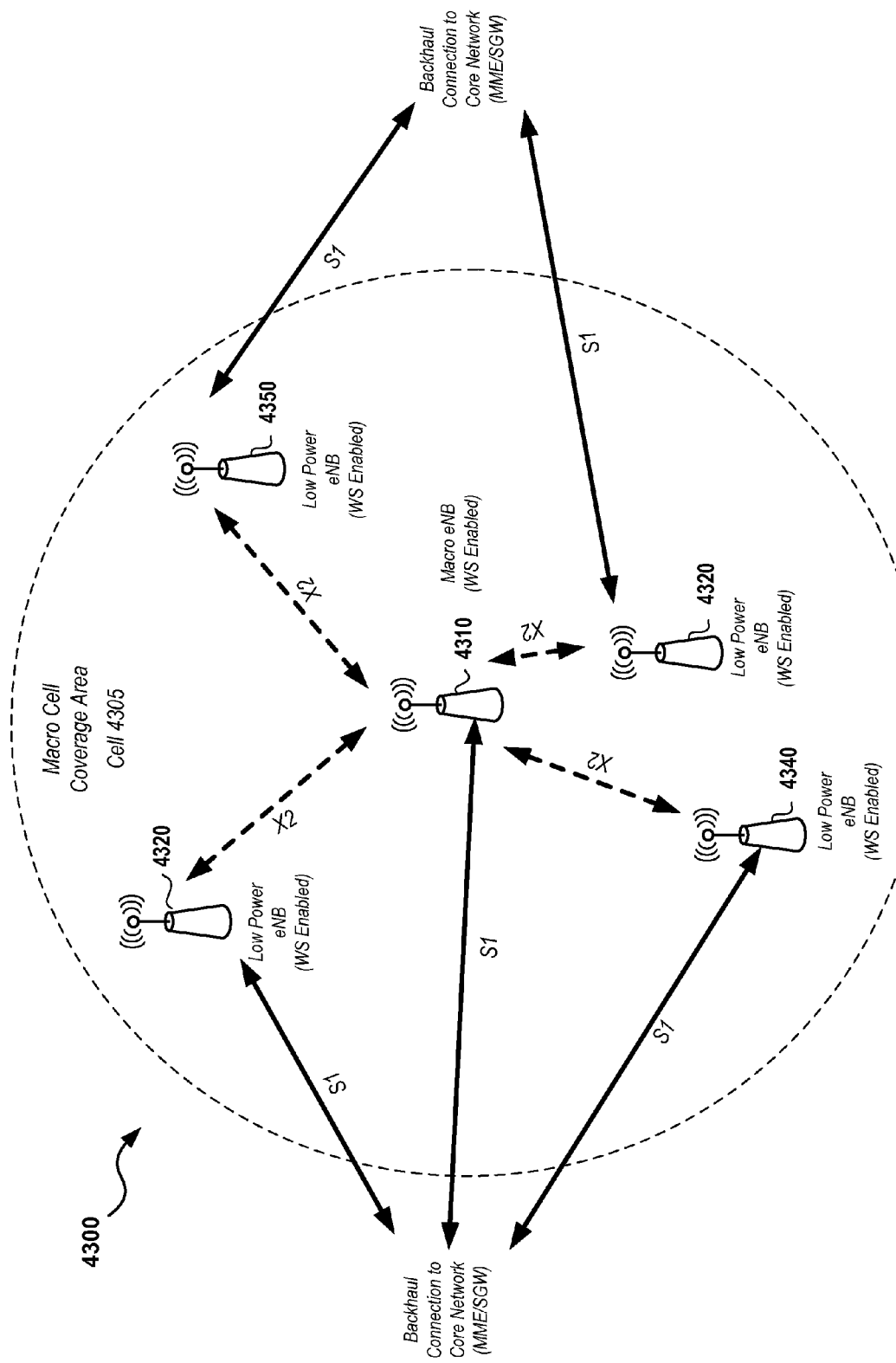
FIG. 44 illustrates details of an example of inter-base station signaling in a WS-enabled wireless network.

In order to facilitate determination and transmission of the channel list information, in one implementation, communication between the various eNBs may be used to coordinate WS channel list determination and transmission. For example, FIG. 44 illustrates one implementation of communication links between the various eNBs and/or core network components that may be used to facilitate such communication. As shown in FIG. 44, the various eNBs may be in communication with core network (CN) components (not shown) via a backhaul connection, such as an S1 interface as described in, for example, the 3GPP LTE Specifications.

Alternately, or in addition, two or more eNBs may be in communication via X2 connections, as described in, for example, the 3GPP LTE Specifications. In an exemplary implementation, the macro eNB 4310 may be in communication with one or more of low power eNBs 4320-4350 via X2 connections, which may be used to send and receive information regarding unlicensed channel usage, such as WS channel information for use in the channel list broadcast on licensed spectrum by macro eNB 4310. In some cases, the low power base stations may also be in communication via either backhaul connections, such as S1 connections, and/or wireless connections, such as X2 connections (not shown between low power base stations).

The communication between eNBs may be a transmission or advertisement of white space channels used by the low power eNBs. For example, each low power WS-eNB, such as eNBs 4320-4350, may periodically and/or asynchronously send information about the WS channel(s) it is currently using (e.g., the WS channels the eNB is sending broadcast information on) to the macro eNB, such as eNB 4310.

Channel information may be initiated at, for example, initial configuration of the low power base station, which may be done by, for example, WS channel scanning at the eNB as described previously herein. The channel information may be updated periodically and/or asynchronously (e.g., event driven), for example, when WS channel changes occur. This may happen when, for example, a low power base station detects a primary user (which, as described previously herein, may necessitate a channel change), such as wireless microphone 4370 as shown in FIG. 43. As noted previously herein, WS nodes, such as WS-eNBs, may be required to periodically scan for primary users and change channels within a defined time of identifying a primary user. For example, if microphone 4370 is not initially on and low power eNB 4330 occupies a WS channel designated as WS-CH 1, if microphone 4370 comes on air and provides a signal, such as signal primary user (PR) 4375 as shown in FIG. 43, eNB 4330 may be required to detect it and then change operation to another channel, such as WS-CH 2.

In other cases, WS channel changes may be driven by interference, channel load balancing, and/or other channel configuration or optimization conditions or criteria.

The macro eNB 4310 may periodically collect all WS channel information for the associated low power base stations within its coverage umbrella, and update the list to include this information. The initial and updated WS channel list information may be transmitted periodically and/or asynchronously (e.g., based on channel changes at one or more low power base stations).

In order to potentially improve channel search and detection, it may be desirable to minimize the number of channels included in the channel list that is sent by a macro eNB, such as eNB 4310. For example, a UE, such as UE 4327 or 4357 of FIG. 43, may receives a SIB (for example, SIB 2, SIB 3) broadcast from macro eNB 4310 on a licensed channel, and may then extract a list of white space channels. The list of WS channels may initially include 4 or 5 WS channels used by the various low power base stations within the macro eNB 4310 coverage area. However, cell access performance may be further enhanced if the number of white space channels, and correspondingly the list size, is minimized among the various macro and low power base stations/eNBs. For example, if only two WS channels are included in the list (rather than 4 or 5), access may be improved proportionately. This approach may also be viewed as a form of channel reuse, wherein available WS channels are preferably reused among various low power base stations within the coverage area of an associated macro eNB.

In order to optimize the search process, the channel list may be minimized in various ways. For example, the list may be minimized by direct communication and negotiation between the low power base stations and macro base station. In another aspect, the minimization may be facilitated by OTA communications. The macro eNB may coordinate the list management, however, channel utilization will typically be ultimately decided at the low power base stations (because they may be the only node aware of primary users, etc., and therefore should have final decision regarding WS channel utilization).

Although it may be desirable in general to reuse WS channels to minimize list size, in some cases, it may be undesirable to share WS channels. Some examples can be described with respect to FIG. 43. For example, in one case, if a primary user, such as wireless microphone 4370, sends a transmission 4375 which is detected by a lower power eNB, such as eNB 4330, on a particular WS channel (denoted as WS-CH 1 as described previously), the eNB 4330 will need to change channels, as described previously herein. However, other eNBs, such as eNBs 4320, 4340, and 4350 may be outside of the range of microphone 4370, in which case they may still be able to use channel WS-CH 1. In this case, it may be desirable to include additional channels, such as channel WS-CH 1, in the list, even if all of the low power base stations cannot use the channels.

Another example is the case where two (or more) low power cells are creating interference with each other on a WS channel or channels. For example, as also shown in FIG. 43, low power eNBs 4320 and 4340 may be within the coverage area of each other and may be operating on the same WS channel, which may create interference with served UEs, such as UE 4327. In this case, it may be desirable to ensure that the interfering eNBs use different WS channels to avoid interference.

Other cases where use of more than a minimum number of WS channels may also occur, in which case more than a minimal number of WS channels may be included in the list. In these cases, the eNB may further propose use of particular WS channels or sets of WS channels to particular eNBs.

Aside from these two cases, as noted previously, it may generally be preferable to coordinate WS channel usage so as to minimize list size. For example, in one implementation, messaging may be passed between a macro eNB, such as eNB 4310, and associated low power base stations, such as eNBs 4320-4350, to coordinate and configure WS channel selection based on channels preferred by the macro eNB. This may be done via, for example, S1 or X2 interfaces as shown in FIG. 44.

Alternately, or in addition to coordination between eNBs using backhaul signaling (e.g., via S1 interfaces) or direct signaling (e.g., via X2 interfaces), over the air WS channel list determination may be performed. For example, in one implementation, the low power base stations (e.g., femto or picocell eNBs) may initially determine a non-optimal configuration of WS channels. For example, each may perform an independent search for available WS channels, such as looking for channel characteristics, primary users, interference, etc. The sum total of all WS channels used by the low power base stations in the coverage area of an associated macrocell (e.g., the sum total of all of the low power eNB selected WS channels) may, however, be overly large when viewed as a collection of channels.

If the low power eNB has a licensed receiver, it may then receive a list of WS channels in use that is broadcast by the macro eNB over a licensed channel, similar or analogous to a broadcast transmission to the WS-UEs. In addition to particular WS channels, the list may also include a prioritization of WS channels which the low power base stations may optionally follow. If the low power base stations (e.g., a femto or picocell eNB) have an included licensed channel receiver module (in addition to a WS channel receiver), they may then receive the list information from the macro eNB.

The low power eNBs may then extract the list information and analyze the channel information. For example, the low power eNB may see, from information in the list, certain channels in the list. The low power eNB also knows which WS channel or channels it is using. For example, the list may include WS channels 1, 2, and 3, which may be prioritized in that order. If the low power eNB is using, for example, channel 3, it may then make a determination (e.g., by looking for primary receivers on channel 1, making a determination as to interference, and/or otherwise determining channel suitability, and then switching operation to channel 1, if appropriate) as to whether it can change to channels 1 or 2. If channel 1 can be used, the low power eNB may switch operation to that channel, in which case it will send it's broadcast information (e.g., PSS/SSS, etc.) on channel 1. If channel 1 is not available, it may make a determination as to whether channel 2 is usable, and may switch to channel 2, or continue operation on channel 3 if neither channel 1 or 2 is usable.

Figure 45:
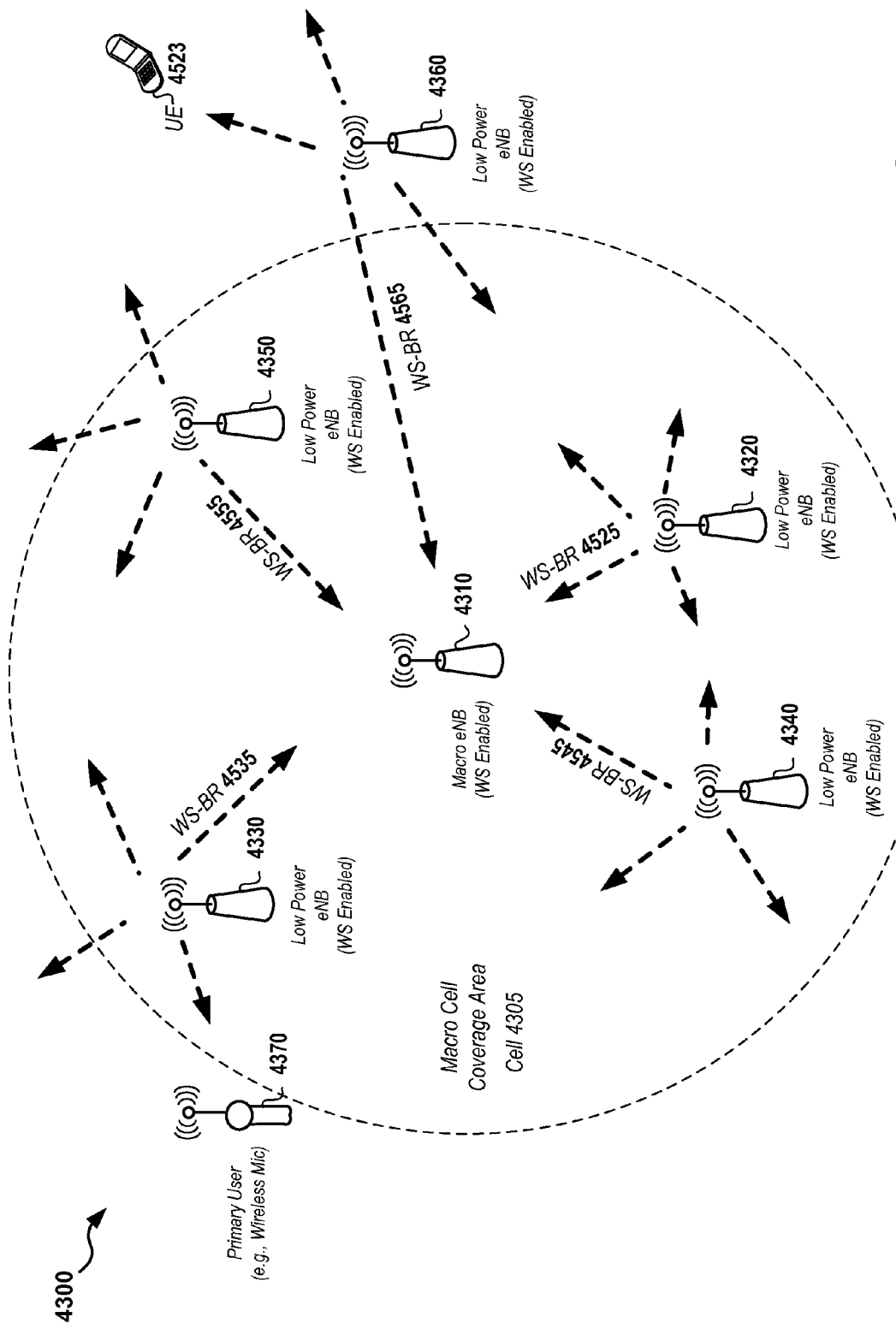
FIG. 45 illustrates details of an example of white space broadcast signaling and channel detection.

FIG. 45 illustrates additional details regarding various aspects. As shown in FIG. 45, a macro base station, such as eNB 4310, which includes a WS receiver module, may receive the various WS channel broadcast signals WS-BR 4525, 4535, 4545, and 4555 from eNBs 4320-4350. The macro base station may then make a determination as to which WS channels are in use, which may be based on detecting the signals WS-BR 4525-4555.

To receive the WS channel signals provided from the low power base stations, the macro, such as eNB 4310, may scan all WS channels, and perform similar processing to what a WS-UE would do in accessing a cell. For example, the macro base station may attempt to decode PSS and SSS. If the macro is able to receive this information, it may then decode rest of the broadcast signals and evaluate some channel quality or power metric, such as RSRP or RSRQ. This may be done to measure the coverage area of low power nodes within the macro coverage umbrella.

For example, a threshold may be used, and if the received channel metric is above a predefined threshold, the macro may then infer that a low power WS-eNB is within the coverage area and is using the WS channel. Information on the detected WS channels used by the low power base station may then be added to the list and sent in a broadcast message, such as described previously herein.

As one example, a macro base station, such as eNB 4310 of FIG. 45, may receive white space broadcast signals from multiple low power base stations, such as eNBs 4320-4350. Signals may also be received from other base stations, such as base station 4560, which may be more distant from base station 4310 and/or may be transmitting at a lower power level. If the broadcast signals WS-BR 4525, 4535, 4545, and 4555 are detected and above the threshold their associated frequency/channel or channels may then be added to the list. More distant base stations, such as eNB 4360, may have weaker signals or may have poorer channel metrics. For example, signal WS-BR 4565, from low power eNB 4360, may result in a channel metric at eNB 4310 that is lower than the threshold, in which case eNB 4310 may infer that eNB 4360 is outside the coverage umbrella or should otherwise not be included in the WS channel list.

Figure 46:
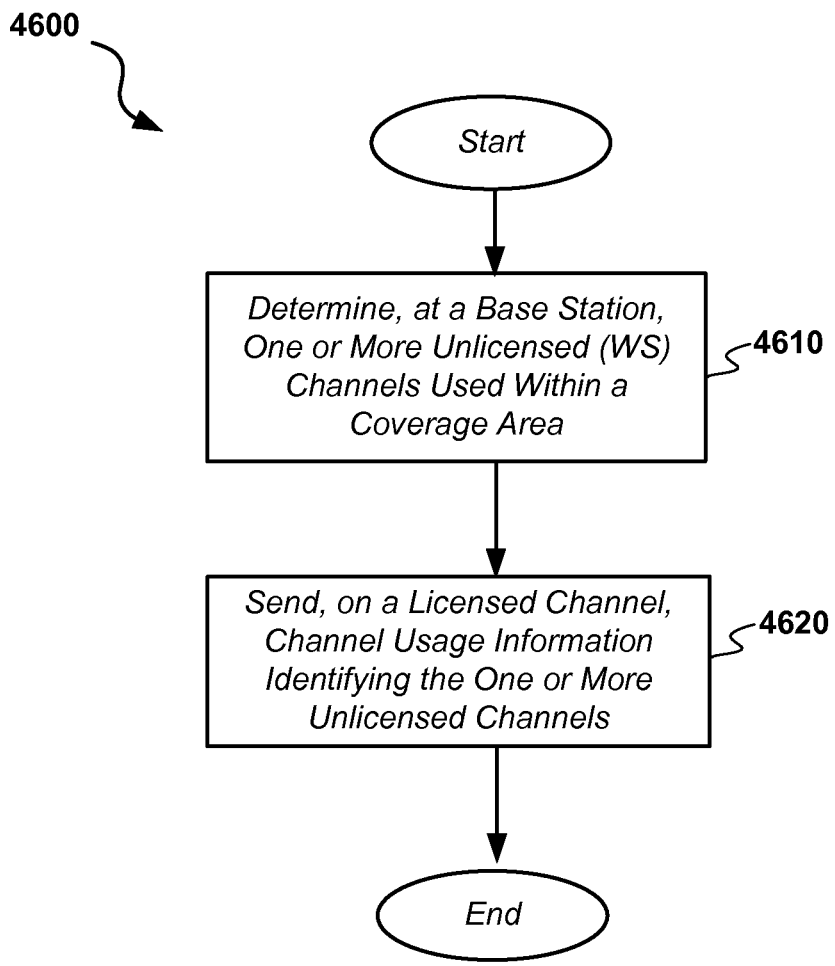
FIG. 46 illustrates details of an embodiment of a process for providing channel usage information in a WS-enabled wireless network.

Attention is now directed to FIG. 46, which illustrates details of an embodiment of a process 4600 for providing channel information that may be used by a network node to select unlicensed spectrum for operation, such as WS channels. At stage 4610, a determination may be made at a base station of one or more unlicensed channels, such as WS channels, that are being used in a coverage area of the base station. At stage 4620, channel usage information may be sent by the base station, on a licensed channel, identifying the one or more unlicensed channels.

The process 4600 may be performed in a base station, such as a macrocell base station. The base station may be an eNB. The licensed channel may be a channel licensed for LTE operation. The unlicensed channel or channels may be white space channels. The list may be received at a user terminal. The user terminal may be a UE. The stage of sending 4620 may include, for example, broadcasting the channel usage information in the form of a list. The list may be included in an information element. The information element may be included within one or more SIBs. The SIBs may be SIB2 and/or SIB3 in an LTE system. The sending may further include, for example, broadcasting additional channel-related information. The additional channel-related information may include information such as channel priorities or preferred channel access ordering, and/or other channel related information.

The stage of determining 4610 may include, for example, receiving, from a first low-power node operating within the coverage area, first advertised channel usage information. The stage of determining 4610 may further include receiving, from a second low-power node operating within the coverage area, second advertised channel usage information. The receiving may include, for example, receiving the first and/or second advertised channel information using backhaul signaling. Alternately, or in addition, the receiving may include receiving the first and/or second advertised channel information using wireless signaling. The wireless signaling may comprise, for example, X1 signaling.

The stage of determining may include, for example, receiving, from a receiver associated with a macro node, information relating to the existence of transmissions within the one or more licensed channels. The receiving may include detecting the transmissions. Each of the transmissions may comprise a DL LTE transmission. The process 4600 may further include decoding the DL LTE transmission or transmissions. The stage of decoding may include a reduced decoding process such as, for example, decoding only the SSS/PSS signals so as to verify that the received transmissions are valid LTE transmissions.

The stage of determining may include, for example, receiving, from a receiver associated with a macro node, signal strength information. The signal strength information may be compared to a threshold. The comparing to a threshold may include excluding, responsive to the comparing, an unlicensed channel having a signal strength below the threshold.

Figure 47:
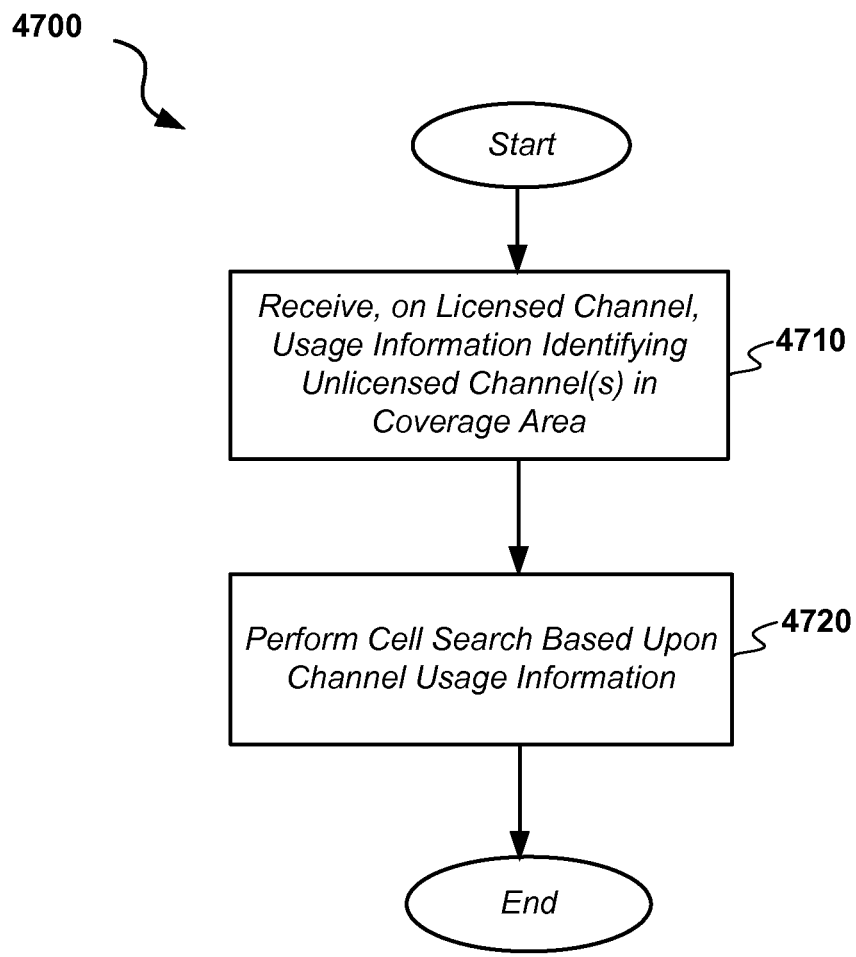
FIG. 47 illustrates details of an embodiment of a process for facilitating cell access in a WS-enabled wireless network.

FIG. 47 illustrates details of an embodiment of a process 4700 for accessing a wireless network. At stage 4710, usage information identifying one or more unlicensed channels, such as WS channels, in a coverage area may be received. At stage 4720, a cell search procedure may be performed, which may be based at least in part on the channel usage information. The usage information may be received at a user terminal, such as a UE.

The licensed channel may be an LTE licensed channel and the unlicensed channel may be a WS channel. The user terminal may be an LTE WS-UE. The performing may include scanning the one or more unlicensed channels. The process 4700 may further include initiating an access procedure on a base station transmitting on the one or more unlicensed channels. The base station may be a WS-eNB. The WS-eNB may be a low power eNB. The low power eNB may be a femtocell base station or picocell base station.

The stage 4710 of receiving may include receiving a SIB broadcast on the licensed channel and extracting the channel usage information from the SIB. The SIB may be SIB 2 and/or SIB 3.

The stage 4720 of performing a cell search may further include refraining from scanning any unlicensed channels not included in the list. Alternately, or in addition, the performing a cell search may include refraining from scanning any licensed channels. The stage of receiving may further include periodically receiving updated channel usage information. The process 4700 may further include changing a channel based on the updated channel usage information. The stage of receiving may further include receiving the channel usage information when changes occur to the one or more unlicensed channels used within the coverage area.

Alternately or in addition, the performing may include scanning one or more additional unlicensed channels not includes in the channel list. The one or more additional unlicensed channels may be scanned at a lower priority, lower frequency or periodicity, or both, compared to the channels included in the list. A decision on lower priority and/or periodicity scanning may be made by a terminal such as a UE based on various conditions. For example, if a UE is operating in an idle mode (such as RRC_IDLE) and there is sufficient battery power, the UE may decide to scan other channels in addition to those on the list. However, to speed up access performance, these channels may be scanned only if no signals are detected on the list channels.

In some implementations scanning of channels on the channel list may be made mandatory, or may be scanned at a higher rate/periodicity so as to improve performance during cell reselection.

Figure 48:
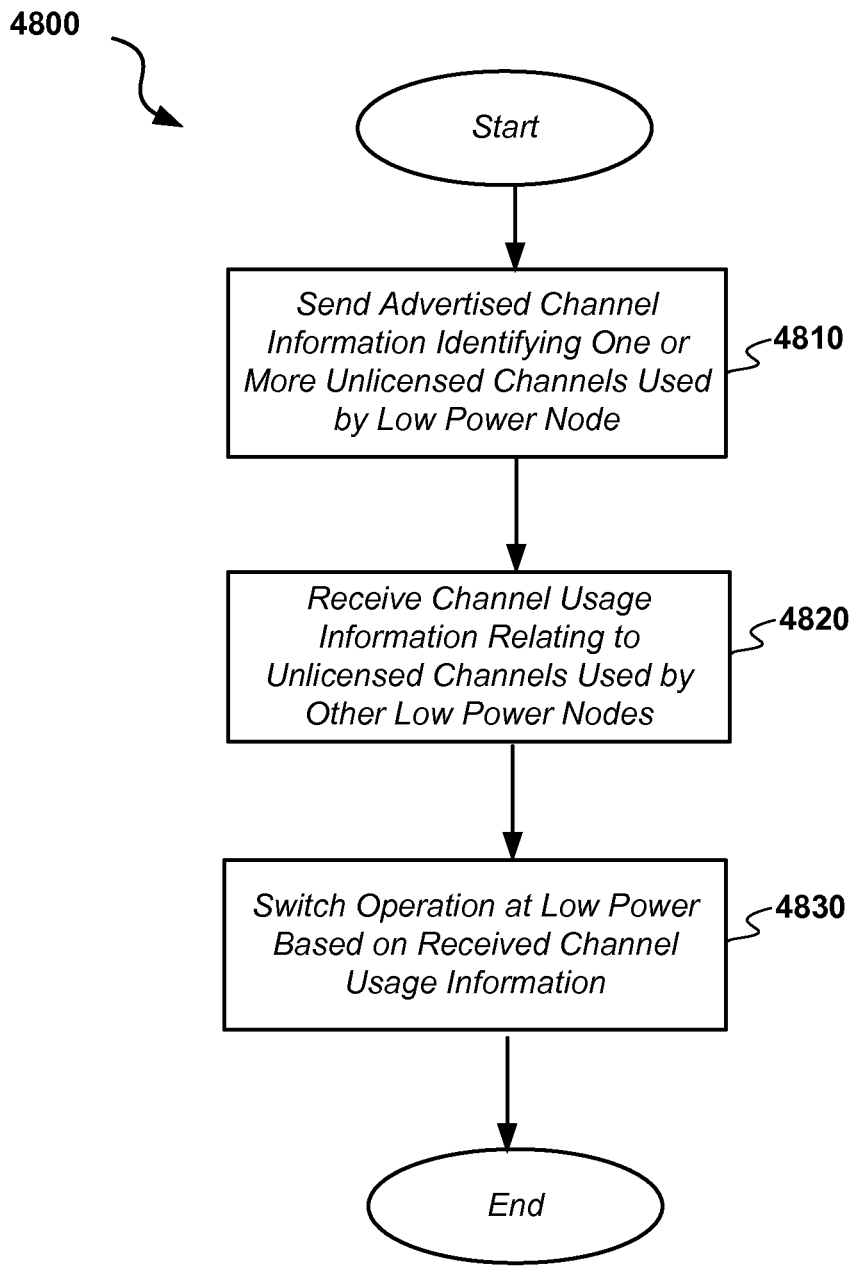
FIG. 48 illustrates details of an embodiment of a process for facilitating WS channel selection in a WS-enabled wireless network.

FIG. 48 illustrates details of an embodiment of a process 4800 for providing wireless communications. At stage 4810, advertised channel information identifying one or more unlicensed channels used by a low power node may be sent to one or more network nodes. The information may be sent from a first low power network node. At stage 4820, channel usage information may be received. The channel usage information may be associated with a plurality of unlicensed channels used by one or more other low-power nodes.

The stage of sending 4810 may include sending the advertised channel information to a second network node. The second network node may be a macrocell base station. The macrocell base station may be an LTE eNB. The low power nodes may be low power base stations. The low power base stations may be piconodes or femtonodes. The channel usage information may be received at the low power node from the second network node.

Process 4800 may further include a stage 4830 of switching, at the low-power node, to use of one or more of the plurality of unlicensed channels in response to receipt of the channel usage information. The receiving may include receiving the channel usage information using backhaul signaling. The receiving may include receiving, from a macro node, a broadcast transmission including the channel usage information. The method may further include changing the one or more unlicensed channels used by the low-power node in response to negotiation with other low-power nodes using backhaul signaling.

Figure 49:
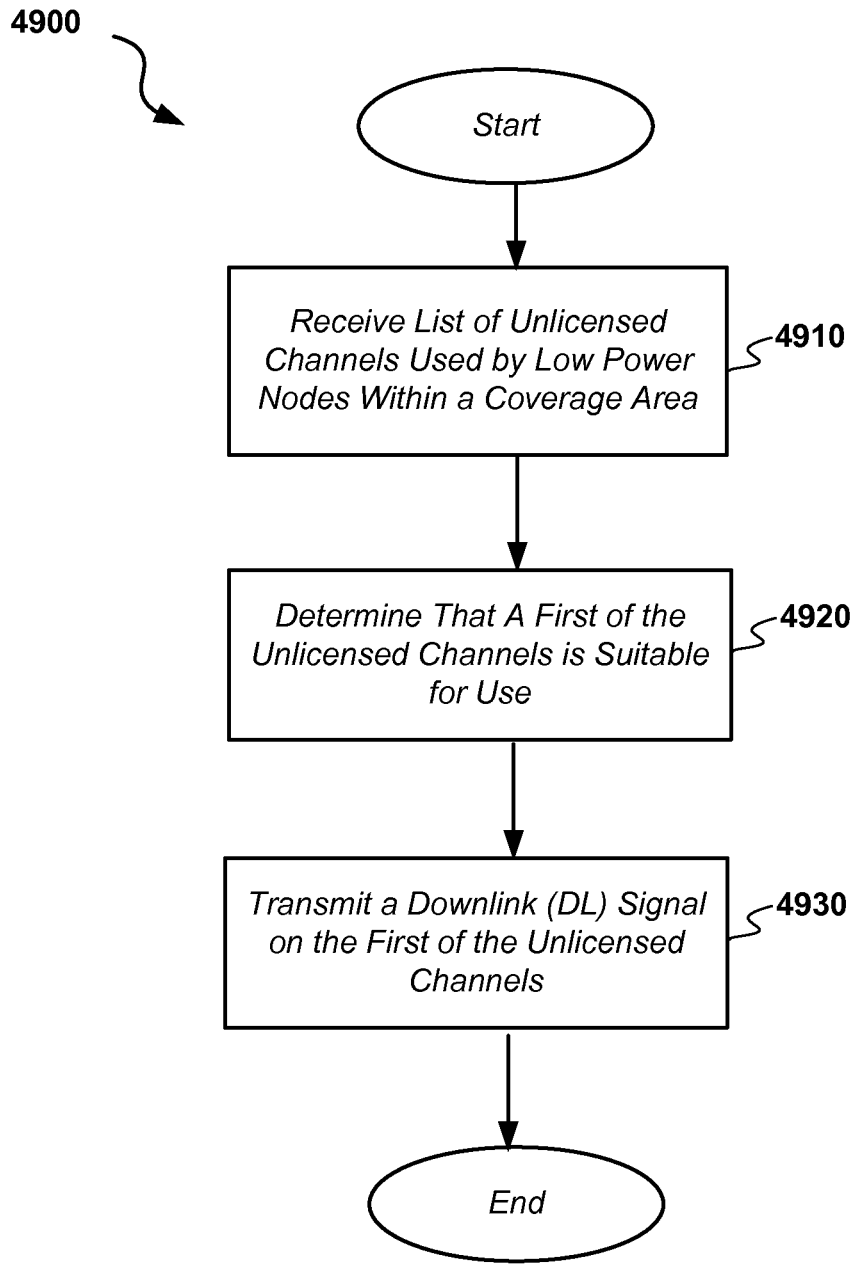
FIG. 49 illustrates details of an embodiment of a process for selecting a WS channel for use in a WS-enabled wireless network.

FIG. 49 illustrates details of an embodiment of a process 4900 for providing wireless communications. At stage 4910, a list of unlicensed channels used by low-power nodes within a coverage area may be received at a low-power node. At stage 4920, a determination may be made as to whether a first of the unlicensed channels is suitable for use. At stage 4930, a DL signal may be sent from the low power node on the first of the unlicensed channels.

The low power node may be a femtocell or picocell eNB. The list of unlicensed channels may be received on a licensed channel. The list of unlicensed channels may be provided from a macrocell eNB. The stage of determining 4920 may include determining that a primary user is not using the first of the unlicensed channels. Alternately, or in addition, the stage of determining may include determining a level of interference on the first of the unlicensed channels is below a predefined threshold.

The process 4900 may further include receiving an updated list of unlicensed channels used by low-power nodes within the coverage area. The updated list may include prioritization associated with the unlicensed channels. The process may further include determining that a second unlicensed channel, different from the first unlicensed channel, in the updated list of unlicensed channels is suitable for use. The process may further include transmitting a DL signal from the low power node on the second unlicensed channel. The determining that a second unlicensed channel is suitable for use may include determining that the second unlicensed channel has a higher priority in the updated list of unlicensed channels than the first unlicensed channel.

The coverage area may, for example, be associated with a macrocell node, the list of unlicensed channels being generated by the macrocell node.

Figure 50:
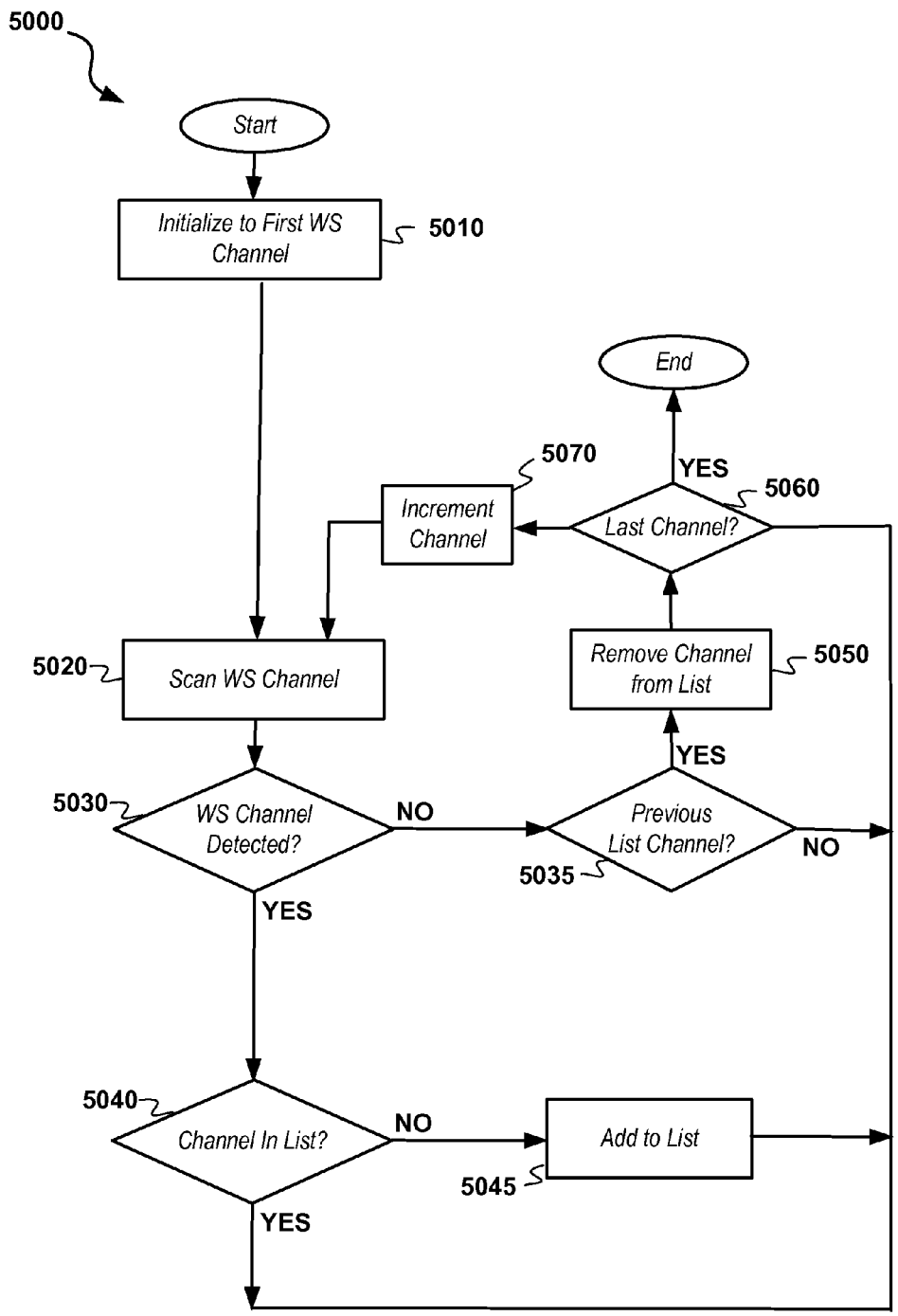
FIG. 50 illustrates details of an embodiment of a process for updating a WS channel list for use in a WS-enabled wireless network.

FIG. 50 illustrates details of a process 5000 for scanning and updating an unlicensed channel list, such as may be done in a base station. The base station may be, for example, an LTE macro eNB. At stage 5010, an initial unlicensed channel in a channel search list may be identified or selected. The channel search list may include, for example, a list of all potentially usable unlicensed or WS channels, or some other list of channels to be searched.

At stage 5020, the selected channel may then be scanned. The scanning may be done by, for example, attempting to detect PSS/SSS as described previously herein, and then decoding additional broadcast signals to attempt to access a base station, such as a low power base station, transmitting on the channel. This may be done in a fashion similar to that performed by a user terminal, such as a UE.

At stage 5030, a determination may be made as to whether a signal on the WS channel is being sent and/or whether the signal is above a threshold, such as a predefined threshold associated with usage of the channel in the WS channel list. If a channel is detected, it may be assumed that the channel is in use within the coverage area of the base station, and therefore may be added to a WS channel list, which may be used as described previously herein for sending WS channel information to user terminals, such as UEs, as well as to low power nodes, such as femto or pico eNBs.

If a channel is detected at stage 5030, a determination stage 5040 may then be performed to determine whether the detected channel is already in the WS channel list. If the channel is not in the WS channel list, it may be added at stage 5045. Alternately, if the channel is in the list (e.g., the channel has previously been detected or otherwise added to the WS channel list and is still in use), processing may proceed to stage 5060.

Returning to stage 5030, if no WS channel is detected (and/or if a detected channel is determined to be too weak, such as, for example, having a channel metric below a threshold), processing may proceed to stage 5035, where a determination may be made as to whether the channel was previously in the WS channel list. At stage 5035, if the channel was previously in the list, it may be removed at stage 5050. Alternately, if the channel was not in the list, processing may proceed to stage 5060.

At stage 5060, a determination may be made as to whether the current channel is the last channel in the list of channels to be searched. If the current channel is the last channel, processing may be completed, and/or may be repeated, such as periodically or asynchronously. Alternately, if the current channel is not the last channel in the list of channels to be searched, the current channel may be incremented, and processing may be repeated starting at stage 5020, until all the channels in the list of channels to be searched have been searched.

Figure 51:
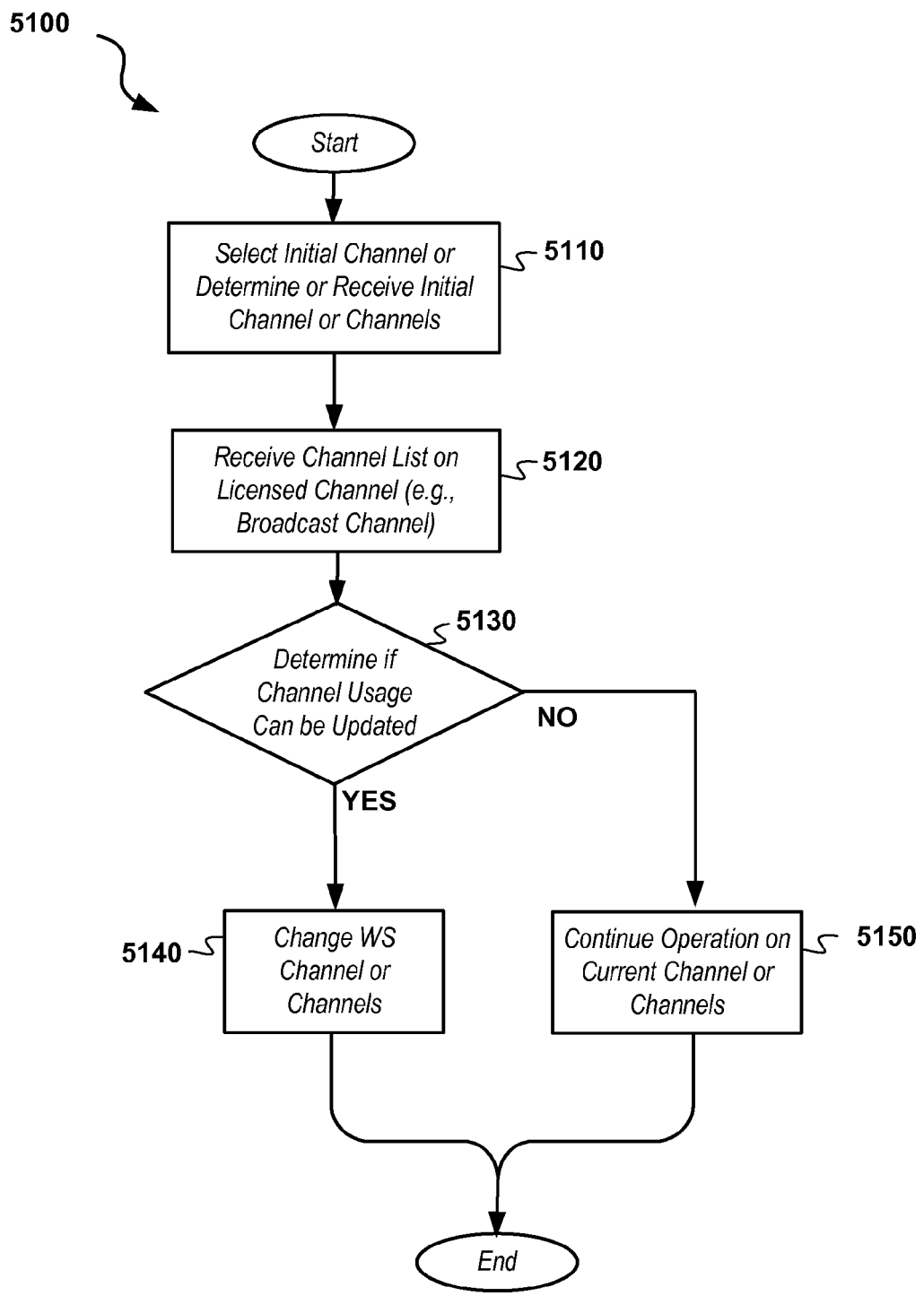
FIG. 51 illustrates details of an embodiment of a process for updating WS channel usabe for use in a WS-enabled wireless network.

Attention is now directed to FIG. 51, which illustrates details of a process 5100 for selecting a channel for usage, such as in a low power base station, such as a femto or pico eNB. At stage 5110, an initial channel or channels for WS channel search may be selected at the base station. This may be done by, for example, performing a broad search for available channels upon initial power-up, searching for a list of channels sent by another node (such as described previously herein), and/or via other methods of initializing WS channel usage, such as via search and detection of conflicting primary users, etc. Once initial operation on one or more WS channels has been established, a channel list may be received at stage 5120. This may be done, for example, by receiving the channel list via a broadcast on a licensed channel, or via a connection such as an S1 or X2 connection. The channel list may include a set of multiple channels, which may be prioritized based on a preferred channel usage priority. The usage priority may be based on, for example, criteria for minimizing list size and reusing WS channels, such as described previously herein.

If it is determined that channel usage can be updated/changed, operation may then be switched to the new channel at stage 5140. For example, if a currently used channel is not on the list, or is on the list at a lower priority than other usable channels, operation may be switched to one or more of the other, higher priority usable channels. Alternately, if a determination is made at stage 5130 that channel usage cannot be updated, for example, if a primary user is detected on a higher priority channel, thereby precluding use of that channel, operation may be continued at stage 5150 on the current channel or channels. In addition, if a low power base station, such as a femto or piconode, determines to change channels, it may notify the associated macro base station so that the channel list may be promptly updated and/or transmitted. This may be done, for example, via a backhaul connection such as described previously herein.

Figure 52:
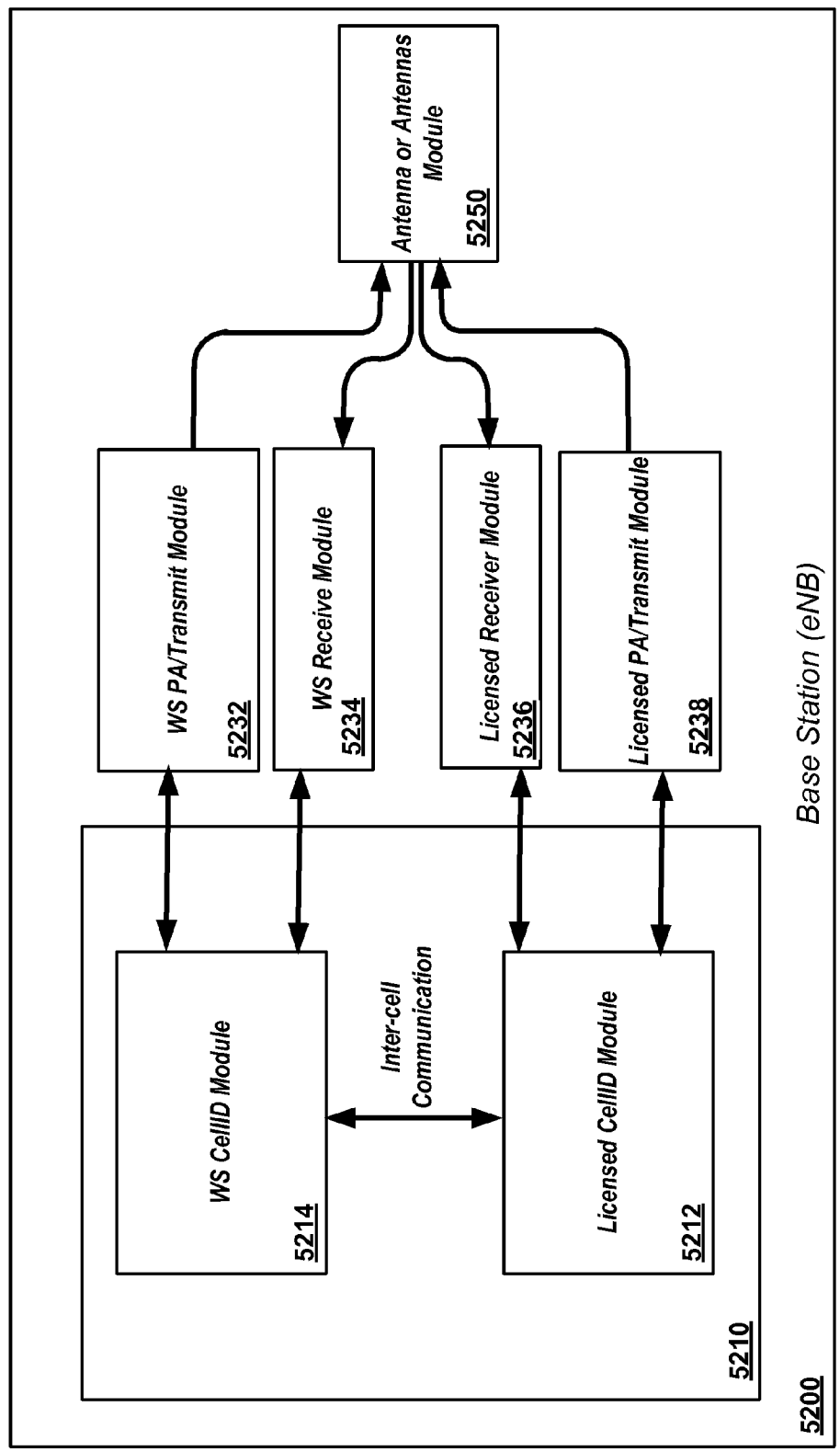
FIG. 52 illustrates details of an embodiment of a base station for use in a WS-enabled wireless network.

In another aspect, the disclosure relates to a base station, such as an eNB, that is configured for operation on both licensed and unlicensed channels. For example, the base station may be configured to operate on licensed LTE channels as well as unlicensed WS channels. FIG. 52 illustrates details of an embodiment 5200 of such a base station, also denoted herein as a dual cell base station or dual cell eNB. In particular, dual cell eNB 5200 is configured to include both a licensed spectrum cell ID and an unlicensed spectrum cell ID, both integral within eNB 5200. Modules associated with the two cells are shown in base station module 5210, which includes a WS Cell ID module 5214 and a Licensed CellID Module 5212. The modules may be configured as separate logical modules within a shared physical module, such as shown previously herein with respect to various eNB implementations, including, for example, FIG. 13. Modules 5214 and 5212 may be interconnected so as to communication to share information, such as channel list information, handover information, channel characteristic information, such as channel metrics, and/or other information related to coordination operation between two cells. From the perspective of a user terminal, such as a UE, the eNB 5200 functions as two separate base stations managing two different cells, with distinct cell IDs. However, the functionality is integrated in a single base station device.

eNB 5200 will typically include two separate power amplifier (PA) and transmit module chains, 5232 and 5238. These may be coupled to either separate antennas or a common antenna, depending on channel operating frequencies, and/or other RF or signal parameters. Likewise, eNB 5200 may include separate receiver modules 5234 and 5236. The receiver modules may, however, be integrated into a single module in some embodiments. Receiver modules 5234 and 5236 may share antennas with transmitter modules 5232 and 5238 and/or with each other.

Figure 53:
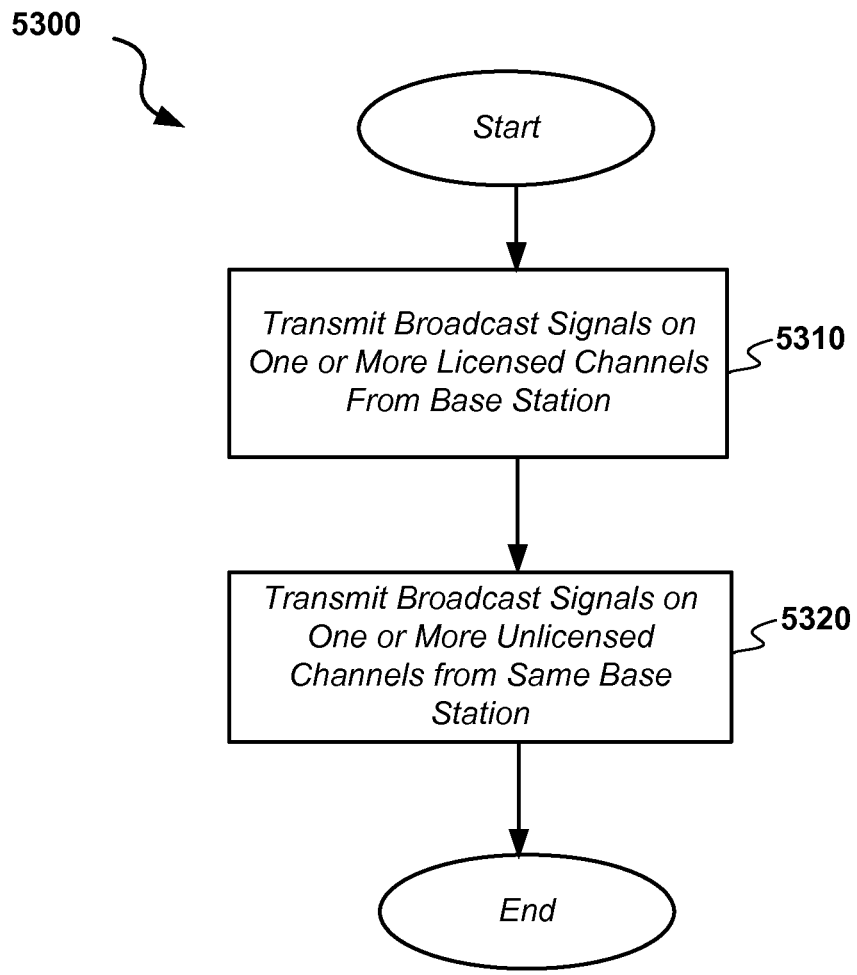
FIG. 53 illustrates details of a process for providing signaling from a base station such as shown in FIG. 52.

FIG. 53 illustrates details of an embodiment of a process 5300 for providing signaling from a dual cell eNB, such as eNB 5200 as shown in FIG. 53. At stage 5310, the dual cell eNB may transmit broadcast signals on one or more licensed channels, such as described previously herein. At stage 5320, the dual cell eNB may transmit broadcast signals on one or more unlicensed channels. The broadcast signals on licensed channels and unlicensed channels may have associated different cell IDs and related information so as to function as two separate logical cell base stations.

Figure 54:
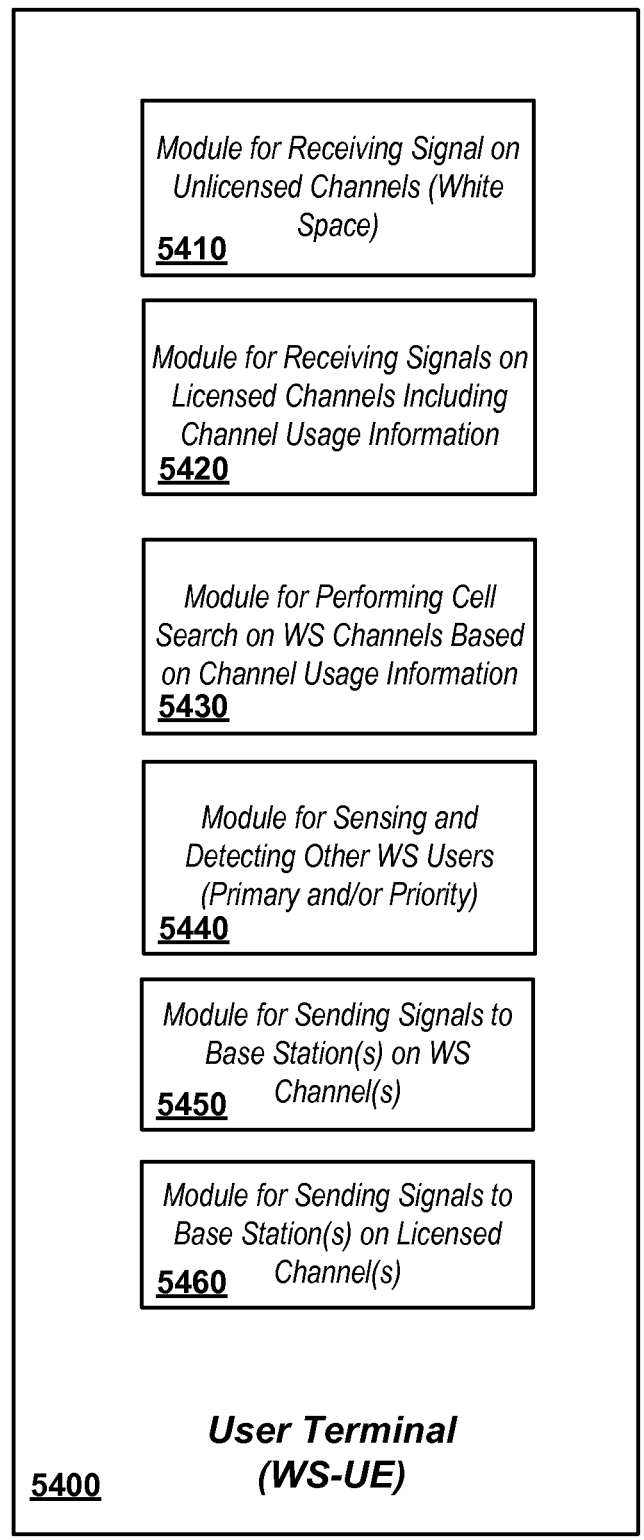
FIG. 54 illustrates details of an embodiment of a WS-enabled UE.

FIG. 54 illustrates details of an embodiment of a WS-UE 5400 configured for performing the functionality described herein, and in particular with respect to the processes illustrated in FIGS. 46-51 and 53. WS-UE 5400 may include a module 5410 configured for receiving signals on unlicensed spectrum, such as white space channels, as well as a module 5420 configured for receiving signals on licensed spectrum, such as licensed cellular channels. Module 5420 may include, for example, components for receiving signals on licensed channels such as described previously herein, as well as components for receiving, decoding, and extracting channel usage information, such as a channel list. The channel usage information may be received and extracted periodically and/or asynchronously. WS-UE 5400 may further include a module 5430 configured for performing a cell search procedure, which may be done on a WS channel or channels included in the channel list. WS-UE 5400 may also include a module 5440 configured to detect other users in the unlicensed/white space channels, such as, for example, primary users.

In addition, WS-UE 5400 may include a module 5450 for sending signals to one or more base stations, such as a low power base station such as a femto node or piconode, using one or more WS channels. For example, module 5450 may include one or more processors, radio frequency (RF) components, modulators, transmitters, antennas, etc. In addition, a similar module 5460 may be configured for sending signals to one or more low power base stations on one or more licensed channels. Various additional modules and related components (not shown) may be incorporated in WS-UE 5400. For example, WS-UE 5400 may be configured consistently with the example UE illustrated in FIG. 13.

Figure 55:
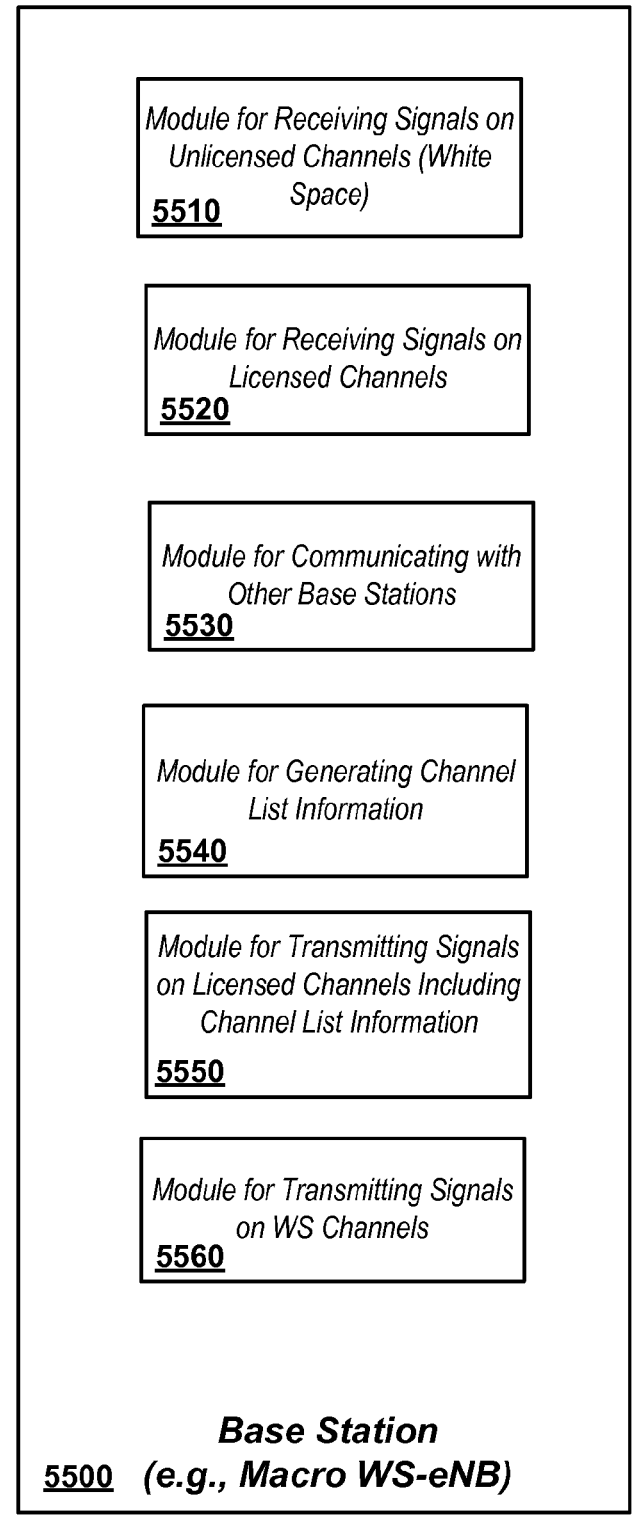
FIG. 55 illustrates details of an embodiment of a WS-enabled macro eNB.

FIG. 55 illustrates details of an embodiment of a WS-eNB 5500 configured for performing functionality described herein, and in particular with respect to the processes illustrated in FIGS. 46-51 and 53. WS-eNB 5500 may be a macro eNB, which may include a module 5510 configured for receiving signals on unlicensed spectrum, such as white space channels, as well as a module 5520 configured for receiving signals on licensed spectrum, such as licensed cellular channels. Module 5510 may be configuration, for example, to scan WS channels such as described previously herein for determining and/or updating WS channel lists. In some implementations, modules 5510 and 5520 may comprise separate modules, however, in some implementations they may comprise a single receiver module (which may be, for example, coupled to different antennas and/or front end modules, etc.).

Alternately or in addition, WS-eNB 5500 may include a module 5530 for receiving and/or sending channel information to other base stations, such as a low power base station. This may include receiving channel usage information from other base station(s) that may be used to generate WS channel lists. Signaling may be done using, for example, a backhaul connection. Received channel information, such as WS channel usage at a low power base station, may be used to generate one or more channel lists, which may be done in module 5540. In addition, module 5540 may be used to incorporate the channel list information into a transmit message, such as in a SIB as described previously herein.

WS-eNB 5500 may also include a module 5550 for transmitting the channel list information, which may be done on a licensed channel. The channel list may be transmitted so as to be received by one or more user terminals such as UEs within the coverage area of eNB 5500.

In some implementations, base station 5500 may also include a module 5560 for sending signals on unlicensed channels, such as white space channels. Various additional modules and related components (not shown) may be incorporated in WS-eNB 5500. For example, WS-eNB 5500 may be configured consistently with the example eNB illustrated in FIG. 13.

Figure 56:
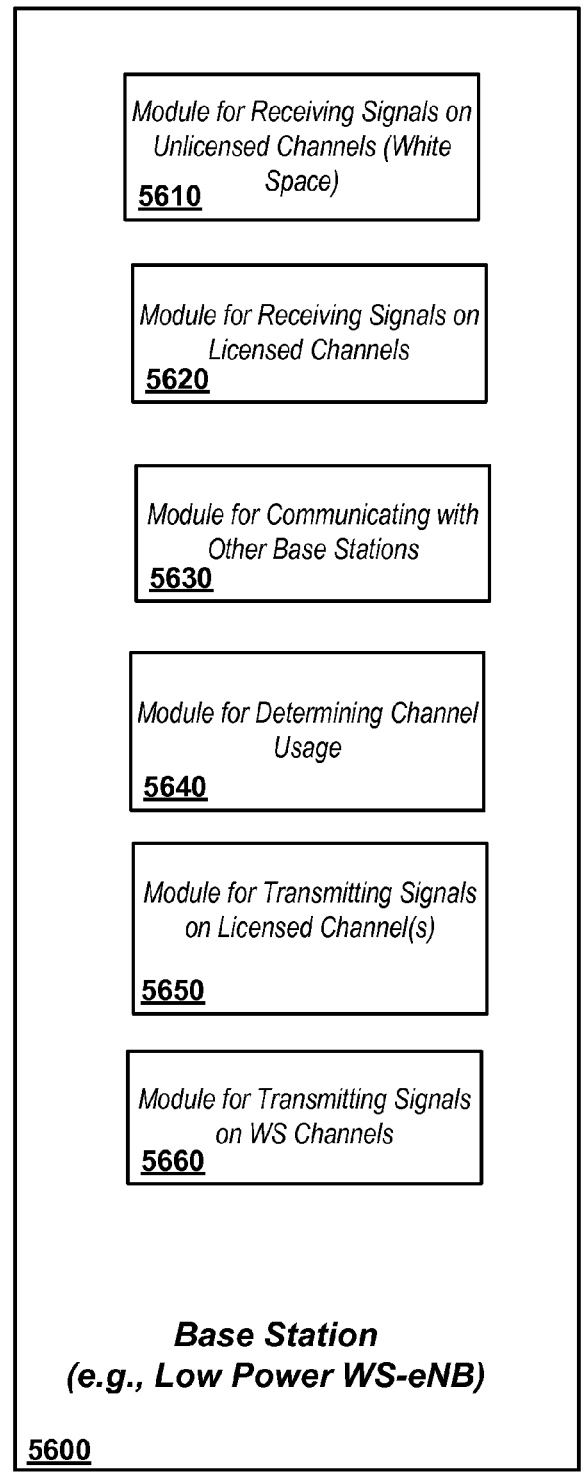
FIG. 56 illustrates details of an embodiment of a WS-enabled low power eNB.

FIG. 56 illustrates details of an embodiment of a WS-eNB 5600 configured for performing functionality described herein, and in particular with respect to the processes illustrated in FIGS. 46-51 and 53. WS-eNB 5600 may be a low power base station, such as a femto or picocell eNB. eNB 5600 may include a module 5610 configured for receiving signals on unlicensed spectrum, such as white space channels, as well as a module 5620 configured for receiving signals on licensed spectrum, such as licensed cellular channels. Module 5610 may be configuration, for example, to scan WS channels such as described previously herein for determining and/or updating WS channel usage or availability, as well as for communicating with terminals, such as UEs, on WS channels. In some implementations, module 5620 may be configured to receive information on licensed channels, such as from other base stations such as macro eNBs, with the information including, for example, channel usage information. Module 5620 may also be used for communicating with one or more terminals, such as UEs, using licensed channels. In some implementations, modules 5510 and 5520 may comprise separate modules, however, in some implementations they may comprise a single receiver module (which may be, for example, coupled to different antennas and/or front end modules, etc.).

In addition, WS-eNB 5600 may include a module 5630 for receiving and/or sending channel information to other base stations, such as to an associated macro eNB. This may include providing channel usage information to the macro eNBs that may be used to generate WS channel lists. Signaling may be done using, for example, a backhaul connection.

WS-eNB 5600 may also include a module 5640 for determining channel usage, such as, for example, based on channel usage information received over the air, via backhaul connections, from terminals, and/or based on detection of primary users, and/or based on channel conditions or interference. Base station 5600 may also include a module 5640 for sending signals on licensed channel(s), as well as a module 5650 for sending signals on unlicensed channels, such as white space channels. Various additional modules and related components (not shown) may be incorporated in WS-eNB 5600. For example, WS-eNB 5600 may be configured consistently with the example eNB illustrated in FIG. 13.

In some configurations, the apparatus for wireless communication includes means for performing various functions as described herein. In one aspect, the aforementioned means may be a module including a processor or processors and associated memory in which embodiments of the invention reside, such as are shown in FIGS. 13, 52, and 54-56, and which are configured to perform the functions recited by the aforementioned means. The may be, for example, modules or apparatus residing in UEs, eNBs and/or other network devices such as are shown. In another aspect, the aforementioned means may be a module or any apparatus configured to perform the functions recited by the aforementioned means.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 57:
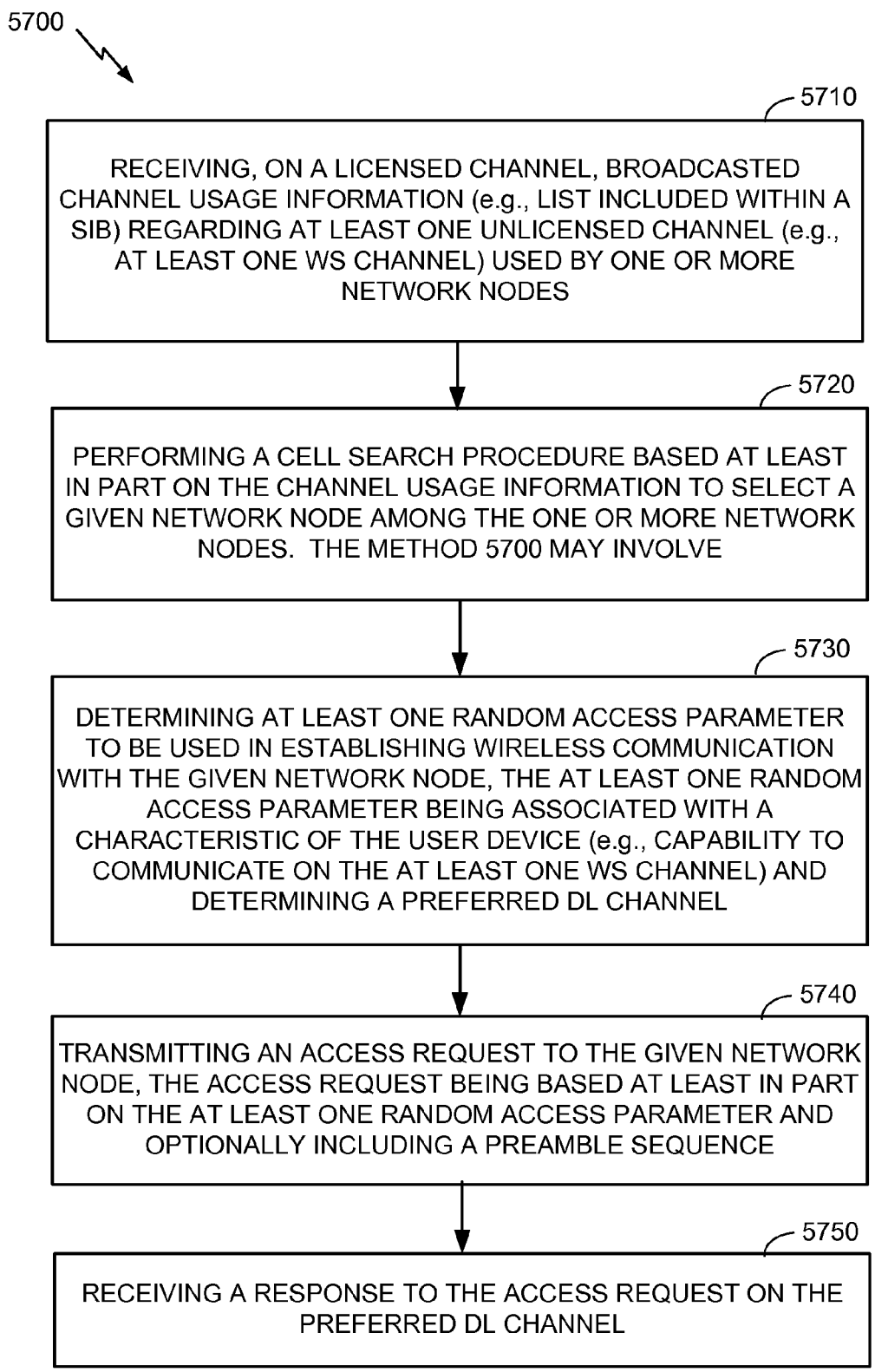
FIG. 57 illustrates an example cognitive radio methodology executable by a mobile entity (e.g., a UE).

In accordance with one or more aspects of the embodiments described herein, with reference to FIG. 57, there is shown a cognitive radio methodology 5700, operable by a mobile entity (e.g., a UE or the like). Specifically, method 5700 describes a way for the mobile entity to facilitate the use of the licensed spectrum for control channels in cognitive LTE. The method 5700 may involve, at 5710, receiving, on a licensed channel, broadcasted channel usage information (e.g., a list included within a SIB) regarding at least one unlicensed channel (e.g., at least one WS channel) used by one or more network nodes. The method 5700 may involve, at 5720, performing a cell search procedure based at least in part on the channel usage information to select a given network node among the one or more network nodes. The method 5700 may involve, at 5730, determining at least one random access parameter to be used in establishing wireless communication with the given network node, the at least one random access parameter being associated with a characteristic of the user device (e.g., a capability to communicate on the at least one WS channel) and determining a preferred DL channel. The method 5700 may involve, at 5740, transmitting an access request to the given network node, the access request being based at least in part on the at least one random access parameter and optionally including a preamble sequence and/or time/frequency parameter(s) corresponding to time/frequency resource(s). The method 5700 may optionally involve, at 5750, receiving a response to the access request on the preferred DL channel.

Figure 58:
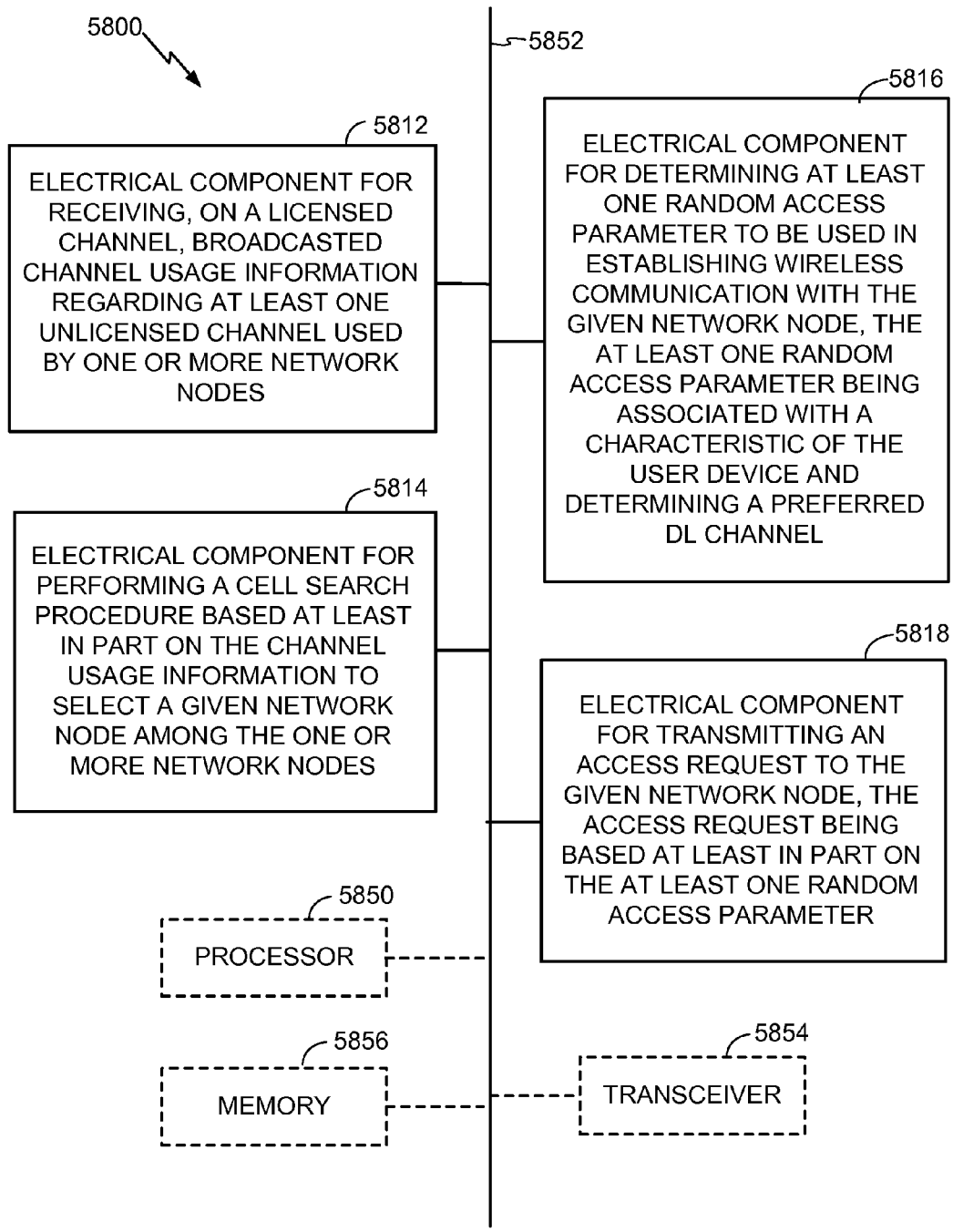
FIG. 58 shows an embodiment of an apparatus for cognitive radio communication, in accordance with the methodology of FIG. 57.

In accordance with one or more aspects of the embodiments described herein, there are provided devices and apparatuses for power control, as described above with reference to FIG. 57. With reference to FIG. 58, there is provided an exemplary apparatus 5800 that may be configured as a mobile entity (e.g., a UE) in a wireless network, or as a processor or similar device/component for use within the mobile entity. The apparatus 5800 may include functional blocks that can represent functions implemented by a processor, software, or combination thereof (e.g., firmware). For example, apparatus 5800 may include an electrical component or module 5812 for receiving, on a licensed channel, broadcasted channel usage information regarding at least one unlicensed channel used by one or more network nodes. The apparatus 5800 may include a component 5814 for performing a cell search procedure based at least in part on the channel usage information to select a given network node among the one or more network nodes. The apparatus 5800 may include a component 5816 for determining at least one random access parameter to be used in establishing wireless communication with the given network node, the at least one random access parameter being associated with a characteristic of the user device and determining a preferred DL channel. The apparatus 5800 may include a component 5818 for transmitting an access request to the given network node, the access request being based at least in part on the at least one random access parameter.

In related aspects, the apparatus 5800 may optionally include a processor component 5850 having at least one processor, in the case of the apparatus 5800 configured as a network entity (e.g., an eNB), rather than as a processor. The processor 5850, in such case, may be in operative communication with the components 5812-5818 via a bus 5852 or similar communication coupling. The processor 5850 may effect initiation and scheduling of the processes or functions performed by electrical components 5812-5818.

In further related aspects, the apparatus 5800 may include a radio transceiver component 5854. A stand alone receiver and/or stand alone transmitter may be used in lieu of or in conjunction with the transceiver 5854. When the apparatus 5800 is an AP or similar network entity, the apparatus 5800 may also include a network interface (not shown) for connecting to one or more core network entities. The apparatus 5800 may optionally include a component for storing information, such as, for example, a memory device/component 5856. The computer readable medium or the memory component 5856 may be operatively coupled to the other components of the apparatus 5800 via the bus 5852 or the like. The memory component 5856 may be adapted to store computer readable instructions and data for effecting the processes and behavior of the components 5812-5818, and subcomponents thereof, or the processor 5850, or the methods disclosed herein. The memory component 5856 may retain instructions for executing functions associated with the components 5812-5818. While shown as being external to the memory 5856, it is to be understood that the components 5812-5818 can exist within the memory 5856. It is further noted that the components in FIG. 58 may comprise processors, electronic devices, hardware devices, electronic sub-components, logical circuits, memories, software codes, firmware codes, etc., or any combination thereof.

Figure 59:
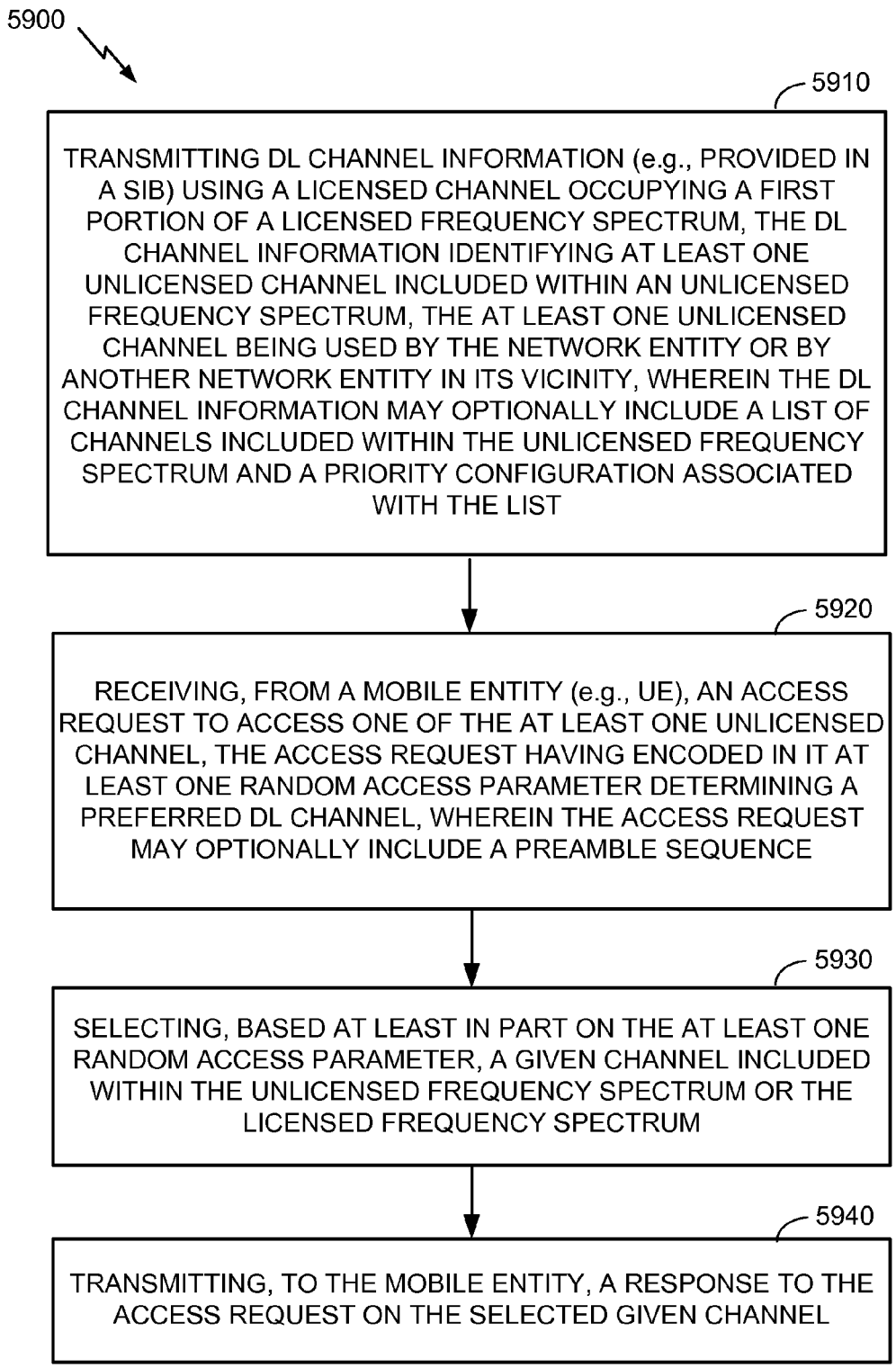
FIG. 59 illustrates an example cognitive radio methodology executable by a network entity (e.g., an eNB).

In accordance with one or more aspects of the embodiments described herein, with reference to FIG. 59, there is shown a methodology 5900, operable by a network entity (e.g., an eNB) to facilitate the use of the licensed spectrum for control channels in cognitive LTE. The method 5900 may involve, at 5910, transmitting DL channel information (e.g., provided in a SIB) using a licensed channel occupying a first portion of a licensed frequency spectrum, the DL channel information identifying at least one unlicensed channel included within an unlicensed frequency spectrum, the at least one unlicensed channel being used by the network entity or by another network entity in its vicinity, wherein the DL channel information may optionally include a list of channels included within the unlicensed frequency spectrum and a priority configuration associated with the list. The method 5900 may involve, at 5920, receiving, from a mobile entity (e.g., a UE), an access request to access one of the at least one unlicensed channel, the access request having encoded in it at least one random access parameter determining a preferred DL channel and/or mobile entity capability to communicate on at least one WS channel, wherein the access request may optionally include a preamble sequence. The method 5900 may involve, at 5930, selecting, based at least in part on the at least one random access parameter, a given channel included within the unlicensed frequency spectrum or the licensed frequency spectrum. The method 5900 may involve, at 5940, transmitting, to the mobile entity, a response to the access request on the selected given channel.

Figure 60:
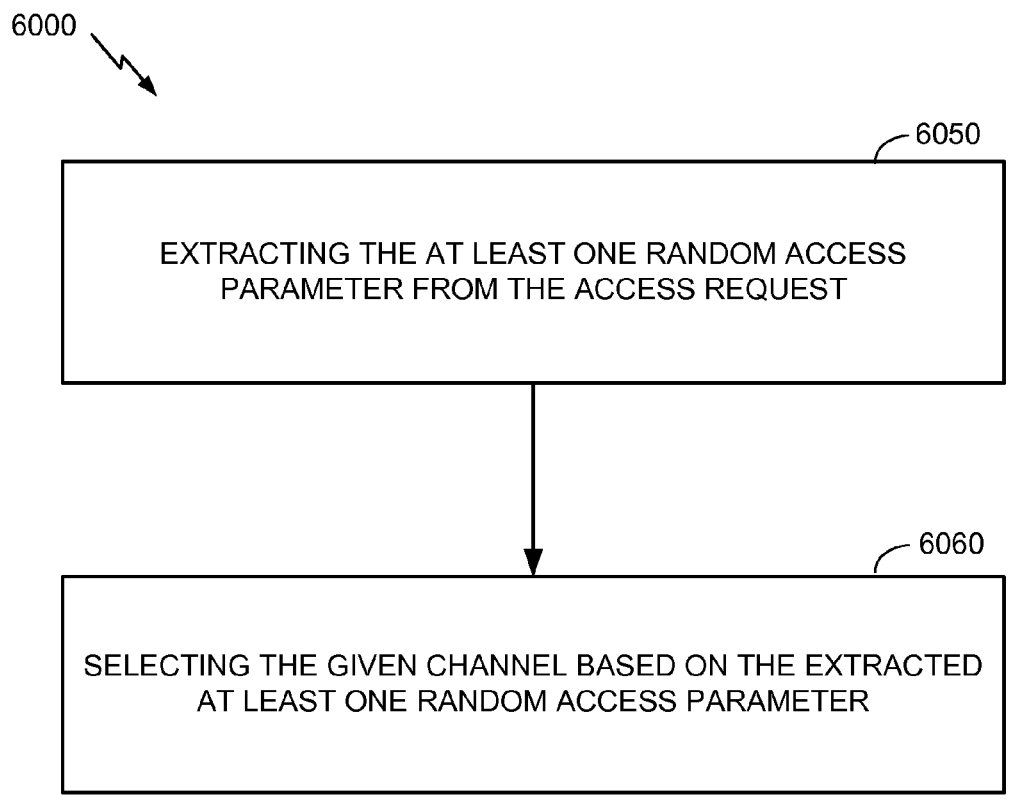
FIG. 60 illustrates further aspects of the methodology of FIG. 59.

With reference to FIG. 60, there are shown further operations or aspects of the method 5900 that are optional and may be performed by a network entity or the like. If the method

Figure 61:
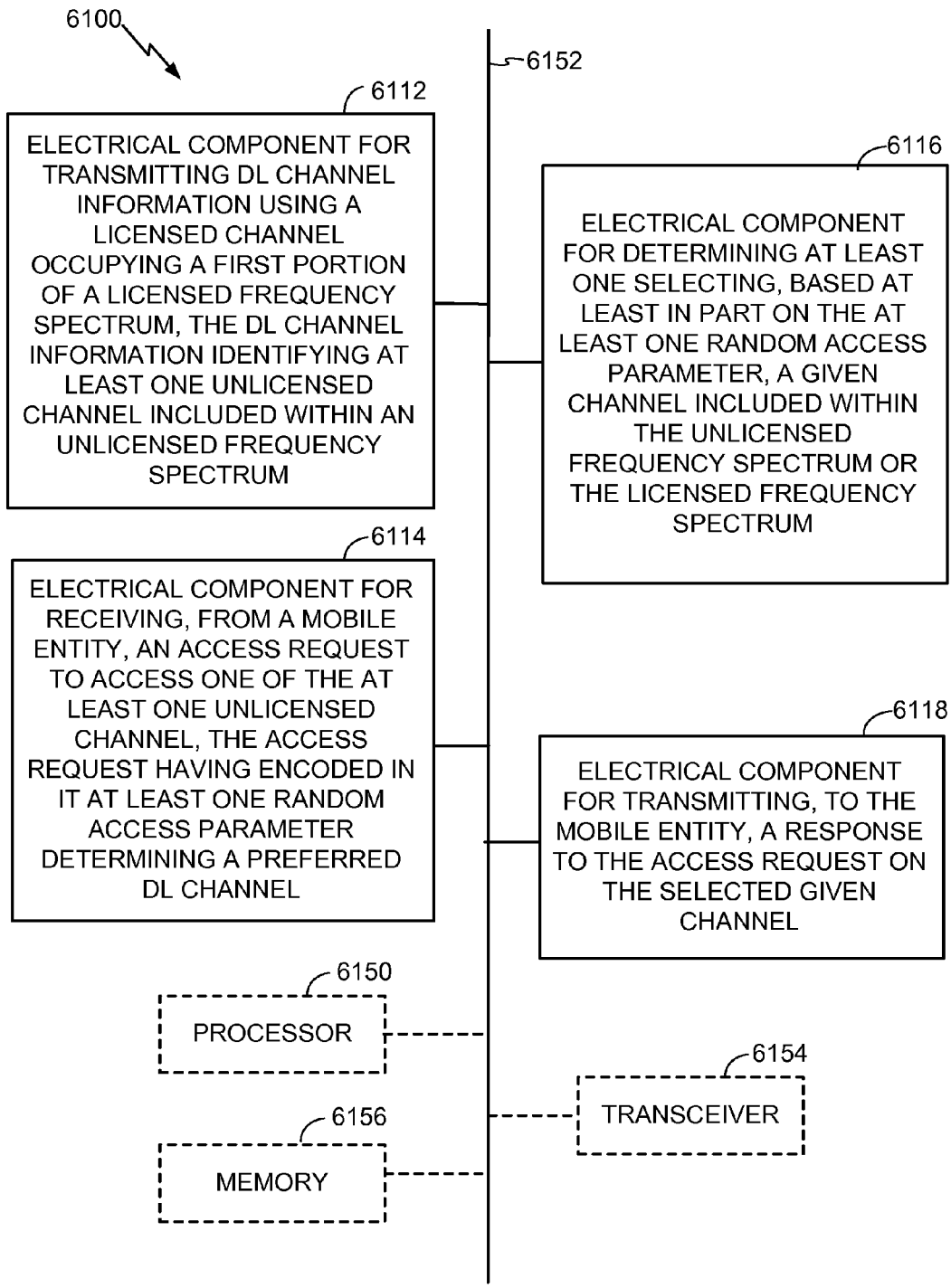
FIG. 61 shows an embodiment of an apparatus for cognitive radio communication, in accordance with the methodology of FIGS. 59-60.

5900 includes at least one block of FIG. 61, then the method 5900 may terminate after the at least one block, without necessarily having to include any subsequent downstream block(s) that may be illustrated. It is further noted that numbers of the blocks do not imply a particular order in which the blocks may be performed according to the method 5900. For example, the method 5900 may involve extracting the at least one random access parameter from the access request (block 5950). Selecting (block 5930) may involve selecting the given channel based on the extracted at least one random access parameter (block 5960).

In accordance with one or more aspects of the embodiments described herein, FIG. 61 shows a design of an apparatus 6100 (e.g., a network entity or component(s) thereof) for cognitive LTE, as described above with reference to FIGS. 59-60. For example, apparatus 6100 may include an electrical component or module 6112 for transmitting DL channel information using a licensed channel occupying a first portion of a licensed frequency spectrum, the DL channel information identifying at least one unlicensed channel included within an unlicensed frequency spectrum, the at least one unlicensed channel being used by the network entity or by another network entity in its vicinity. The apparatus 6100 may include a component 6114 for receiving, from a mobile entity, an access request to access one of the at least one unlicensed channel, the access request having encoded in it at least one random access parameter determining a preferred DL channel. The apparatus 6100 may include a component 6116 for selecting, based at least in part on the at least one random access parameter, a given channel included within the unlicensed frequency spectrum or the licensed frequency spectrum. The apparatus 6100 may include a component 6118 for transmitting, to the mobile entity, a response to the access request on the selected given channel. For the sake of conciseness, the rest of the details regarding apparatus 6100 are not further elaborated on; however, it is to be understood that the remaining features and aspects of the apparatus 6100 are substantially similar to those described above with respect to apparatus 5800 of FIG. 58.

In accordance with one or more aspects of the embodiments described herein, the disclosure relates generally to channel management in cognitive wireless communications systems. More particularly, but not exclusively, the application relates to methods and apparatus for providing control signaling and channel selection in a cognitive LTE network using white spaces.

In one aspect the disclosure is directed to a method comprising receiving, at a user device, a signal on a licensed channel carrying information associated with at least one unlicensed channel used by a wireless network node, transmitting, from the user device, an access request to the wireless network node, and receiving, at the user device, a response to the access request on the at least one unlicensed channel.

The unlicensed channel may comprise a WS channel. The method may further include tuning, at the user device, a receiver to the at least one unlicensed channel in response to the information. The access request may include a preamble sequence.

The method may further include initiating the transmitting in response to receipt of the information at the user device. The transmitting may include transmitting the access request on a licensed channel. The information may further identify one or more other unlicensed channels used by the wireless network node. The information may include a list of one or more unlicensed channels used by the network node. The list may include a plurality of unlicensed channels and a set of priority information associated with the plurality of unlicensed channels. The set of priority information may include a primary unlicensed channel and one or more secondary unlicensed channels. The method may further comprise establishing a communications connection with the wireless network node on the primary unlicensed channel. The method may further comprise establishing a second communications connection with the wireless network node on one of the secondary unlicensed channels. The second communication may be established responsive to a request from the wireless network node to switch channels.

For example, the user device may be a WS-UE and the wireless network node may be a WS-eNB. The WS-eNB may be a picocell node, a macrocell node, or a femtocell node. The information may be provided in a SIB. The SIB may be SIB1 or SIB2 in an LTE system.

In related aspects, the disclosure relates to a method comprising receiving, at a user device from a wireless network node, via a licensed DL channel, information associated with one or more unlicensed DL channels, sending an access request to the wireless network node via a licensed UL channel, and establishing a DL communication connection with the wireless network node using a first of the one or more unlicensed DL channels.

The user device may comprise a WS-UE and the wireless network node may comprise a WS-eNB. The method may further comprise establishing a second communication connection with the wireless network node using a second of the one or more unlicensed DL channels. The establishing a second communication connection may be performed responsive to receipt of a request from the wireless network node to change channels.

In related aspects, the disclosure relates to a method comprising transmitting, from a wireless network node, DL channel information using a channel occupying a first portion of a licensed frequency spectrum, wherein the DL channel information identifies one or more channels included within an unlicensed frequency spectrum and transmitting, from the wireless network node, data to a first group of one or more user devices configured to use the one or more channels included within the unlicensed frequency spectrum.

The first group of user devices may be further configured to receive the channel. The method may further include transmitting, from the wireless network node, data to a second group of user devices using a second portion of the licensed spectrum reserved exclusively for data transmission to the second group of user devices. The one or more channels may comprise one or more WS channels.

The method may further include receiving, at the wireless network node, a first access request from one of the first group of user devices, wherein the first access request is transmitted on a first frequency included within the licensed frequency spectrum.

The wireless network node may be a WS-eNB and the user device may be a WS-UE. The WS-eNB may be configured to provide only control signaling on the licensed frequency spectrum.

The DL channel information may be provided in a SIB. The DL channel information may include a list of channels included within the unlicensed frequency spectrum. The DL channel information may further include a priority configuration associated with the list of channels.

In related aspects, the disclosure relates to a method comprising transmitting, from a wireless network node, DL channel information using a channel occupying a first portion of a licensed frequency spectrum, wherein the DL channel information identifies one or more channels included within an unlicensed frequency spectrum, receiving, from a user device, a request to access one of the one or more channels included within the unlicensed frequency spectrum, and transmitting, from the wireless network node, data to the user device on a first of the one or more channels included within the unlicensed frequency spectrum.

The wireless network node may comprise a WS-eNB and the user device may comprise a WS-UE. The one or more channels may comprise one or more WS channels. The one or more channels comprise a plurality of WS channels. The request to access the one or more channels may be received on a channel in the licensed frequency spectrum.

The wireless network node may be configured to provide only control signaling on the licensed frequency spectrum. The DL channel information may be provided in a SIB. The SIB may be SIB1 or SIB2. The DL channel information may include a list of channels included within the unlicensed frequency spectrum. The DL channel information may further include a priority configuration associated with the list of channels.

The method may further comprise receiving an access request from a legacy device, establishing a connection, using licensed channels, with the legacy device, and sending, to a second wireless network node, a request for interference coordination. The sending may include sending L2 information to the second wireless network node. The L2 information may be based solely on one or more legacy devices in communication with the wireless network node. The L2 information may alternately include information associated with one or more WS-enabled devices and one or more legacy devices. The legacy device(s) may be legacy UEs. The WS-enabled device(s) may include one or more WS-UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a mobile entity in a cognitive wireless communication system having one or more network nodes enabled for both licensed channel communication and unlicensed white space channel communication, comprising:

receiving at the mobile entity, on a licensed channel, broadcasted channel usage information regarding at least one unlicensed white space channel within an unlicensed frequency spectrum used by the one or more network nodes, the one or more network nodes configured to use white space channel frequencies on one or both the uplink (UL) or downlink (DL);

performing a cell search procedure based at least in part on the channel usage information of the unlicensed white space channel to select a given network node among the one or more network nodes and determining a preferred downlink (DL) channel; and transmitting an access request to the given network node to be used in establishing wireless communication with the given network node, the access request including at least a white space capability declaration.

2. The method of claim 1, further comprising receiving a response to the access request on the preferred DL channel.

3. The method of claim 1, wherein:
the at least one unlicensed white space channel comprises a white space (WS) channel having a frequency selected from the range of 54 MHz to 806 MHz; and
the white space declaration comprises a capability to communicate on at least one WS channel.

4. The method of claim 1, wherein:
the mobile entity comprises a user equipment (UE); and
the channel usage information comprises a list included within a system information block (SIB).

5. The method of claim 1, further comprising choosing at least one of a preamble ID or resources for random access based at least in part on the access request.

6. The method of claim 5, further comprising the step of sensing white space channel conditions to monitor for a primary user of the unlicensed white space channel and vacating the unlicensed white space channel if a primary user is detected.

7. The method of claim 5, wherein the access request includes at least one time parameter for at least one time resource and at least one frequency parameter for at least one frequency resource.

8. An apparatus for a cognitive wireless communication system having one or more network nodes enabled for both licensed channel communication and unlicensed white space channel communication, comprising:
at least one processor configured to: (a) receive, on a licensed channel, broadcasted channel usage information regarding at least one unlicensed white space channel within an unlicensed frequency spectrum used by the one or more network nodes the one or more network nodes configured to use white space channel frequencies on one or both the uplink (UL) or downlink (DL); (b) perform a cell search procedure based at least in part on the channel usage information of the unlicensed white space channel to select a given network node among the one or more network nodes and determine a preferred downlink (DL) channel; (c) transmit an access request to the given network node to be used in establishing wireless communication with the given network node, the access request including at least a white space capability declaration; and
a memory coupled to the at least one processor for storing data.

9. The apparatus of claim 8, wherein:
the mobile entity comprises a user equipment (UE); and
the channel usage information comprises a list included within a system information block (SIB).

10. A computer program product, comprising:
a non-transitory computer-readable medium comprising code for causing a computer to:
receive, on a licensed channel, broadcasted channel usage information regarding at least one unlicensed white space channel within an unlicensed frequency spectrum used by one or more network nodes configured to use white space channel frequencies on one or both the uplink (UL) or downlink (DL);
perform a cell search procedure based at least in part on the channel usage information of the unlicensed white space channel to select a given network node among the one or more network nodes and determine a preferred downlink (DL) channel; and
transmit an access request to the given network node to be used in establishing wireless communication with the given network node, the access request including at least a white space capability declaration.

11. A method operable by a network entity in a wireless communication system having one or more network nodes enabled for both licensed channel communication and unlicensed white space channel communication, comprising:
transmitting downlink (DL) channel information using a licensed channel occupying a first portion of a licensed frequency spectrum, the DL channel information identifying at least one unlicensed white space channel included within an unlicensed frequency spectrum, the at least one unlicensed white space channel being used by the network entity or by another network entity in its vicinity;
receiving, from a mobile entity, an access request to access one of the at least one unlicensed white space channel, the access request having encoded in it a white space capability declaration and at least one random access parameter determining a preferred DL channel;
selecting, based at least in part on the white space capability declaration and the at least one random access parameter, a given white space channel included within the unlicensed frequency spectrum or a channel included within the licensed frequency spectrum; and
transmitting, to the mobile entity, a response to the access request on the selected given channel.

12. The method of claim 11, further comprising the step of sensing white space channel conditions to monitor for a primary user of the unlicensed white space channel and vacating the unlicensed white space channel if a primary user is detected.

13. The method of claim 11, wherein the DL channel information includes a list of channels included within the unlicensed frequency spectrum.

14. The method of claim 12, wherein the DL channel information further includes a priority configuration associated with the list.

15. The method of claim 11 wherein selecting comprises choosing at least one of a preamble ID or resources for random access based at least in part on the access request.

16. The method of claim 15 wherein the access request includes a preamble sequence.

17. The method of claim 15, wherein the access request includes at least one time parameter for at least one time resource and at least one frequency parameter for at least one frequency resource.

18. The method of claim 11, further comprising extracting the at least one random access parameter from the access request.

19. The method of claim 18, wherein selecting comprises selecting the given channel based on the extracted at least one random access parameter.

20. The method of claim 11, wherein:
the network entity comprises an evolved Node B (eNB);
the mobile entity comprises a user equipment (UE); and
the DL channel information is provided in a system information block (SIB).

21. An apparatus, comprising:
at least one processor configured to: (a) transmit downlink (DL) channel information using a licensed channel occupying a first portion of a licensed frequency spectrum, the DL channel information identifying at least one unlicensed white space channel included within an unlicensed frequency spectrum, the at least one unlicensed white space channel being used by the network entity or by another network entity in its vicinity; (b) receive, from a mobile entity, an access request to access one of the at least one unlicensed white space channel, the access request having encoded in it a white space capability declaration and at least one random access parameter determining a preferred DL channel; (c) select, based at least in part on the at least one random access parameter, a given white space channel included within the unlicensed frequency spectrum or a channel included within the licensed frequency spectrum; (d) transmit, to the mobile entity, a response to the access request on the selected given channel; and (e) monitor unlicensed white space channel conditions for a primary user and vacate the unlicensed white space channel if a primary user is detected; and
a memory coupled to the at least one processor for storing data.

22. The apparatus of claim 21, wherein:
the network entity comprises an evolved Node B (eNB);
the mobile entity comprises a user equipment (UE); and
the DL channel information is provided in a system information block (SIB).

23. A computer program product, comprising:
a non-transitory computer-readable medium comprising code for causing a computer to:
transmit downlink (DL) channel information using a licensed channel occupying a first portion of a licensed frequency spectrum, the DL channel information identifying at least one unlicensed white space channel included within an unlicensed frequency spectrum, the at least one unlicensed white space channel being used by the network entity or by another network entity in its vicinity;
receive, from a mobile entity, an access request to access one of the at least one unlicensed white space channel, the access request having encoded in it a white space capability declaration and at least one random access parameter determining a preferred DL channel;
select, based at least in part on the white space capability declaration and the at least one random access parameter, a given channel included within the unlicensed frequency spectrum or the licensed frequency spectrum; and
transmit, to the mobile entity, a response to the access request on the selected given channel.

\* \* \* \* \*